(12) United States Patent
Yamakawa et al.

(10) Patent No.: US 7,725,588 B2
(45) Date of Patent: May 25, 2010

(54) SWITCHING METHOD AND SWITCH DEVICE

(75) Inventors: Satoshi Yamakawa, Minato-ku (JP); Jun Ishikawa, Minato-ku (JP); Takashi Torii, Minato-ku (JP)

(73) Assignee: NEC Corporation, Tokyo (JP)

( * ) Notice: Subject to any disclaimer, the term of this patent is extended or adjusted under 35 U.S.C. 154(b) by 1096 days.

(21) Appl. No.: 10/285,497

(22) Filed: Nov. 1, 2002

(65) Prior Publication Data

US 2003/0097454 A1  May 22, 2003

(30) Foreign Application Priority Data

Nov. 2, 2001 (JP) ............... 2001-337838
Jun. 10, 2002 (JP) ............... 2002-168620

(51) Int. Cl.
*G06F 15/16* (2006.01)
*G06F 15/173* (2006.01)

(52) U.S. Cl. ............ 709/229; 709/223; 709/234; 709/238

(58) Field of Classification Search .......... 709/223, 709/224, 229, 238, 234
See application file for complete search history.

(56) References Cited

U.S. PATENT DOCUMENTS

| | | | | |
|---|---|---|---|---|
| 5,907,672 | A * | 5/1999 | Matze et al. ............... | 714/8 |
| 6,826,600 | B1 * | 11/2004 | Russell ................. | 709/213 |
| 6,876,656 | B2 * | 4/2005 | Brewer et al. ............. | 370/392 |
| 7,035,271 | B1 * | 4/2006 | Peterson ................. | 370/401 |
| 2002/0016893 | A1 * | 2/2002 | Asauchi ................. | 711/154 |
| 2002/0029241 | A1 * | 3/2002 | Yokono et al. ........... | 709/202 |
| 2002/0161839 | A1 * | 10/2002 | Colasurdo et al. ......... | 709/204 |

FOREIGN PATENT DOCUMENTS

| | | |
|---|---|---|
| JP | 5-143419 A | 6/1993 |
| JP | 6-266600 A | 9/1994 |
| JP | 7-73078 A | 3/1995 |
| JP | 7-114444 A | 5/1995 |
| JP | 7-184194 A | 7/1995 |

(Continued)

OTHER PUBLICATIONS

Akira Kogure: A Thorough Understanding of IP Networks, Nikkei Byte, Japan, Nikkei BP Sha, Aug. 22, 2001, No. 220, pp. 104-109.

*Primary Examiner*—Ario Etienne
*Assistant Examiner*—Avi Gold
(74) *Attorney, Agent, or Firm*—Sughrue Mion, PLLC

(57) ABSTRACT

A switch device has an object ID rewrite unit and a file access control unit. The object ID rewrite unit, when an original object ID is contained in a reply to be transferred, rewrites the original object ID to an information entraining object ID by inserting server identification information into the original object ID, while when the information entraining object ID is contained in a reply to be transferred, restores the information entraining object ID to the original object ID. The file access control unit includes a table for managing a combination of address information of a server and server identification information, estimating address information of a server corresponding to server identification information contained in an information entraining object of a request to be transferred with reference to the table, and determines a destination of the request on the basis of the address information.

53 Claims, 30 Drawing Sheets

FOREIGN PATENT DOCUMENTS

| | | |
|---|---|---|
| JP | 7-191811 A | 7/1995 |
| JP | 10-93552 A | 4/1998 |
| JP | 10-133926 A | 5/1998 |
| JP | 11-45228 A | 2/1999 |
| JP | 11-85576 A | 3/1999 |
| JP | 2001-51890 A | 2/2001 |
| JP | 2001-268125 A | 9/2001 |
| JP | 2001-331355 A | 11/2001 |
| JP | 2002-207655 A | 7/2002 |

* cited by examiner

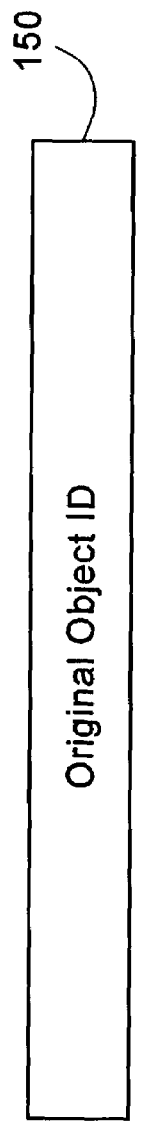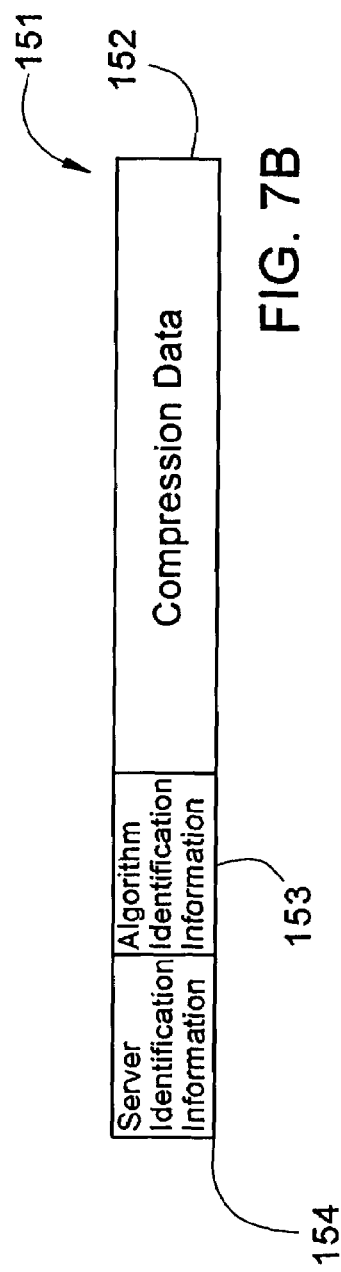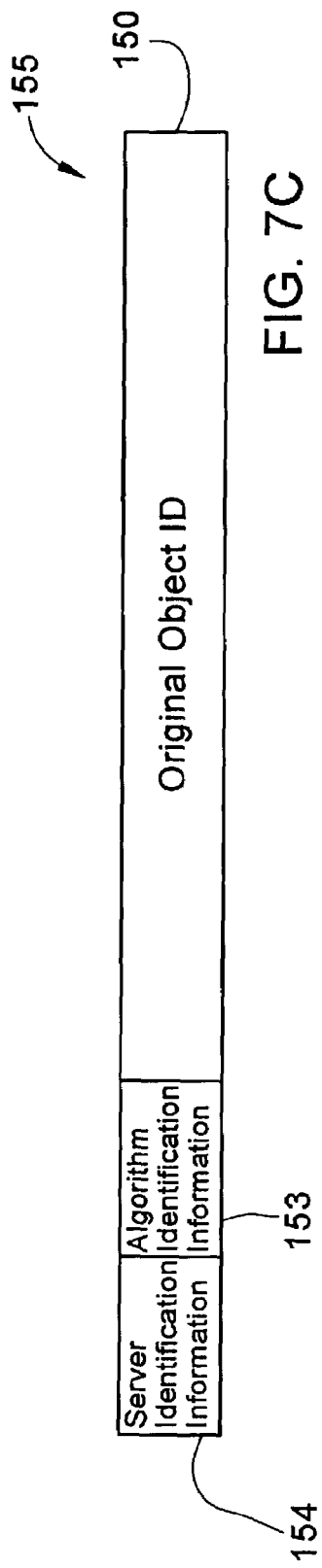

| Algorithm Identification Information (153) | Delete Data (156) | Delete Data Position (157) |
|---|---|---|
| | | |
| | | |
| | | |

| Server Identification Information (154) | Server IP Address Information (158) | Server MAC Address Information (159) |
|---|---|---|
| | | |
| | | |
| | | |

| Transaction ID (160) | Client IP Address Information (161) | Client MAC Address Information (162) | File Access Instruction Information (163) | Server Identification Information (154) |
|---|---|---|---|---|
| | | | | |
| | | | | |
| | | | | |
| | | | | |

| Movement Source Object ID ⎯166 | Movement Destination Object ID ⎯167 | Movement Destination Server Information ⎯168 |
|---|---|---|
| | | |
| | | |
| | | |

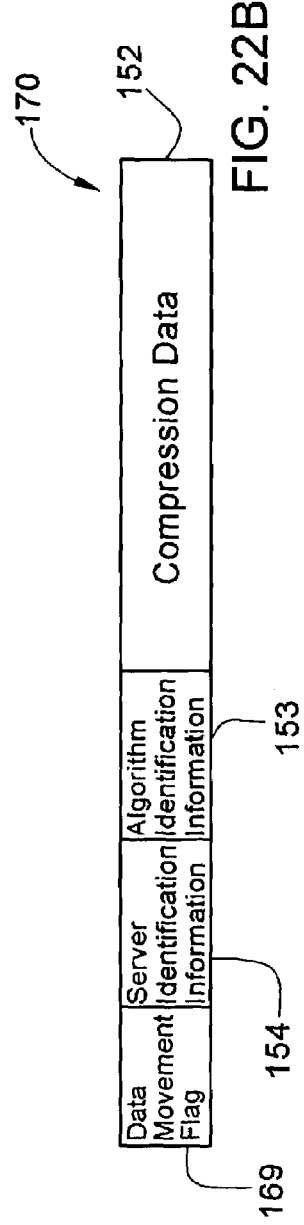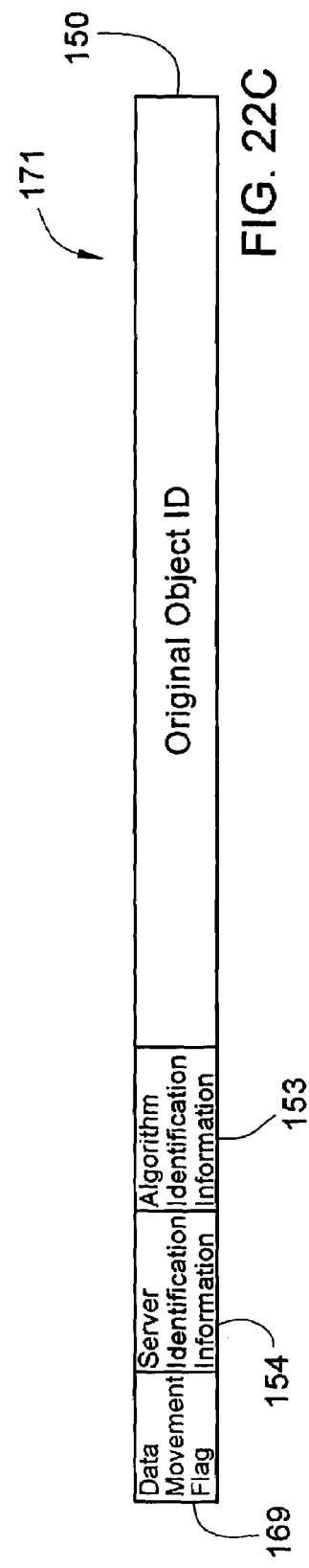

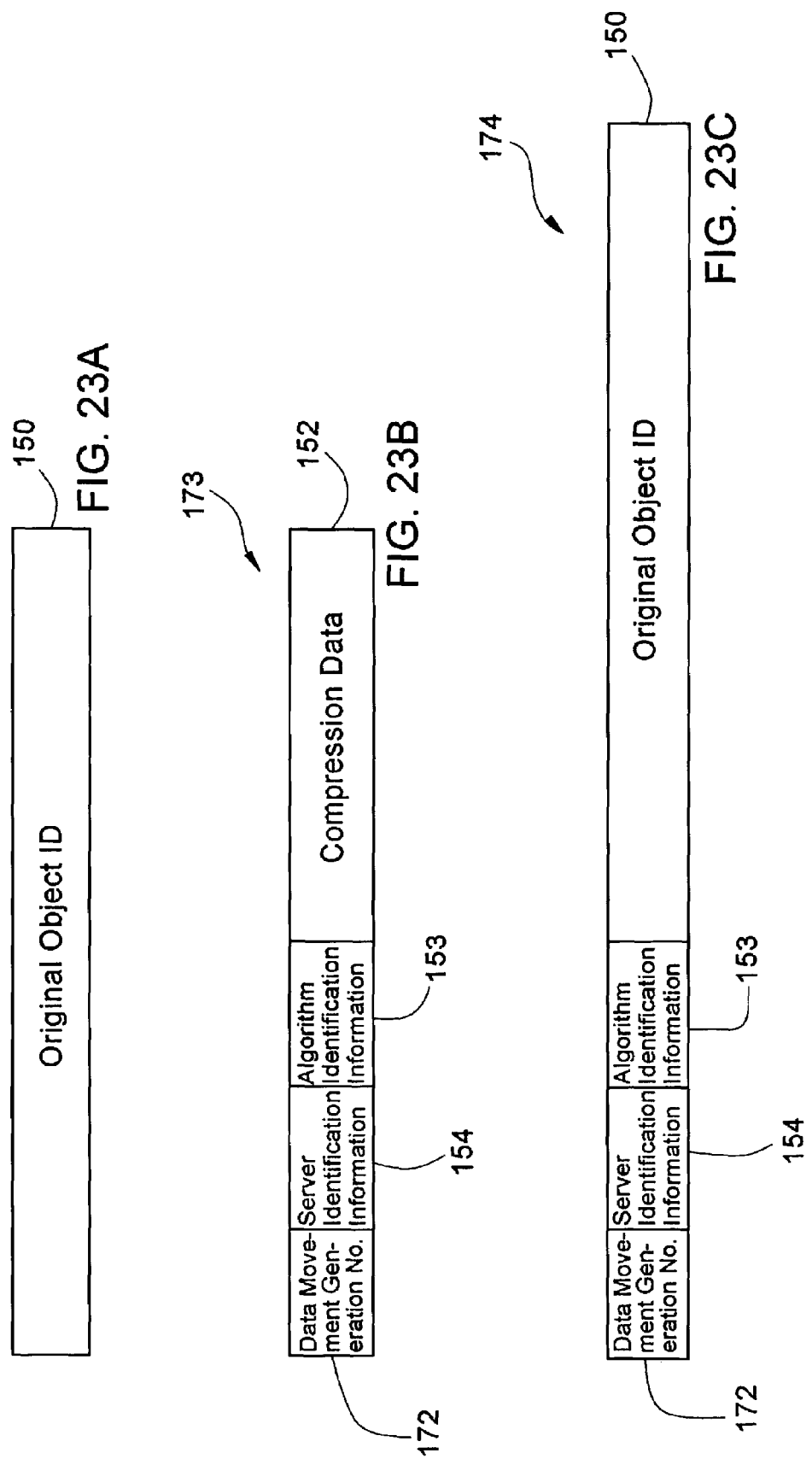

| No. | Movement Source Object ID Information | Movement Destination Object ID Information | Advancement Status Information | Parent Object Number | Updating Log Information | Object Attribute Information | Movement Destination Server Information |
|---|---|---|---|---|---|---|---|
| 1 | | | | | | | |
| 2 | | | | | | | |
| 3 | | | | | | | |
| 4 | | | | | | | |

166  167  177  178  179  180  168

130

SWITCHING METHOD AND SWITCH DEVICE

BACKGROUND OF THE INVENTION

1. Field of the Invention

The present invention relates to a switch logically disposed between a client and a server, and more specifically to a switch which is disposed in a client server system in which a remote file system is implemented for executing file processing through a network, and provides a single system image (SSI) transparent to the client and network traffic control such as load distribution.

2. Description of the Related Art

As a method for realizing a client server system through a network a famous method is known, which employs a network file system (NFS) protocol disclosed in RFC (Request For Comments) 1094 and RFC 1813. The NFS protocol provides basic operations as a file system such as creation, deletion, read/write operation, movement and the like of a file for a server located at a remote place through a network, and convenience such as sharing of files with other clients. In the NFS protocol, a client employs an object ID for identifying an object such as a file on a server to access the server through an application interface such as a remote procedure call (RPC). In the NFS, one called a file handle is employed as the object ID, for example.

In the following, conventional techniques concerning the switch device will be described for every item:

Layers 4 to 7 Switches:

As a implementation of a network file system there are widely known ones based upon an OSI (open Systems Interconnection) reference model of the so-called IP (Internet Protocol) network, and in an ordinary router and the like it is widely known that use is made of information up to a layer 3 of the OSI model, i.e., information on a physical layer, a data link layer and a network layer for path control. Further, in recent years, use is made of information from the layer 4 to the layer 7 of the OSI reference model, i.e., information on a transport layer, a session layer, a presentation layer, and an application layer for provision of varieties of convenience.

A network switch device for judging the kind of a protocol of a packet sent by making use of the information of the layer 4 and distributing it to a corresponding server for each protocol is widely utilized in, for example, web hosting services. Further recently, there is reported as a product one for realizing server distribution for each web content utilizing the layer 7 information. A major object of these techniques is load distribution of the server and control of an access policy to the server. The access policy includes execution of an SSL (Secure Socket Layer) processing for recognizing a user on a single server, and perusal limitation for every ages, and the like. Upon executing the SSL processing switching of servers for the purpose of load distributed and so on is generally prohibited. The switch device serves as logical packet switch.

Referring to FIG. 1 there is provided a block diagram illustrating a function of a conventional web switch. Web switch 900 comprises packet processing unit 903, and HTTP (Hypertext Transfer Protocol) processing unit 902. After a received packet processing is executed in packet processing unit 903, HTTP processing unit 902 collects information concerning the layer 4 to layer 7, and takes out information concerning URL (Uniform Resource Locator) classified to the layer 7. Further, HTTP processing unit 902 retrieves and specifies on the basis of information concerning the URL taken out a server to treat the URL, taking it's address, and policy of load distributed and the like. HTTP processing unit 902 further converts a MAC (Media Access Control) address and an IP address of an original packet by executing conversion from a global address to a local address, i.e., NAT (Network Address translator) conversion, and rewriting a MAC address by virtual IP clustering described later such that a packet is transferred to a server thereof, and corrects contradiction of security such as check sum following the conversion. Packet processing unit 903 sends a rewritten and corrected packet onto a network.

Besides the aforementioned switch device varieties of techniques for load distributed and the so on have been disclosed. There is widely known as such a technique a method wherein each DNS (Domain Name Server) disposed in each network area forces a plurality of IP addresses to bring into correspondence to one domain name, and selects an IP address with the round robin system and transmits it to a client, for example.

Virtual IP Clustering:

There is known a method wherein a coordinator who defines a virtual IP address as a cluster address, which virtual address is set to a plurality of servers as an IP alias, and serves as a switch redirects a packet to a proper server by rewriting a MAC address for load distribution. In such a method, each server sets the virtual IP address as the IP alias, so that a client looks that as if one server responds thereto. In the present method, a response can be returned directly from a client from a corresponding server without mediating the coordinator. The method that directly returns the response has an advantage that a bottleneck is unlikely to occur, compared with a method where a packet passes the coordinator even for a return path. The present method and methods where an improvement is added to the present method to some degree is widely known at present as one constituting method of a clustering system using an OS (Operating System) such as Linux.

Japanese Laid-Open Patent Publication No. 2001-51890 (JP, P2001-51890A) discloses another method in which a client may not recognize the number of a plurality of file servers dispersed on a network such as a LAN (Local Area Network) and a connection state of a storage device. As illustrated in FIG. 2, a client server system that executes the just-mentioned method includes a plurality of file servers 3 which are dispersed on network 2, and connected with each other through inter-server exclusive line 7, and further shares a multicast address in common virtual distributed file system 4 that operates over respective file servers 3 is implemented. A module on each file server 3 constituting the just-mentioned system, once receiving a multicast file operation request from client 1 judges whether or not a server of itself is an optimum server capable of processing the aforementioned request by making use of a mapping table of virtual distributed file system 4 and entire local file system 6, and processes the requested file operation based upon a judged result without overlapping on other file servers 3. Hereby, the plurality of file servers 3 distributed on the network can be treated as a single server, viewed from client 1, so that a virtual distributed file server system can be provided, in which system the number of servers 3 and a connection state with the storage device are not recognized by client 1.

However, when the aforementioned techniques are applied to a file system service through a distributed network, the following problems happen:

(1) Even a method employing a layer 4 to 7 switch and even a method employing virtual IP clustering suffer from a difficulty that contents rewritten upon redirection of a packet are limited to a MAC address or an IP address. For this, when in a protocol in which a client stores an object ID such as a file handle of NFS in a cache, an administrator executes an operation which does not require the need of informing a client for the purpose of load distribution and capacity distribution, for example when an object is moved from a server once allocated to a client to another server, the client accesses the server while accommodating an object ID of an old server in the packet. Accordingly, even though the switch transfers the packet to a new server, the new server fails to read the object ID in the packet and sends back an error to the client. More specifically, in the file system service mediating a load distributed network, transparency to the client can not been realized even when a conventional method of load distribution is applied;

(2) There is essential an improvement for a file server which is already utilized by a user upon setting the IP alias and introduction of the virtual distributed file system. Accordingly, when a file system of an existing client server is operated, for obtaining convenience provided while intactly utilizing a construction of the foregoing client server complicated installation work happens even when only a purpose of the load distribution is solved.

SUMMARY OF THE INVENTION

It is an object of the present invention to provide a switching method wherein it provides, provided that a client and a server support only a file system service protocol (e.g., NFS) through a standard network, a file service of a single system image to the client by integrally managing a plurality of servers without modifying those existing systems, and it realizes convenience of hiding relocation of an object due to management purposes of load distribution and capacity allocation thereby maintaining SSI processing or the like.

It is another object of the present invention to provide a switch device which provides a file service of a single system image to a client, provided that a client and a server support only a file system service protocol (e.g., NFS) mediating a standard network, by integrally managing a plurality of servers without modifying those existing systems, and realizes convenience of hiding relocation of an object due to control purposes of load distribution and capacity allocation thereby maintaining SSI processing or the like.

According to a first aspect of the present invention, there is provided a switching method, at a switch device which is logically disposed between at least one client and at least one server for managing at least one object, for transferring a request on the object transmitted from the client to the server which manages the object, and for transferring a reply against the request from the server to the client which is a source of the request, the switching method comprising the steps of:

rewriting, when in the transferred reply an original object ID which is generated by the server is contained for identifying the object, the original object ID to an information entraining object ID by inserting server identifying information for identifying the server for managing an object corresponding to the original object ID from other servers;

restoring the information entraining object to the original object ID when the information entraining object ID is contained in the transferred request;

estimating address information of the server corresponding to the server identification information contained in the information entraining object ID of the transferred request with reference to a first table for managing a combination of the address information of the server and the server identification information; and determining a destination of the request based upon the address information.

According to a second aspect of the present invention there is provided a switching method, at a switch device which is logically disposed between at least one client and at least one server for managing at least one object, for transferring a request on the object transmitted from the client to the server which manages the object, and for transferring a reply against the request from the server to the client which is a source of the request, the switching method comprising the steps of:

estimating server identification information corresponding to an object ID contained in the request with reference to a first table for managing a combination of the object ID and server identification information for identifying a server for managing an object corresponding to the original object ID from other servers;

estimating address information of a server corresponding to the server identification information with reference to a second table for managing a combination of address information of the server and the server identification information; and determining a destination of the request based upon the address information.

According to a third aspect of the present invention, there is provided a switch device disposed logically between at least one client and at least one server for managing at least one object, in which a request on the object transmitted from the client is transferred to the server for managing the object, and in which a reply to the request from the server is transferred to a client being the source of the transmission, the switch device comprising:

object ID rewrite means for rewriting, when an original object ID generated in the server for a purpose of identifying the object is contained in the request to be transferred, the original object ID to an information entraining object ID by inserting server identification information for identifying an object corresponding to the original object ID, and for restoring, when the information entraining object ID is contained in the request to be transferred, the information entraining object ID to the original object ID;

a first table for managing a combination of address information of the server and the server identification information; and transfer means for estimating address information of a server corresponding to the server identification information contained in the information entraining object ID of the request to be transferred with reference to the first table, and determining a transfer destination based upon the address information.

In accordance with the switch device according to the present invention, the switch device includes a switch capable of bring into correspondence a server for managing an object and an object ID of the just-mentioned object, and provides the object ID transmitted to the client with identification information of a server for managing the object. With such arrangement, when the client tries to access its object in succession, server identification information for controlling the object is contained in an object ID in a request transmitted by the client, so that the switch device can determine a server of a destination from the server identification information contained in the request. Accordingly, application of the switch device of the present invention eliminates the need of specifying the server for managing the object on the side of the client, so that transparency to the client can be realized.

Even when the switch device of the present invention is applied, it is eliminated to need alteration of processings for the client and the server. Provided that the client and the server therefore support only a file system service protocol mediating a standard network, it is possible to integrally control a plurality of servers without modification of an existing system for providing a file service of the SSI to the client.

It is preferable in the switch device that common object unit identification information for identifying a common object unit being a unit where an object is exported to the public is contained in the foregoing server identification information. Hereby, very fine transfer control in the common object unit having further higher resolution than the server unit can be realized.

In the present invention, the switch device may further comprises: a classification table for associating the request and the reply, and managing a combination of tag information in an OSI model layer 4 or lower useable for uniquely specifying a combination of the client and the server and address information of the client; and second transfer means for estimating address information of the client to which a reply should be transferred, and determining a destination of the reply based upon the address information. Otherwise, the switch device may further comprises: a classification table for associating the request and the reply, and managing a combination of a communication session/port number with a server useable for uniquely specifying a combination of the client and the server and address information of the client; and second transfer means for estimating address information of the client to which a reply should be transferred with reference to the port number and the classification table, and determining a destination of the reply on the basis of the address information. By providing the classification table and the second transfer means the tag information of the OSI model layer 4 or lower to which hardware processing is possible becomes useable to ensure further higher processing.

Further, in the switch device of the present invention, it is desirable that insertion locations and data lengths of the algorithm identification information and the server identification information in the information entraining object IDs contained in all the request and reply are same. It is hereby made possible to reduce the time required for extracting and retrieving the information contained in the object ID.

In another switch device according to the present invention further comprises: a pseudo file system in which directory trees of an object exported to the public from the server are combined for managing them as one integrated directory tree; a second table for managing a combination of an object ID of an object corresponding to a joint of directory trees in each common object unit in the integrated directory tree and instruction information which is associated with the object ID and requires an access to a plurality of destinations; and file system control means for dividing, when a combination of an object ID and instruction information both contained in a request to be transferred is entered in the second table, the request to request transferred to each destinations, and assembling all requests received from each destination as a reply transferred to the client. In this switch device, there is executed a name solving processing only for a tree portion to which a plurality of servers or a plurality of file systems are combined with reference to the integrated directory tree of the pseudo file system, and other tree portions are entrusted to the server in their processing. Hereby, a load of the name solving processing can be distributed between the switch and the server. It is herein desirable in view of making the retrieval processing effective that an object ID registered in the second table is the same information entraining object ID as an object ID contained in the request.

Another switch device according to the present invention further comprises: a second table for managing a combination of a movement source object ID, when an object exported to the public by the server is subjected to movement, of the object before the movement, a movement destination object ID of the object after the movement, and movement destination server identification information being identification information for a server at a movement destination; data movement processing means for moving the object based upon a predetermined criteria with reference to an integrated directory tree managed by the pseudo file system, and entering the movement source object ID, the movement destination object ID and the movement destination server identification information of the object in the second table; and movement hiding means for altering, when an object ID contained in a request to be transferred is coincident with the movement source object ID in the second table, the object ID to a movement destination object ID corresponding to the coincident the movement source object ID, and determining a transmission destination server based upon movement destination server identification information corresponding to the movement source object ID. Since in this switch device then movement hiding means is provided which is capable of bring into correspondence the movement original object ID, movement destination object ID, and movement destination server, there can be realized convenience of hiding relocation of an object due to administrating purposes such as load distribution and capacity allocation, etc., from a user to maintain the SSI session.

Further another switch device according to the present invention further comprises: a second table for managing a combination of an advancement status of a movement processing for moving all objects upon executing a processing in which a group of objects exported to the public by the server to another server, update information required during the movement processing from the client, a movement source object ID of the object before the movement, a movement destination object ID of the object after the movement, and movement destination server identification information being identification information of a movement destination server; movement processing control means for moving the object on the basis of a predetermined criteria with reference to the pseudo file system, and entering an advancement status of the movement processing, update log in a copying processing, a movement source ID of the object, a movement destination object ID, and movement destination server identification information into the second table; and means for altering a transfer destination of a method of transferring a request to the moved object from the client upon executing the movement processing on the basis of the advancement state registered in the second table and contents of the request, and hiding that the operation is in the movement processing.

By adopting this arrangement, it is made possible to execute a management work by hiding a relocation work to the user without causing system interruption and file access service interruption even upon the object relocation work between servers by an administrator.

Although an object ID in the present invention is typically a file handle in the NFS, it is not limited thereto, and includes in an arbitrary file system capable of intervening of a network, all those identifying an object. Further, also for the file system, it is not limited to the NFS, and the present invention is applicable to other file systems.

Finally, in accordance with the present invention, provided that a client and a server support only a file system service protocol (e.g., NFS) mediating a standard network, an SSI file service can be realized for a client by integrally controlling a plurality of servers without modifying existing systems. Upon implementation of the switch device of the present invention, it is sufficient to only dispose the switch device logically between a client and a server, because any alteration of processings for the client and the server such as setting of IP alias and introduction of a virtual distributed file system is unnecessary.

The present invention can execute processings in a transparent fashion to a client when an administrator executes an operation not originally required to inform a client such as purposes of a load and of capacity distribution, for example when the administrator moves an object from a server which is once allocated to another server, and hence it can keep consistency of the SSI session presented to the client. The switch device of the present invention can bring into correspondence an object ID for specifying objects such as a directory and a file and a server for processing the object, and converts new and old object IDs. When the object is moved to be transparent to the client, and can distribute, on the basis of the result, a request from the client to a proper server and a reply containing an object ID from the server to a proper client.

The present invention is capable of processing a greater amount of object IDs without the use of the retrieving operation, and of transferring a packet to a proper server, and is hence advantageous for making processings a high speed and hardware implementation.

The present invention is capable of shortening time for a name solving processing by distributing a load of the name solving processing to a server and a switch device. The switch device of the present invention includes a pseudo file system, which system controls only a mount point and is capable of transferring name solving under the mount point to each server without contradiction.

In the present invention, when there is a movement request of an object including a joint in a directory tree in each common object unit in an integrated directory tree, a table is rewritten such that a client looks at it as if actual movement of an object at a joint or lower is prevented and the objects at the joint or lower are moved to a desired positions, and hence the movement can be completed at a very high speed.

In the present invention, when use can be made of tag information at the layer 4 or lower of the OSI reference model, rewriting of an object ID is ensured with a hardware using those pieces of tag information, and hence the processings are made a further high speed.

Further, in the present invention, even upon an object relocation work between servers by a controller the relocation work is masked to a user, whereby a control work can be executed without causing system interruption and file access service interruption.

The above and other objects, features, and advantages of the present invention will become apparent from the following description with reference to the accompanying drawings which illustrate an example of the present invention.

BRIEF DESCRIPTION OF THE DRAWINGS

FIGS. 7A to 7C are views each exemplarily illustrating formats of an original object ID, a compression type information entraining object ID and postscript type information entraining object ID rewritten in the object ID rewrite unit respectively;

FIG. 8 is a view illustrating the arrangement of an algorithm table;

FIG. 9 is a view illustrating the arrangement of a server information control table;

FIG. 10 is a view illustrating the arrangement of a transaction ID control table;

FIGS. 22A to 22C are views exemplarily illustrating formats of an original object ID, flag added compression type information entraining object ID and flag added postscript type information entraining object ID, respectively;

FIGS. 23A to 23C are views exemplarily illustrating an original object ID, generation number added compression type information entraining object ID and generation number added postscript type information entraining object ID, respectively;

DETAILED DESCRIPTION OF THE INVENTION

First Embodiment

A switch device of a first embodiment of the present invention will first be described.

Figure 1:
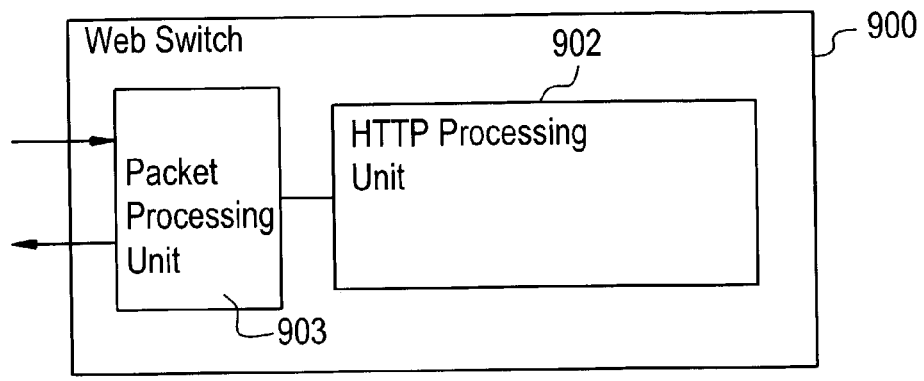
FIG. 1 is a block diagram illustrating a function of a web switch.
Figure 2:
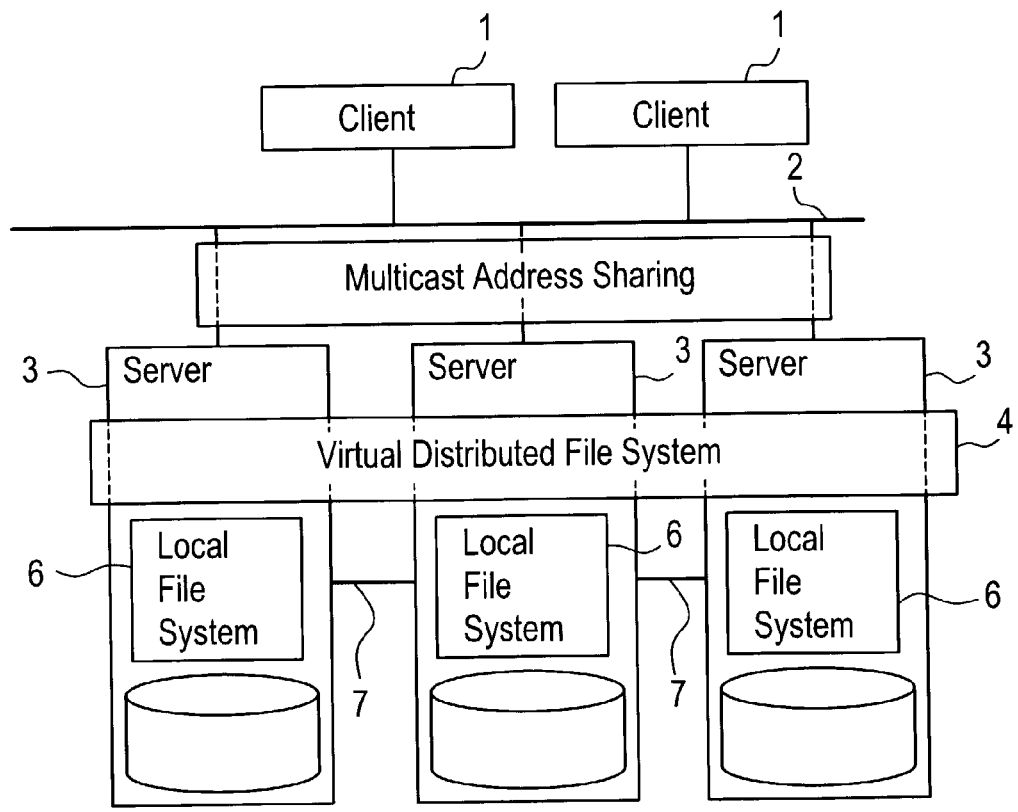
FIG. 2 is a block diagram illustrating the arrangement of a system that executes a method disclosed in JP P2001-51890A.
Figure 3:
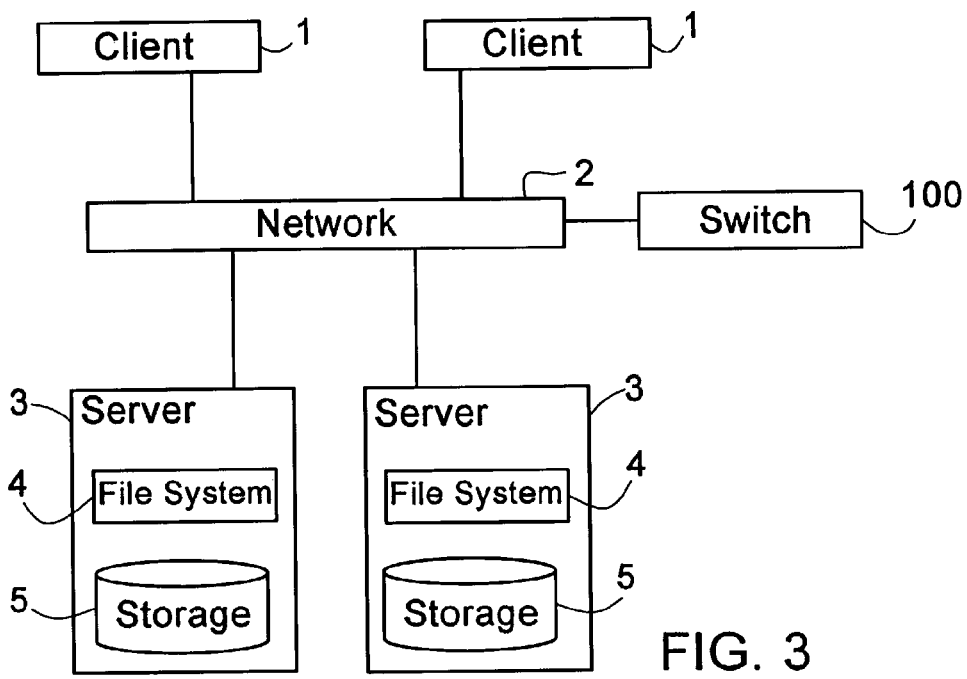
FIG. 3 is a block diagram of a network file system being a remote file system of a client/server type in which a switch device according to a first embodiment of the present invention is provided.

Referring to FIG. 3, a network file system that is a remote file system of a client server type in which a switch device of the first embodiment is provided is illustrated. As illustrated in FIG. 3, in the present network file system at least one client 1, at least one server 3, switch 100 that is one example of the switch device of the present embodiment are connected to network 2 that is a LAN (Local Area Network) or the Internet, etc. Each server 3 includes at least one file system 4 for managing data in a file or the like accessed by file access service and storage (or memory device) 5 for storing the foregoing data, and serves as a file server for providing file access service to each client 1.

Although in FIG. 3, client 1, server 3, and switch 100 are connected with the same network 2, switch 100 is logically disposed between each client 1 and each server 3. In such a remote file system, all file access operations comprise a file access request transmitted from client 1 and a reply replied from server 3 for the file access request, and no request from server 3 is outputted. The file access request is generally a request with an NFS protocol, provided that it is a system with Unix® or its derivative for example.

In the file access request transmitted from client 1 an object ID is contained for the purpose of identifying objects of a directory and a file being access objective. Client 1 accesses to an object managed by server 3 by specifying an object ID for identifying an object such as a directory and a file in a file access request. The object ID is generated by server 3, and client 1 has a list of objects accessible in the first place. Client 1 first transmits request data specifying an access path up to the object from the list, and obtains an object ID of an object accessible first from reply data of server 3. For an object disposed at a lower rank of the object already obtaining the object ID, client 1 transmits the already obtained object ID and request data for specifying the name of an object to be file accessed, and obtains the object ID from reply data thereof. Otherwise, client 1, unless it receives the reply data from server 3 and obtains an object ID contained in the reply data, can not operate an object bring into correspondence to the object ID.

In the network file system, existence of server 3 is hidden from client 1 by switch 100, and a file access request from the client 1 is transmitted to the switch 100. Switch 100 receives the file access request transmitted from client 1, and distributes and transfers (routes) the file access request to proper server 3, receives a reply for the foregoing file access request transmitted from server 3, and transfers (routes) the reply to client 1 that transmitted the file access request.

Switch 100 analyzes an object ID contained in a file access request when it receives the file access request from client 1, and determines server 3 to which the file access request should be transferred among a plurality of servers 3 on the basis of an analysis result, and further transmits the file access request to that server 3. Since however an object ID generated in server 3 is constructed with a data train which only server 3 that generated the data train can interpret, that data can not be interpreted by switch 100 and client 1. Further, there is the possibility that object IDs have the same data trains in different servers 3. For this reason, unless the situation is changed, switch 100 could not execute routing proper for the file access request. Furthermore, client 100, unless it receives reply data from server 3 and obtains an object ID contained in the reply data as described previously, fails to operate the object bring into correspondence to that object ID.

Hereupon, switch 100 inserts server identification information for identifying a server of a transmission source from other servers into an object ID contained in reply data transmitted from server 3, reconstructs a packet with use of reply data which contains the object ID into which the server identification information is inserted, and further transfers the resulting packet to client 1 with such an arrangement, client 1 transmits a file access request containing an object ID into which server identification information is inserted to switch 100, and switch 100 can then specify a server to which the file access request should be transferred with reference to the server identification information inserted in the object ID. Switch 100 should convert upon transferring a file access request to server 3 the object ID into which the server identification information is inserted to an original object ID generated by server 3 with provision of such switch 100 there is ensured a distributed processing by a plurality of servers in a network file system.

Figure 4:
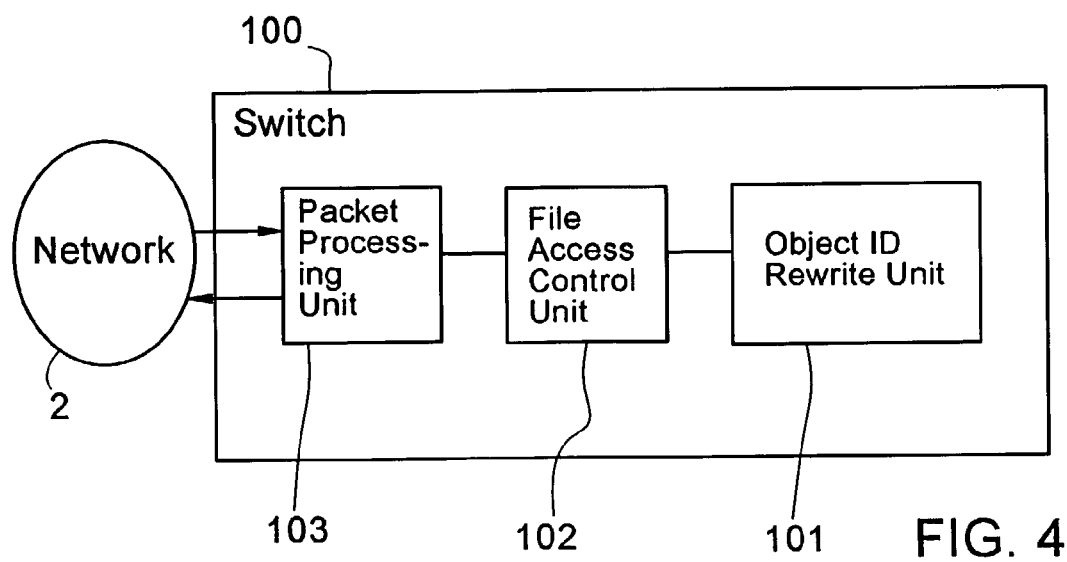
FIG. 4 is a block diagram illustrating the arrangement of the switch device of the first embodiment.

Referring here to FIG. 4, the arrangement of switch 100 is illustrated. Switch 100 includes object ID rewrite unit 101, file access control unit 102, and packet processing unit 103. Packet processing unit 103 analyzes a packet received from client 1 and server 3 through network 2, outputs data contained in the packet to file access control unit 102, and further converts data outputted from the file access control unit 102 into a packet and transmits it to client 1 and server 3 mediating network 2. File access control unit 102 inputs and analyzes data outputted from packet processing unit 103, and determines a destination of the packet by packet processing unit 103. Object ID rewrite unit 101 rewrites an object ID contained in the foregoing data in response to a destination of a packet determined by file access control unit 102.

Figure 5:
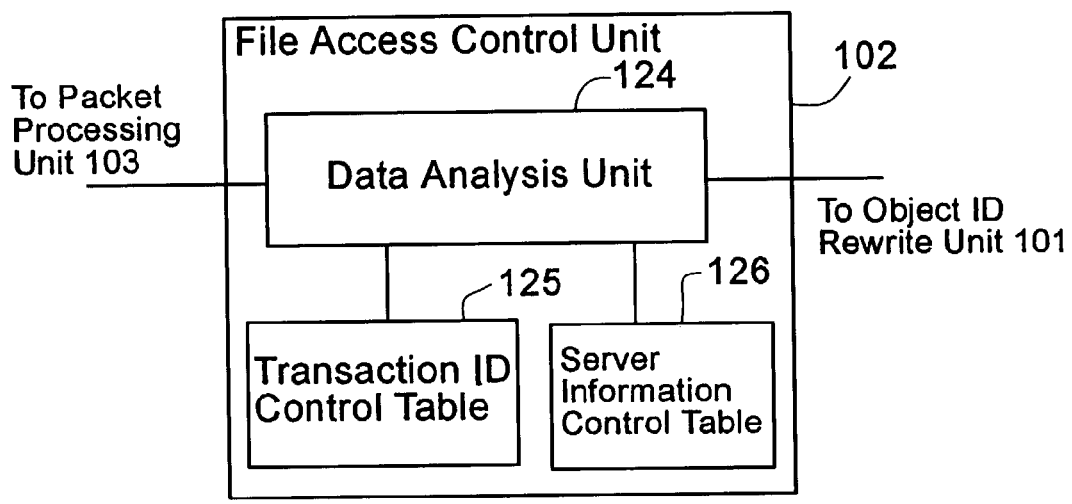
FIG. 5 is a block diagram illustrating the arrangement of a file access control unit.
Figure 6:
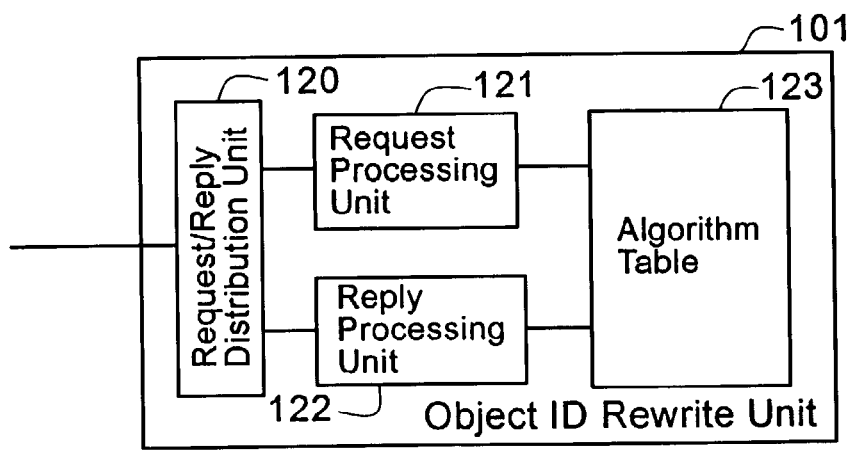
FIG. 6 is a block diagram illustrating the arrangement of an object ID rewrite unit.

Referring to FIG. 5, the arrangement of file access control unit 102 is illustrated. File access control unit 102 includes data analysis unit 124, transaction ID control table 125, and server information control table 126. Data analysis unit 124 analyzes request data and reply data and determines a proper destination of a received packet. In transaction ID control table 125 there is registered a transaction ID which associates respective request and reply data and is provided to discriminate individual request and reply data in client 1 and server 3. In server control table 126 there are entered a combination of server identification information and address information of a server such as an IP address and a MAC address of server 3, Referring to FIG. 6, an arrangement of object ID rewrite unit 101 is illustrated. Object ID rewrite unit 101 includes request/reply distribution unit 120, request processing unit 121, reply processing unit 122, and algorithm table 123. Request/reply distribution unit 120 distributes when data transmitted from file access control unit 102 is request data, that data to request processing unit 121 while distributing, when the same is reply data, that data to reply processing unit 122. In algorithm table 123 there is registered how to rewrite data. Request processing unit 121 and reply processing unit 123 rewrite an object ID on the basis of how to reply registered in algorithm table 123, and transmits the written object ID to request/reply distribution unit 120. Request/reply distribution unit 120 transmits the written object ID to the file access control unit 102.

Object ID Format:

Referring here to FIGS. 7A to 7C, a format of an object ID rewritten in object rewriting unit 101 is exemplarily illustrated.

Illustrated in FIG. 7A is an object ID generated by server 3, i.e., original object ID 150. Original object ID 150 has different definitions of data lengths depending upon the kinds and versions of network file access protocols such as NFS. More specifically, for original object ID 150 there are known ones having fixed data lengths, and ones where only maximum data lengths are determined and are variable within a range of the maximum data lengths.

Referring then to FIG. 7B, a format of an information entraining object ID which is an object ID with fixed data length, and into which server identification information 154 and algorithm identification information 153 are inserted with the aid of object rewrite unit 101. The information entraining object ID, since its data length is fixed, even if server identification information 154 and algorithm identification information 153 are inserted, the entire data length is fixed, i.e., it must be the same data length as original object ID 150. Accordingly, object ID rewrite unit 101 upon generating the information entraining object ID, deletes part of original object ID 150 illustrated in FIG. 7A into compression data 152, and adds server identification information 154 and algorithm identification information 153 to the head of the same. Algorithm identification information 153 is information for identifying a deletion algorithm use by object ID write unit 101 upon the part of original object ID 150 being deleted. The information entraining object ID rewritten as such is called compressed information entraining object ID 151.

Referring further to FIG. 7C, an information entraining object ID which is an object ID having a variable data length and into which server identification information and algorithm identification information are inserted. In the information entraining object ID, data of original object ID 150 is not deleted, but server identification information 154 and algorithm identification information 153 are added thereto. Such an information entraining object ID is called additionally added information entraining object ID 155. Even if the data length thereof is variable, if it exceeds a maximum data length, compression information entraining object ID 152 is generated in object ID rewrite unit 101 instead of additional information entraining object ID 155.

Server identification information 154 and algorithm identification information 153 illustrated in FIG. 7B and server identification information 154 and algorithm identification information 153 illustrated in FIG. 7C are desirable to be the same in data lengths, respectively, and server identification information 154 and algorithm identification information 153 are desirable to be set at the same data positions, respectively. The size of the object ID is large and is about 32 bite in an NFS version 2 protocol generally, and may change the foregoing size in NFS version 3. For this reason, time is required to extract information having various data lengths and data positions thereamong. It is therefore desirable to make those data same data length and same data position for extracting and retrieving each identification information contained in the information entraining object ID.

Referring to FIG. 8, the arrangement of algorithm table 123 is illustrated. Algorithm table 123 is a table having an entry constituted by a set of algorithm identification information 153, delete data 156 that is an example of restored information, and delete data position 157 that is an example of the restoring information. With reference to this table then request processing unit 121 can restore compression data 152 to original object ID 150 with use of delete data 156 and delete data position 157. In algorithm table 123, an entry not including information concerning delete data 156 and delete data position 157 is an entry of the additional type information entraining object ID where server identification information 154 and algorithm identification information 153 are added to original object ID 150 without generating compression data 152.

When original object ID 150 is generated with a predetermined generation rule in server 3, original object ID 150 is an ID where a data train is periodic, i.e., an ID where the same bit train is generated at the same position in each original object ID 150. In such a situation, it is possible to reduce the number of entries of algorithm table 123 by a method where delete data 156 and delete data position 157 are made equal to each other, and the same algorithm identification information 153 is employed.

Operation Upon Reception of Request Packet:

In the following, there will be described procedures of the operation in switch 100 where after a request packet sent from client 1 is received, a proper server is selected from a plurality of servers 3, and a packet is transmitted to that server.

Packet processing unit 103 once receiving the request packet transmitted from client 1, extracts file access request data, client IP address information 160 of client 1, and client MAC address information 161 from that packet, and transmits those data to file access control unit 102.

Data analysis unit 124 of file access control unit 102 once receiving those data, analyzes the file access request data, and extracts compression type information entraining object ID 151 or postscript type information entraining object ID 155.

Data analysis unit 124 extracts server identification information 154 contained in compression type information entraining object ID 151 or postscript type information entraining object ID 155, and reads server IP address information 158 and server MAC address information 159 of server 3 bring into correspondence to server identification information 154 with reference to server information control table 126 illustrated in FIG. 9.

In the file access request data there i's contained transaction ID 160 for discriminating respective request data. Data analysis unit 124 registers in transaction ID control table 125 illustrated in FIG. 10 transaction ID 160, client IP address information 161 and client MAC address information 162 received from packet control unit 103, file access instruction information 163 such as read and write contained in the file access request data, and server identification information 154.

Thereafter, data analysis unit 124 transmits compression type information entraining object ID 151 or postscript type information entraining object ID 155 to object ID rewrite unit 101 together with an information entraining object ID write instruction. These object IDs are, after being converted to original object ID 150 in object ID rewrite unit 101, again transmitted to file access control unit 102.

File access control unit 102 assembles original object ID 150 into the file access request. Reconstructed file access request data in file access control unit 102, and server IP address information 158 of server 3 specified by retrieving server information control table 126, and MAC address information 159 are transmitted to packet processing unit 103. Packet processing unit 103 reconstructs those information as a request packet, and transmits the resulting packet to server 3.

Operation of Object ID Rewrite Unit Upon Reception of Request Data:

Successively, there will be-described procedures of the operation in object ID rewrite unit 101 upon restoring compression type information entraining object ID 151 or additional description type information entraining object ID 155 contained in the request data from client 1 to original object ID 150.

Once receiving, after analysis of the request data, compression type information entraining object ID 151 or postscript type information entraining object ID 155, and an information entraining object ID rewrite instruction transmitted from file access processing unit 102, request/reply distribution unit 120 transmits the received compression type information entraining object ID 151 or postscript type information entraining object ID 155 to request processing unit 121 based upon the information entraining object ID rewrite instruction.

Request processing unit 121 specifies delete data 156 and delete data position 157 of an entry bring into correspondence to algorithm identification information 153 contained in the received information entraining object ID with reference to algorithm 123, and generates original object ID 150 based upon the foregoing specified data, and further transmits original object ID 150 generated in file access control unit 102 via request/reply distribution unit 120.

Operation Upon Reception of Reply Packet:

Successively, there will be described procedures of an operation in switch 100 upon transferring the reply packet transmitted from server 3 by selecting a proper client from a plurality of clients 1. Packet processing unit 103 extracts reply data, and server address information such as server IP address information 158 or server MAC address information 159 of server 3 from the reply packet from the received server 3, and transmits it to file access control unit 102.

Data analysis unit 124 of file access control unit 102 refers to server control table 126, retrieves an entry having an equal value to server IP address information 158 or server MAC address information 159, and obtains server identification information 154 of the entry. Further, data analysis unit 124 extracts transaction ID 160 contained in reply data by analyzing the reply data, and retrieves an entry where server identification information 154 and transaction ID 160 are coincident with each other, and further obtains client IP address information 161, client MAC address information 162, and file access instruction information 163 of client 1 that transmits a file access request corresponding to received reply data.

There is also an occasion where in the reply packet from server 3 no object ID is contained. In a protocol and a version of a specific file access service there is an occasion where file access instruction information is not demonstrated in reply data, so that data analysis unit 124 can judge whether or not the original ID is contained in the reply data using file access instruction information 163 to specify the kind of the instruction to which the reply data corresponds.

When original object ID is contained in the reply data, data analysis unit 124 transmits a definition method for data length, server identification information, and an original object rewrite instruction to object ID rewrite unit 101 together with original object ID 150. Object ID rewrite unit 101 rewrites the received original object ID to compression type information entraining object ID 151 or postscript type information entraining object ID 155, and data analysis unit 124 reconstructs the reply data. Data analysis unit 124 does not alter the reply data when no original object ID is contained in the reply data. Thereafter, data analysis unit 124 transmits client IP address information 161, client MAC address information 162, and reply data to packet processing unit 103. Packet processing unit 103 generates a reply packet, and transmits the reply packet to client 1.

Figure 11:
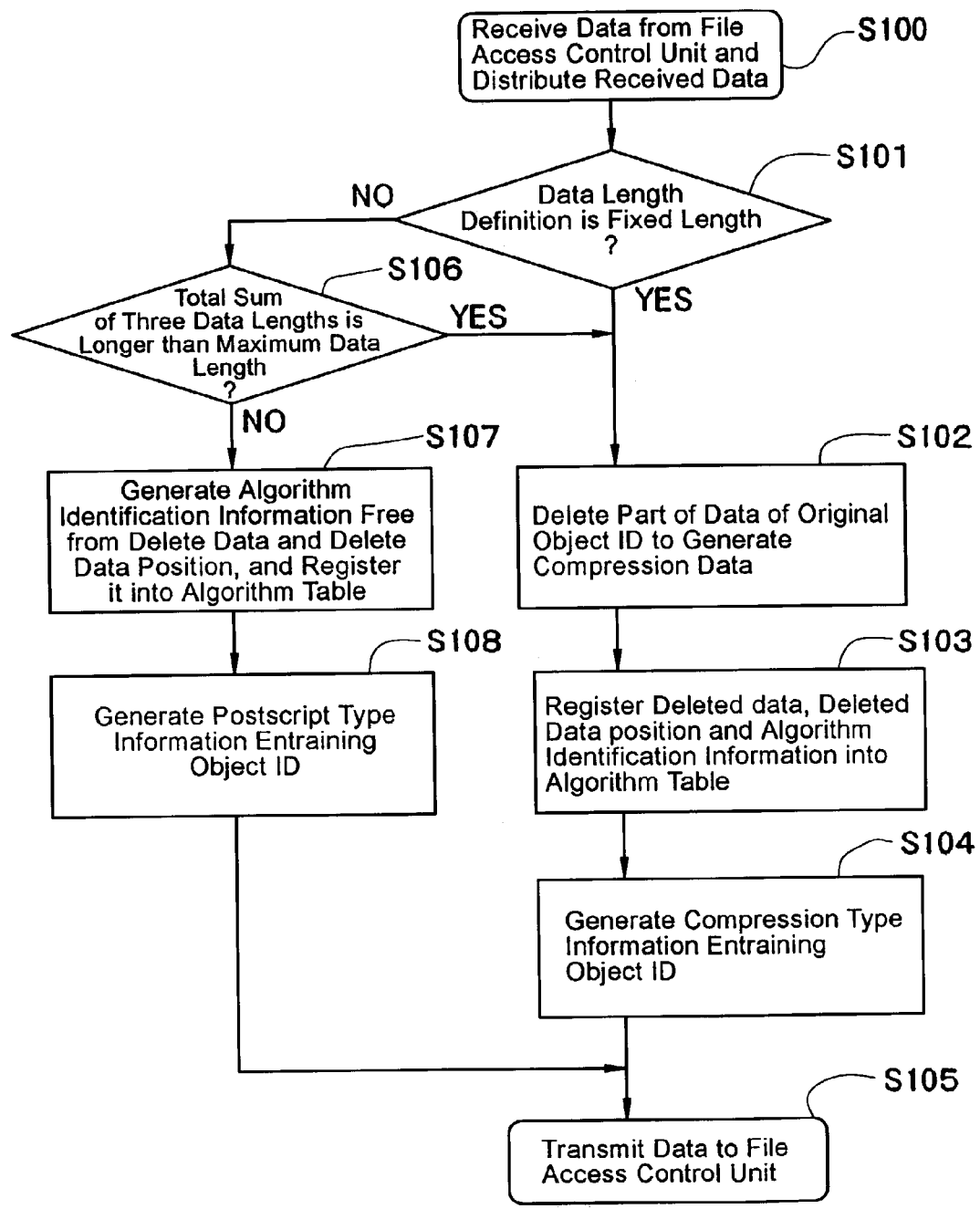
FIG. 11 is a flowchart illustrating the operation of an object rewrite unit upon reply data being received.

Operation of Object Rewrite Unit Upon Reception for Reply Data:

Referring to FIG. 11, a flowchart for illustrating the operation of object rewrite unit 101 upon reception of the reply data. As illustrated in FIG. 11, request/reply distribution unit 120, once receiving in step S100 original object ID 150 as well as the definition method for data length, server identification information, and original object rewrite instruction contained in the reply data from file access control unit 102, distributes all the received data to reply processing unit 122.

Reply processing unit 122, in step 101, judges the definition method for the received data, and checks whether or not the data length of the original object ID is fixed length. In the case of the fixed length, reply processing unit 122, in step S102, generates compression data by deleting part of a data train of the original object ID, and in step S103, registers deleted data 156, deleted data position 157, and algorithm identification information 153 provided to discriminate the deleted algorithm in algorithm table 123.

After the registration into algorithm table 123 is finished, reply processing unit 122, in step S104, generates the compression type information entraining object ID 151 by combining server identification information 154, algorithm identification information 153, and compression data 152, and in step S105 transmits compression type information entraining object ID 151 thereof to file access control unit 102 mediating request/reply distributing unit 120.

In contrast, in step S101, in the case where the data length of original object ID 150 is not fixed length, reply processing unit 122, in step S106, calculates the total sum of three data lengths of server identification information 154, algorithm identification information 153, and original object ID 150, and calculates a resulting calculated value and the defined maximum data length. Herein, in the case where the total sum of the three data lengths is longer than the maximum data length, reply processing unit 122 executes processings in the same procedures as in the case of the data length being a fixed length shown in steps S102 to S105.

In the case where the total sum of the three data lengths is shorter than the maximum data length in step S106, reply processing unit 122, in step S107, generates algorithm identification information 153 as an entry where information of delete data 156 and delete data position 157 is not registered, and registers them in algorithm table 123. Thereafter, reply processing unit 122, in step S108, after the registration into algorithm table 123, generates postscript type information entraining object ID 155 by combining server identification information 154, algorithm identification information 153, and original object ID 150, and transmits, in step S105, postscript type information entraining object ID 155 to file access control unit 102 mediating request/reply distribution unit 120.

In the switch device of the present embodiment, when an object is divided in the export unit for a plurality of objects exported to the public in server 3, i.e., in the common object unit, ID items in the common object unit for identifying whether or not the objects are contained in the common object unit may be added as an entry of server information control table 126. With such an arrangement, switch 100 can grasp not only server 3 for containing an object but also the common object unit containing an object, so that it is possible in switch 100 to realize very fine transfer control in the common object unit having a further higher resolution than in the server unit.

Second Embodiment

In the following, a switch device of a second embodiment according to the present invention will be described. The switch device is one used in a network file system illustrated in FIG. 3 as the switch device of the first embodiment.

Figure 12:
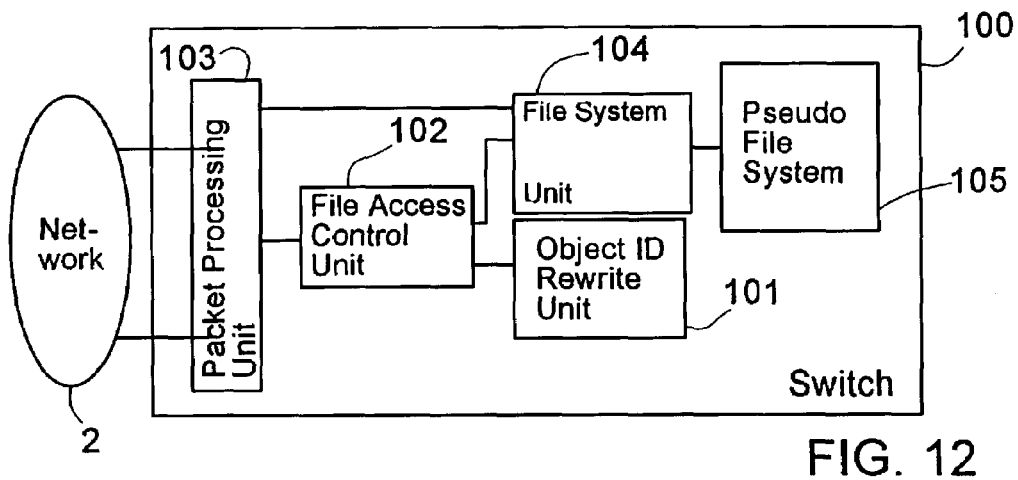
FIG. 12 is a block diagram illustrating the arrangement of a switch device according to a second embodiment of the present invention.

Referring to FIG. 12, an arrangement of the switch device of the second embodiment is illustrated. Switch device 100 comprises object ID rewrite unit 101, file access control unit 102 and packet processing unit 103 which are provided in the switch according to the first embodiment, and pseudo file system 105. Pseudo file system 105 is a system for managing a plurality of directory trees constituted with file systems 4 of a plurality of servers 3 in combination as one integrated directory tree. File system control processing unit 104 executes a control processing when a file access request from client 1 needs a file access over a plurality of destinations such as the plurality of servers 3 or a plurality of file systems 4.

Figure 13:
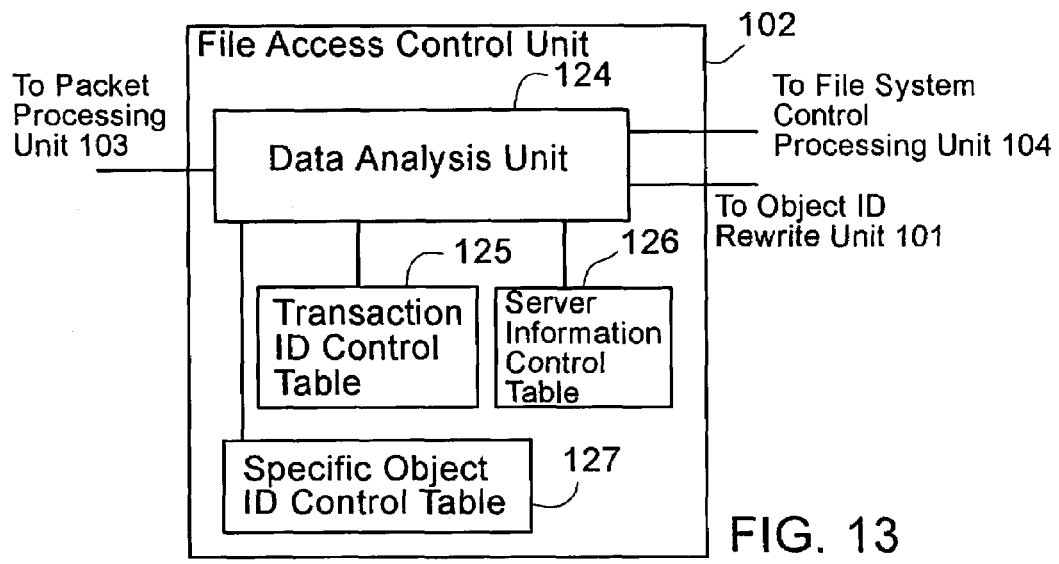
FIG. 13 is a block diagram illustrating the arrangement of a file access control unit in the switch device of the second embodiment.

Referring to FIG. 13, an arrangement of file access control unit 102 in the present switch device is illustrated. File access control unit 102 comprises data analysis unit 124 provided in the switch device in the first embodiment, a transaction ID control table 125, server information control unit 126, and specific object ID control table 127. Specific object ID control table 127 is a table for judging a file access request from client 1, which requires a file access to a plurality of destinations of the plurality of servers 3 or the plurality of file systems 4. Data analysis unit 124 in the switch device in the present embodiment is capable of not only data input/output with object ID rewrite unit 101 and packet processing unit 103, but also of data input/output with file system control processing unit 104.

In the following, the operation of switch 100 will be described. Similar to the switch device in the first embodiment, the present switch device has a function of properly distributing the request packet and the reply packet to client 1 or server 3. Furthermore, the present switch device has a function of acting as an accessing only to pseudo file system 105 in switch 100 without client 1 taking care of the existence of individual file systems 4 in the plurality of servers 3 by integrating a plurality of directory trees formed on pseudo file system 4 of a plurality of servers 3 to a directory tree of pseudo file system 105.

Pseudo file system 105 freely combines on pseudo file system 105 tree structures in a plurality of directory trees on file system 4 exported to the public as being accessible through network 2 by server 3, and maps it to one directory tree.

Switch 100 not only distributes a file access request packet received from client 1 to a specific server 3, but also transmits, when receiving a file access request to stride a plurality of servers 3 or different file systems 4, one file access request to the plurality of servers 3 or file systems 4 by dividing the one file access request to a plurality of file access requests, and reconstructing all reply data transmitted from the plurality of servers 3 or file systems 4 to one reply data therein to transmit it back to client 1.

Figure 14:
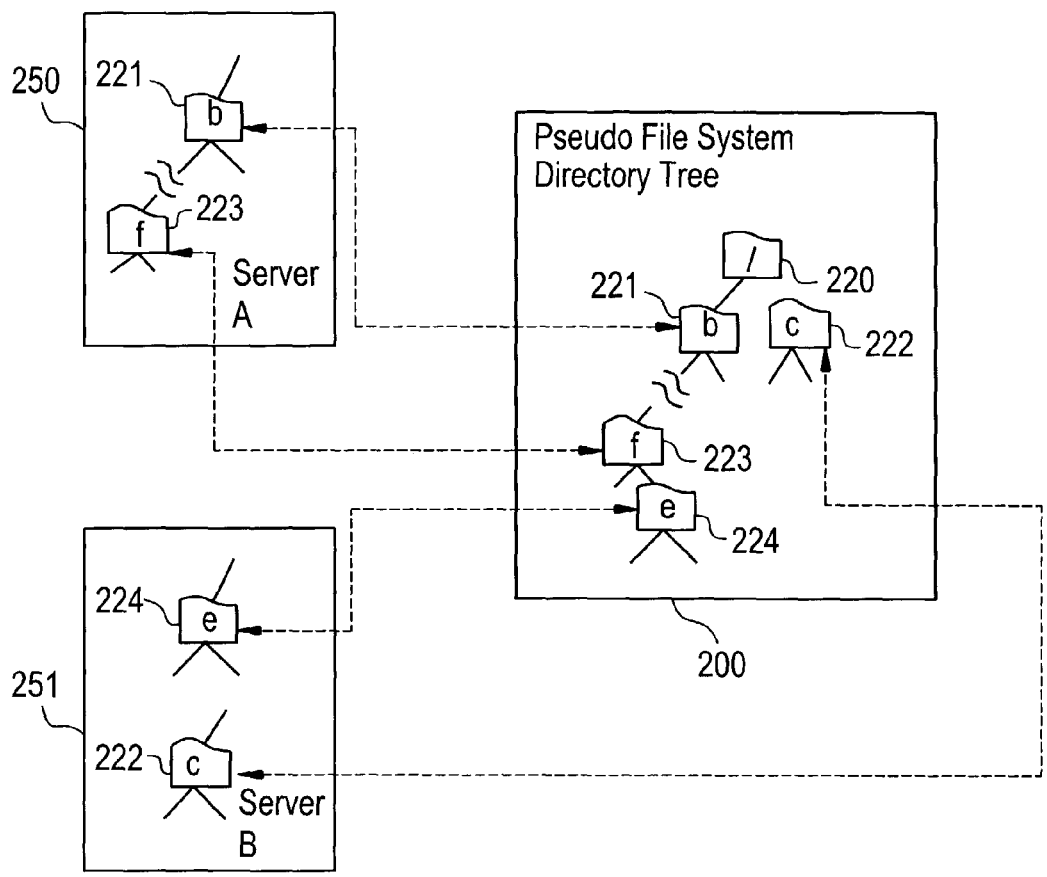
FIG. 14 is a view exemplarily illustrating a directory tree of a pseudo file system.

Referring to FIG. 14, directory tree 200 of pseudo file system 105 is exemplarily illustrated. Pseudo file system 105 maps a tree structure of a directory tree from directory b (221) exported to the public in server A (250) and directory c (221) exported to the public in server B (251) as a directory tree from a sub directory of root directory 220 formed on pseudo file system 105. Pseudo file system 105 generates pseudo file system directory tree 200 by registering a tree structure of a directory tree from directory e (224) exported to the public in server B (251) as a directory tree from a sub directory of directory f (223) existent on a lower layer of a directory tree from directory b (221).

In the switch device of the present embodiment, a directory name on pseudo file system directory tree 200 is not necessarily the same as a directory name set in file system 4 of server 3, and another directory name may be set and exported to client 1.

Pseudo file system 105 manages only a tree structure of directory tree 200 of pseudo file system 105, and for tree structures other than data of an object, attribute information, and tree structures other than joint portions between respective file systems 4 the server 3 manages all of them. Accordingly, in switch 100, there is performed a name solving processing only for a tree portion that couples a plurality of file systems 4, and other tree portions are processed in server 3, With such an arrangement a load of the name solving processing can be distributed between switch 100 and server 3.

Switch 100, when it receives a file access request packet using an object ID bring into correspondence to directory f (223) that is an instruction for obtaining an object ID and attribute information bring into correspondence to directory e (224) for example, generates a new request packet to reply correctly to that instruction, and transmits the request packet to server A (250) for storing data of directory f (223) and server B (251) for storing data of directory e (224). Pseudo file system 105 is used as control information for executing reconstruction processing for two reply packets returned from server A (250) and server B (251).

Switch 100, excepting the case where a correct reply can not be returned unless there is executed such a control processing as sending request data to a plurality of servers 3 or file systems 4 on the basis of a file access request from client 1, executes the processing in the same procedures as those in the switch of the first embodiment, and judges which processing should be executed with the aid of specific object ID control table 127 of file access control unit 102.

Figure 15:
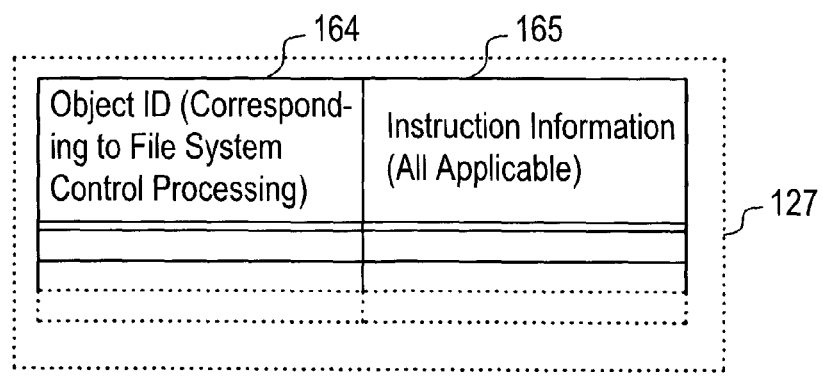
FIG. 15 is a view illustrating the arrangement of a specific object ID control table.

Specific object ID control table 127 is constructed as illustrated in FIG. 15 with an entry comprising object ID 164 of all directories bring into correspondence joints for trees existent on the different servers 3 of the directory tree such as directory b (221) and directory e (224) and all file access instruction information 165 which should undergo the control processing. In specific object ID control table 127 there are registered at the time directory tree 200 of pseudo file system 105 is generated all bring into correspondence directories. Object ID 164 registered in specific object ID control table 127 is an information entraining object ID, i.e., compression type information entraining object ID 151 or postscript type information entraining object ID 155 in order to collate an information entraining object ID contained in request data transmitted from client 1. Hereby, collating time can be reduced.

Figure 16:
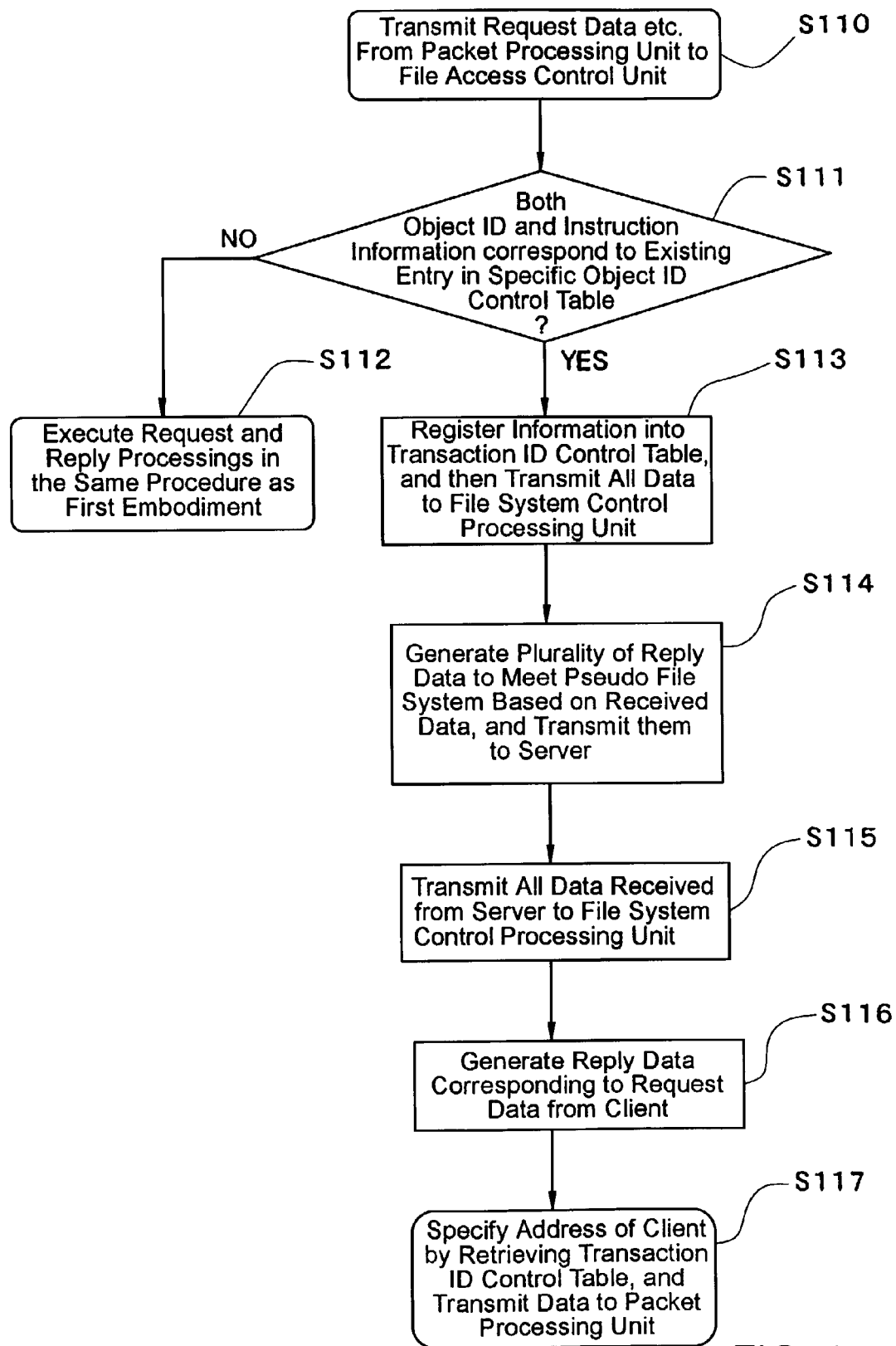
FIG. 16 is a flowchart illustrating the operation of the switch device of the second embodiment.

In the following, procedures for the operation in switch 100 when a request packet from client 1 and a reply packet from server 3 are received will be described in detail using FIG. 16.

Packet processing unit 103, once receiving a file access request packet from client 1, extracts, in step S110, file access request data, client IP address information 160 and client MAC address information 161 of client 1 from the packet, and transmits it to file access control unit 102.

Data analysis unit 124 of file access control unit 102 extracts, in step S111, instruction information such as read and write contained in the received request data, compression type information entraining object ID 151 or postscript type information entraining object ID 155, and checks whether or not ones bring into correspondence to them is existent in an entry of object ID 164 and instruction information 165 registered in specific object ID control table 127. When there is existent nothing bring into correspondence to even any one of two data of instruction information extracted from the request data and information entraining object ID 151 or 155 in specific object ID control table 127, for a processing concerning a request packet in switch 100 described later and a processing concerning a reply packet bring into correspondence to the request packet they are executed, as shown in step S112, in the same procedure as in the switch device of the first embodiment.

In contrast, in step S111, when both two data of instruction information taken out from the request data and object ID 151 or 155 bring into correspondence to an entry of specific object ID control table 127, data analysis unit 124, in step S113, transmits, after registering required all data in transaction ID control table 125, the received request data to file system control processing unit 104. Thereafter, file system control processing unit 104 executes analysis for the received request data with reference to pseudo file system 105 in step S114, and then generates a plurality of the request data transmitted to the plurality of servers 3 or file systems 4, and further transmits all the request packets to a plurality of or one associated servers 3 through packet control unit 103. It is herein noted that the transmission of all the request packets to the one server 3 in step S114 is limited to the situation where server 3 includes a plurality of file systems 4, and mapping of the arrangement of directory tree 200 on pseudo file system 105 is constructed by joining the respective file systems 4.

After execution of step S114, packet processing unit 103 of switch 100, once receiving a reply packet for a request packet transmitted to server 3 in step S115, extracts reply data and address information 158, 159 of server 3 from its reply packet, and transmits them to file system control processing unit 104. File system control processing unit 104, when the reply data contains original object ID 150, transmits a rewrite instruction of the object ID, original object ID 150, and address information 168, 159 of server 3 to file access control unit 102.

In succession, file access control unit 102 transmits, in step S116, original object ID 150 contained in all the received reply data to object ID rewrite unit 101, and in the same fashion as in the first embodiment forces object ID rewrite unit 101 to rewrite compression type information entraining object ID 151 or postscript type information entraining object ID 155, and generates reply data for the request data from client 1 using all the received reply data. Thereafter, file access control unit 102 retrieves in step S117 an entry that is coincident with data registered in transaction ID control table 125, and after obtaining address information of client 1 transmits the reply data and the address information to client 1.

Packet processing unit 103 generates a reply packet based upon the received reply data and the address information of client 1, and transmits the reply packet to client 1.

Third Embodiment

In the following, a switch device of a third embodiment of the present invention will be described. The switch device of the present embodiment is applied to the network file system illustrated in FIG. 3 as in the first and second embodiments.

Figure 17:
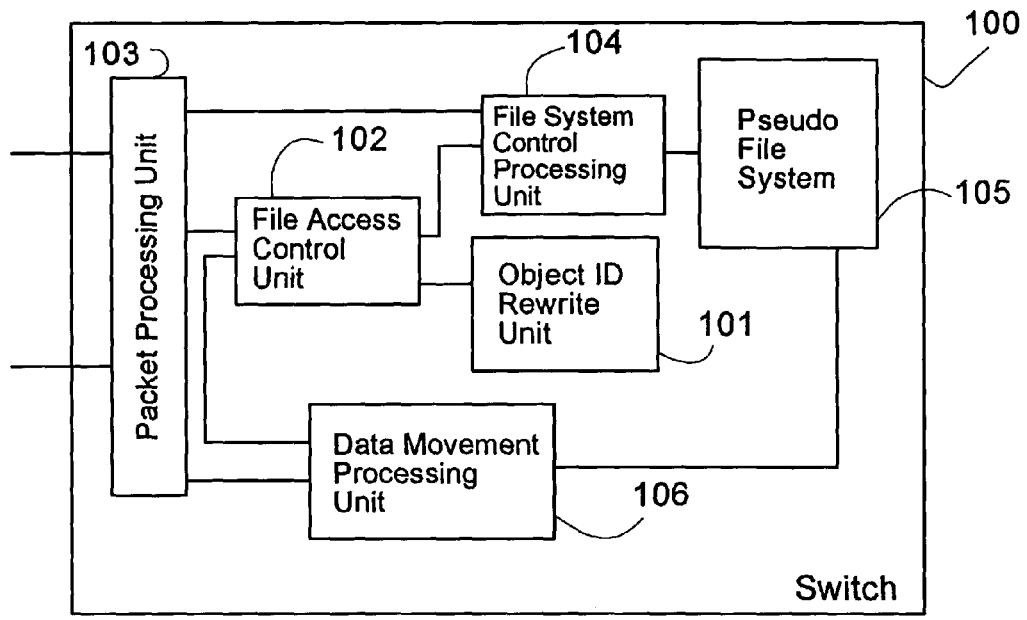
FIG. 17 is a block diagram illustrating the arrangement of a switch device according to a third embodiment of the present invention.

Referring to FIG. 17, an arrangement of the switch device of the third embodiment will be described. Switch 100 includes object ID rewrite unit 101, file access control unit 102 and packet processing unit 103 which are provided in the switch device of the first and second embodiments, and the file system control processing unit 104 and pseudo file system 105 which are provided in the second embodiment, and further includes data movement processing unit 106. Data movement processing unit 106 moves data among a plurality of servers 3 without altering a directory structure of an integrated directory tree on pseudo file system 105 on the basis of a load of the file accessing processing of each server 3 and remaining capacity of storage 5.

Figure 18:
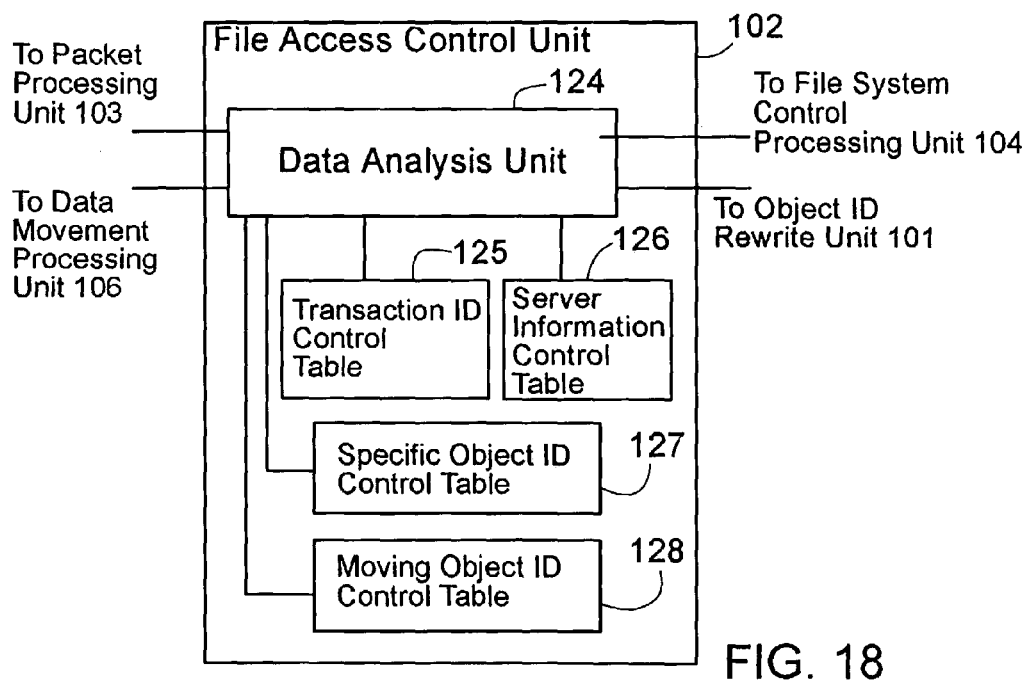
FIG. 18 is a block diagram illustrating the arrangement of a file access control unit in the switch device of the third embodiment.

Referring to FIG. 18, an arrangement of file access control unit 102 is illustrated. File access control unit 102 includes transaction ID control table 125 and server information control table 126 both provided in the switch devices of the first and second embodiments, and specific object ID control table 127 and moving object ID control table 128 both provided in the second embodiment. In moving object ID control table 128 there is entered information where any inconvenience due to alteration of an object ID generated when data is moved among a plurality of servers 3. In data analysis unit 124 there are ensured not only input/output operation of data among object ID rewrite unit 101, packet processing unit 103, and file system control processing unit 104 but also input/output operation of data with data movement processing unit 106.

In succession, the operation of the switch device of the present embodiment will be described. The switch device, besides a function provided in the switch devices of the first, second embodiments, copies to another server 3 a tree structure originating from an exported directory of each server 3 constituting an integrated directory tree constructed on pseudo file system 105 unchanged while keeping the tree structure of the integrated directory tree, and executing data movement, and thereafter masks the movement of the data from client 1 by altering mapping of the tree structure, and reduces insufficient capacity in storage 5 of server 3 and a load of the file access processing in each server 3 while keeping the arrangement of the integrated directory tree unchanged.

There is the need of alteration of even an object ID bring into correspondence to an object of each directory and file following the data movement among servers 3, so that in switch 100 an alteration history of the object ID before the data movement and after the data movement is controlled, and the operation of the data movement is masked from client 1 by preventing inconvenience due to the alteration of the object in client 1 and server 3 from happening.

Figures 19, 20:
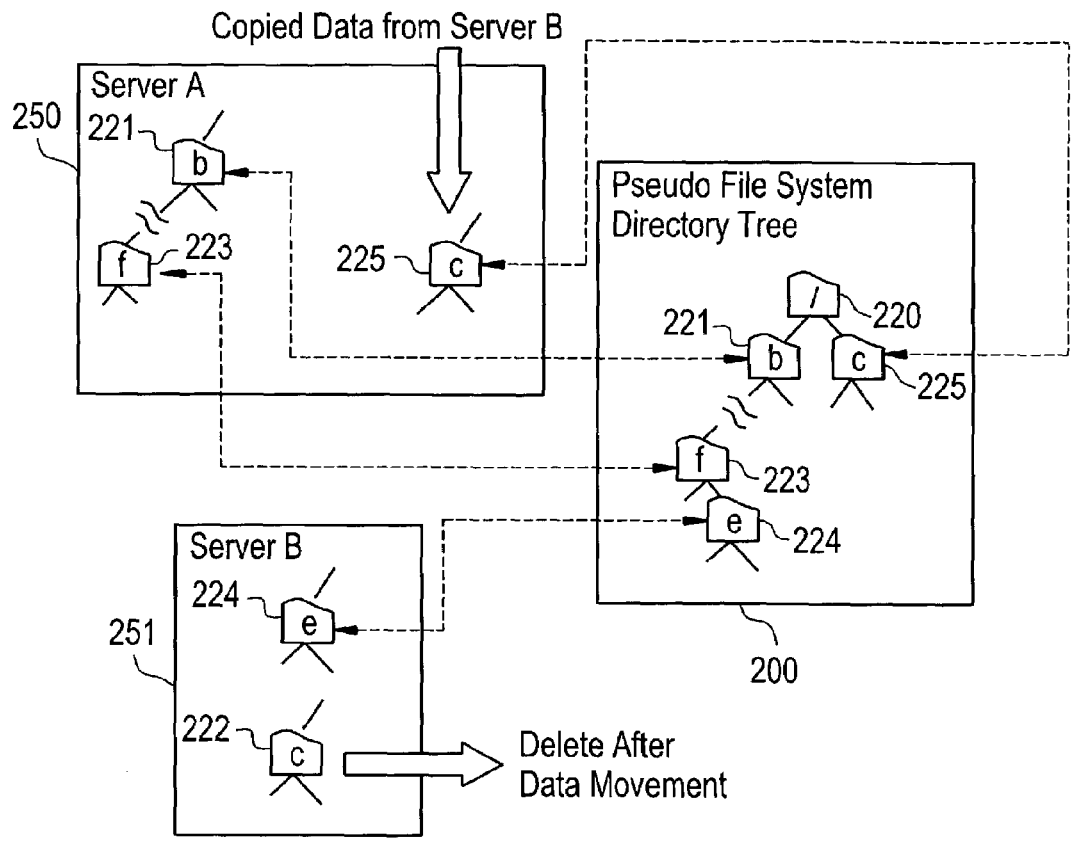
FIG. 19 is a view illustrating the movement of data.
FIG. 20 is a view illustrating the arrangement of a movement object ID control table.

In pseudo file system 105 illustrated in FIG. 14, for example, the situation is assumed that remaining capacity of the storage or memory device in server B (251) is a little, but remaining capacity of the storage or memory device in server A (250) is sufficient, and data in a directory tree from directory c (222) in server B(251), a possessor of the object, and attribute information such as an access right are desired to be copied into server A (250) for every tree structure. The switch device of the third embodiment after updating information of pseudo file system 105 such that a directory tree from directory c (225) is again mapped without changing the structure of directory tree 200 of pseudo file system 105 as illustrated in FIG. 19, and then deletes the data of the directory tree from directory c (222). Hereby, the switch device can increase the remaining capacity while masking the movement of the data to client 1, so that addition of any data is ensured in the directory tree from directory c (225) and the directory tree from directory e (224).

In the following, procedures of the operation of switch 100 concerning the data moving operation will be described. Data movement processing unit 106 monitors the data of the remaining capacities of storages 5 in all servers 3, and records history data concerning the file access request packet and the reply packet processed in switch 100. Data movement control unit 106, when the remaining capacity is more reduced than a previously set reference, and when file access requests are concentrated only to a specific server 3, refers to data registered in pseudo file system 105, determines a directory tree of a movement source and a movement destination, and starts copying the data.

Upon executing copying of the data, data movement processing unit 106, in order to deal with inconvenience when accessing data being an object of the movement data by making of information entraining object IDs 151, 155 already obtained by client 1, registers information entraining object IDs 151, 155 obtained by rewriting original object ID 150 generated by the movement source server 3 in object ID rewrite unit 101, original object ID 150 generated in the movement destination server 3, and server identification information 154 bring into correspondence to the movement destination server 3 registered in server information control table 126 in movement object ID control table 128 illustrated in FIG. 20 as information associated with all objects being objects for the movement of the data. Movement object ID control table 128 is constructed with an entry comprising information of movement source object ID 166, movement destination object ID 167, and movement destination server information 168.

When an object registered in movement object ID control table 128 is again moved, movement destination object ID 167 in movement object ID control table 128 is added to items of movement source object ID 166, and items of remaining movement destination object ID 167 and movement destination server information 168 are updated to the newest state.

As an object ID indicating an object in information registered in movement destination object ID 167, in which object the processing in file system control processing unit 104 might be required compression type information entraining object ID 151 and postscript type information entraining object ID 155 are registered instead of original object ID 150. Server identification information 154 is herein not registered in movement destination server information 168.

When after copying for all data is finished, and data of server 3 of the movement source is deleted, setting of the exported directory making possible a file access through network 2 to a directory tree subjected to copying in server 3 of the movement destination, data movement processing unit 106 sets the export directory to the movement destination server 3, updates mapping information of the tree structure in pseudo file system 105, and updates entry data registered in specific object ID control table 127.

Figure 21:
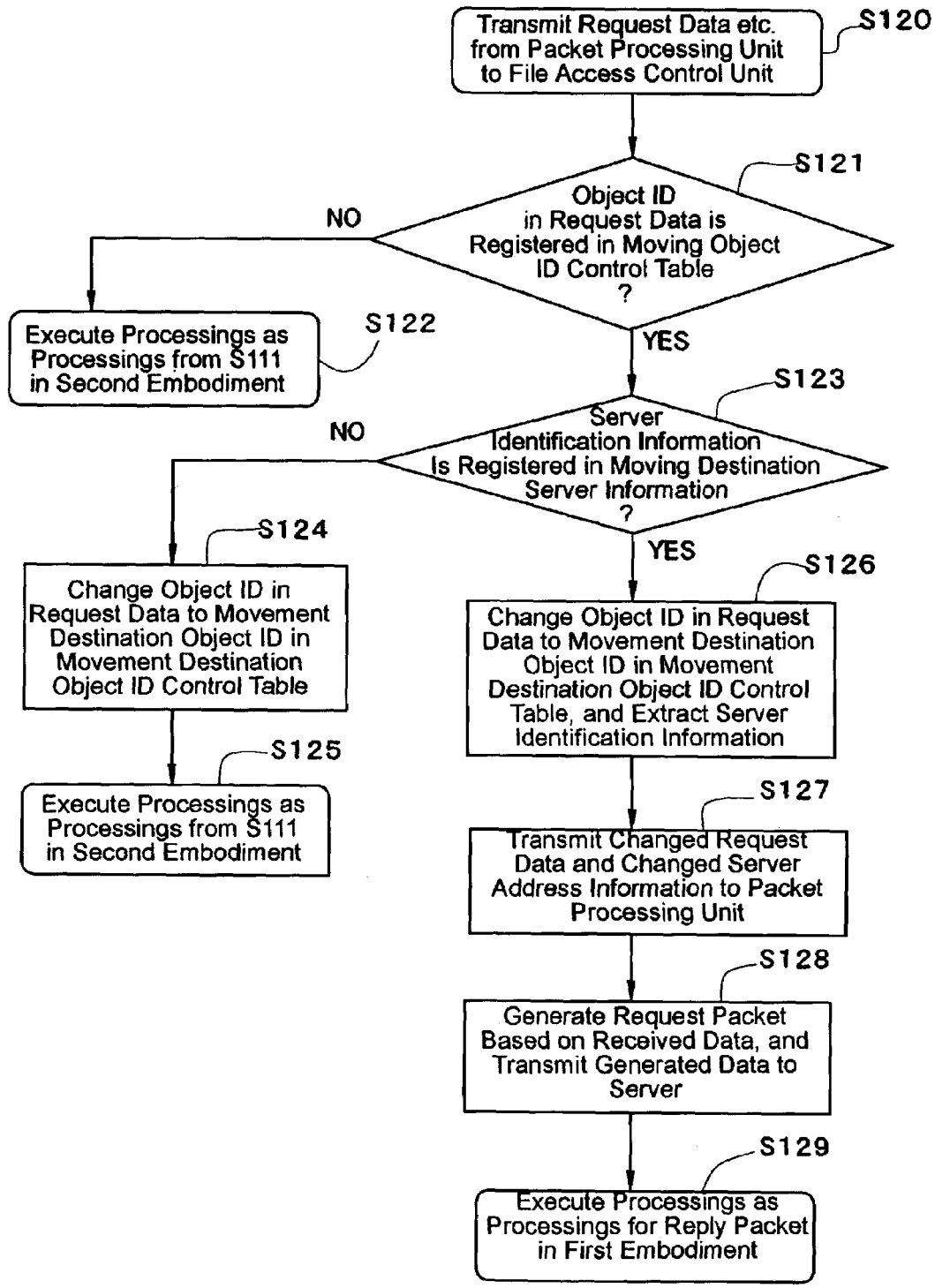
FIG. 21 is a flowchart illustrating the operation of the switch device when a packet is received; .

In the following, there will be described in detail processing procedures in switch 100 when after the data movement is executed, the request packet from client 1 and the reply packet are received. Referring to FIG. 21, a flowchart indicating the operation of switch 100 when the packet is received is illustrated.

Packet processing unit 103, once receiving a file access request packet from client 1, extracts,-in step S120, file access request data, client IP address information 160 and client access MAC address information 161 of client 1 from the packet, and transmits them to file access control unit 102.

Data analysis unit 124, in step S121, analyzes the received request data, extracts compression type information entraining object ID 151, or postscript type information entraining object ID 155, and confirms whether or not its ID is registered in movement object ID control table 128. When extracted compression type information entraining object ID 151 or postscript type information entraining object ID 155 is not registered as movement source object ID 166 of movement object ID control table 128, as described in step S122, processings concerning request data thereafter and reply data bring into correspondence the just-mentioned request data are executed in the same fashion as processings from step S111 of the second embodiment.

In contrast, when in step S121, extracted compression type information entraining object ID 151 or postscript type information entraining object ID 155 is registered as movement source object ID 166 in movement object ID control table 128, data analysis unit 124 checks, in step S123, whether or not server identification information 154 is registered in movement destination server information 168. When server identification information 154 is not registered in movement destination server information 168 as the result of the check, data analysis unit 124, in step S124, alters compression type information entraining object ID 151 or postscript type information entraining object ID 155 contained in the request data to compression type information entraining object ID 151 or postscript type information entraining object ID 155 registered in movement destination object ID 167.

A processing concerning the request data after the execution after step S124 and reply data corresponding to the request data are executed, as shown in step S125, in the same fashion as the processings from step S111 in the second embodiment.

When server identification information 154 is registered in movement destination server information 168 in step S123, data analysis unit 124 alters, in step 126, compression type information entraining object ID 151 or postscript type information entraining object ID 155 to original object ID 150 registered in movement destination object ID 167, and extracts server identification information 154 registered in movement destination server information 168. Thereafter, data analysis unit 124 after registering all information required for an entry of transaction ID control table 125 in step S127, extracts server IP address information 158 and server MAC address information 159 from server information control table 126 on the basis of server identification information 154 obtained from movement object ID control table 128, and transmits the request data altered to the original object ID 150, server IP address information 158, and server MAC address information 159.

In step S128, Packet processing unit 103 generates a request packet using data transmitted from file access control unit 102, and transmits it to server 3. The processing of switch 100 concerning the request packet from server 3 for the request packet is executed, as shown in step S129, in the same fashion as the processing for the reply packet in the switch of the first embodiment.

Fourth Embodiment

In the following, a switch device according to a fourth embodiment of the present invention will be described. The switch device is obtained by modifying the switch device of the third embodiment. In the switch device of the third embodiment is adapted such that when the number of objects where data is moved once is very large, the number of entries of movement object ID control table 128 in file access control unit 102 is also very large to result in the time for retrieving those entries is increased. Accordingly, in the switch device of the fourth embodiment, as illustrated in FIGS. 22A to 22C, data movement flag 169 indicative of a fact that the data is moved is assembled in the object ID together with algorithm identification information 153 and server identification information 154, and object ID rewrite unit 101, upon generating flag tagged postscript type information entraining object ID 171 or flag tagged postscript type information entraining object ID 172, truly sets data movement flag 169 concerning the object that is a target. In the switch device in the fourth embodiment, upon analyzing, in data analysis unit 124, flag tagged compression type information entraining object ID 171 or flag tagged postscript type information entraining object ID 172 contained in the request data from client 1, if data movement flag is true, and only in that case, data movement object ID control table 128 is retrieved. Hereby, in the switch device in the fourth embodiment, more effective retrieving processing than in the case with the switch device in the third embodiment.

Fifth Embodiment

In the following, a switch device according to a fifth embodiment of the present invention will be described. The switch device is a modification of the switch device in the third embodiment. In the switch device of the third embodiment, when the number of objects where data is moved at a time is very large, the number of entries of movement object ID control table 128 in file access control unit 102 becomes very large to result in the time to retrieve an entry increased. Accordingly, in the switch device in the fifth embodiment, a generation number is applied to data movement by assuming the data movement of one time to be one generation, and the generation is incremented one by one every time data movement of one time is finished. A present generation number is stored in data analysis unit 124, and in movement object ID control table 128 a table is prepared for each generation number. Further, in object ID rewrite unit 101, as illustrated in FIGS. 23A to 23C, assembles in the object ID data movement generation number 172 together with algorithm identification information 153 and server identification information 154, and generates generation number tagged compression type information entraining object ID 173 or generation number tagged postscript type information entraining object ID 174. Data analysis unit 124 retrieves, on the basis of a generation number obtained by analyzing in data analysis unit 124, generation number involving compression type information entraining object ID 173 or generation number involving postscript type information entraining object ID 174 contained in the request data from client 1, only a table of the foregoing generation number in movement object ID control table 128. Hereby, the switch device in the fifth embodiment is capable of more effective retrieving processing than in the switch device in the third embodiment.

Sixth Embodiment

In the following, a sixth embodiment of the present invention will described. It is assumed that as the switch one illustrated in FIG. 17 is employed. The directory tree of the pseudo file system according to the present invention will be described in a concrete manner.

Figure 24:
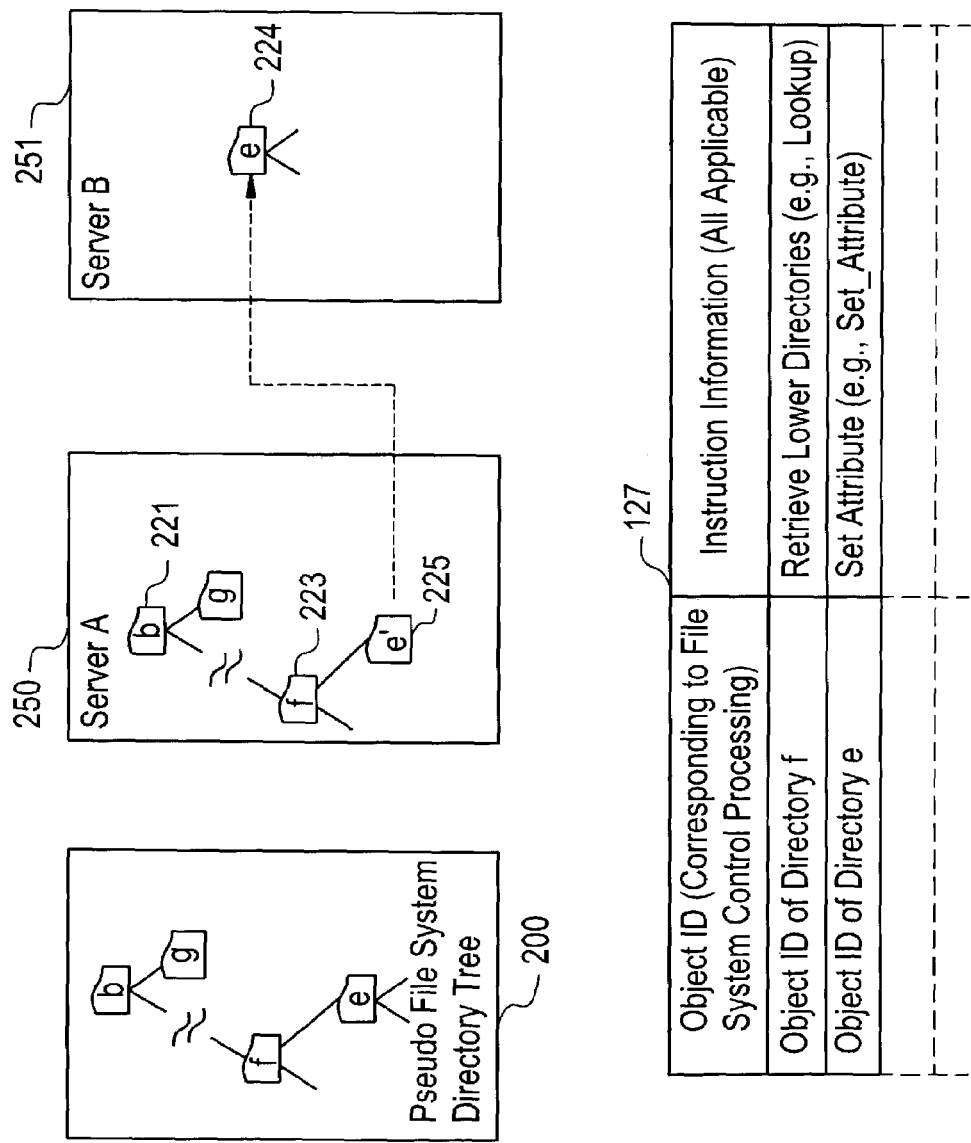
FIG. 24 is a view illustrating how to construct a pseudo file system in a sixth embodiment of the present invention in a concrete fashion.

Referring to FIG. 24, an example of the case where directory tree 200 of a pseudo file system is constructed in a concrete manner is illustrated. When directory e (224) in server B (251) is coupled to a lower portion of directory f (223) in server A (250), in the sixth embodiment dummy directory e' is formed below directory f (223). An object below directory f (223) in specific object ID table 127 of file access control unit 102 on the basis of tree construction information of pseudo file system 105 is retrieved. An object ID of directory f (223) is registered such that a case where a command such as Lookup of NFS for example is issued from the client can be picked up. As a result, when the request is issues from the client, for forcing the client to look at that directory e (224) of server B (251) is constructed like directory tree 200 of the pseudo file system, file system control processing unit 104 divides and transmits a request to server A (250) and server B (251), and collects necessary information from the reply. Further, a specific processing is necessary even when a command of attribute setting is issued to directory e (224), so that an object ID of directory e (224) is also registered in specific object ID table 127. In this case, for reflecting the command of the attribute setting also on dummy directory e', file system control processing unit 104 divides and transmits the request to server A (250) and server B (251).

Figure 25:
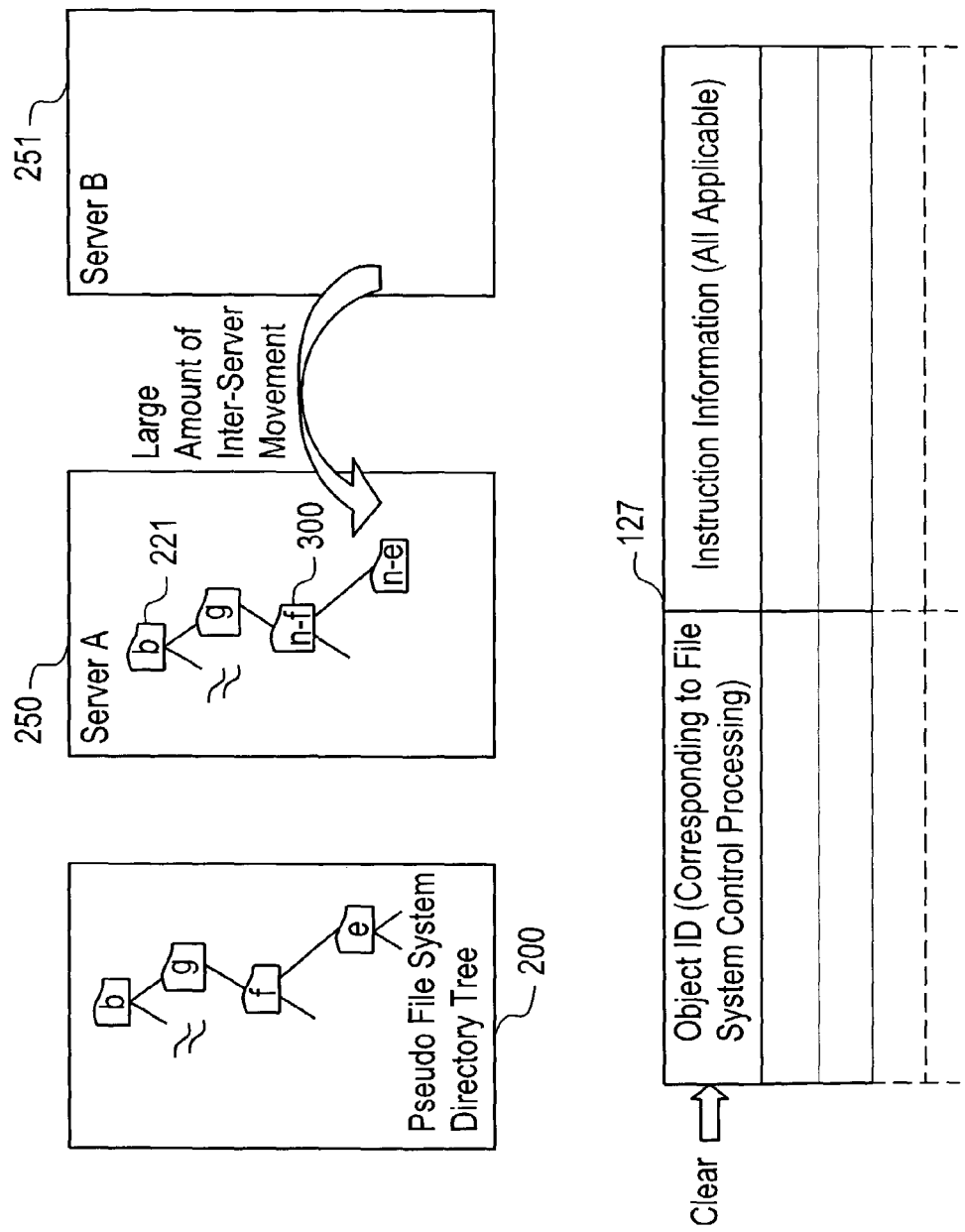
FIG. 25 is a view exemplarily illustrating a case where a switch device executes directory movement by an ordinary file system processing in the sixth embodiment.

It is now assumed that a client issues a request for moving directory f (223) to a lower portion of directory g of server A (250). In this case, the just-mentioned movement is not a movement by an administrator, so that the arrangement of the pseudo file system is also actually changed. Referring to FIG. 25, there is illustrated a result that the switch device based upon the present invention exemplifies the movement. In this case, directory f (223) is moved to a lower portion of directory g to create directory new-f (300), and directory e (224) looked thereunder is actually moved to server A (250) from server B (251) in its actual state to clear contents in specific object ID table 127. This is a result of normal operation, and a client recognizes that its operation is fulfilled, but file movement between the servers happens, so that very long period of time sometimes elapses until completion of the operation depending upon the size of a file to be moved. It is herein noted that although the name of a directory is not changed actually, an object ID corresponding thereto is changed, so that for the purpose of discrimination "n-" is added to the directory name.

Figure 26:
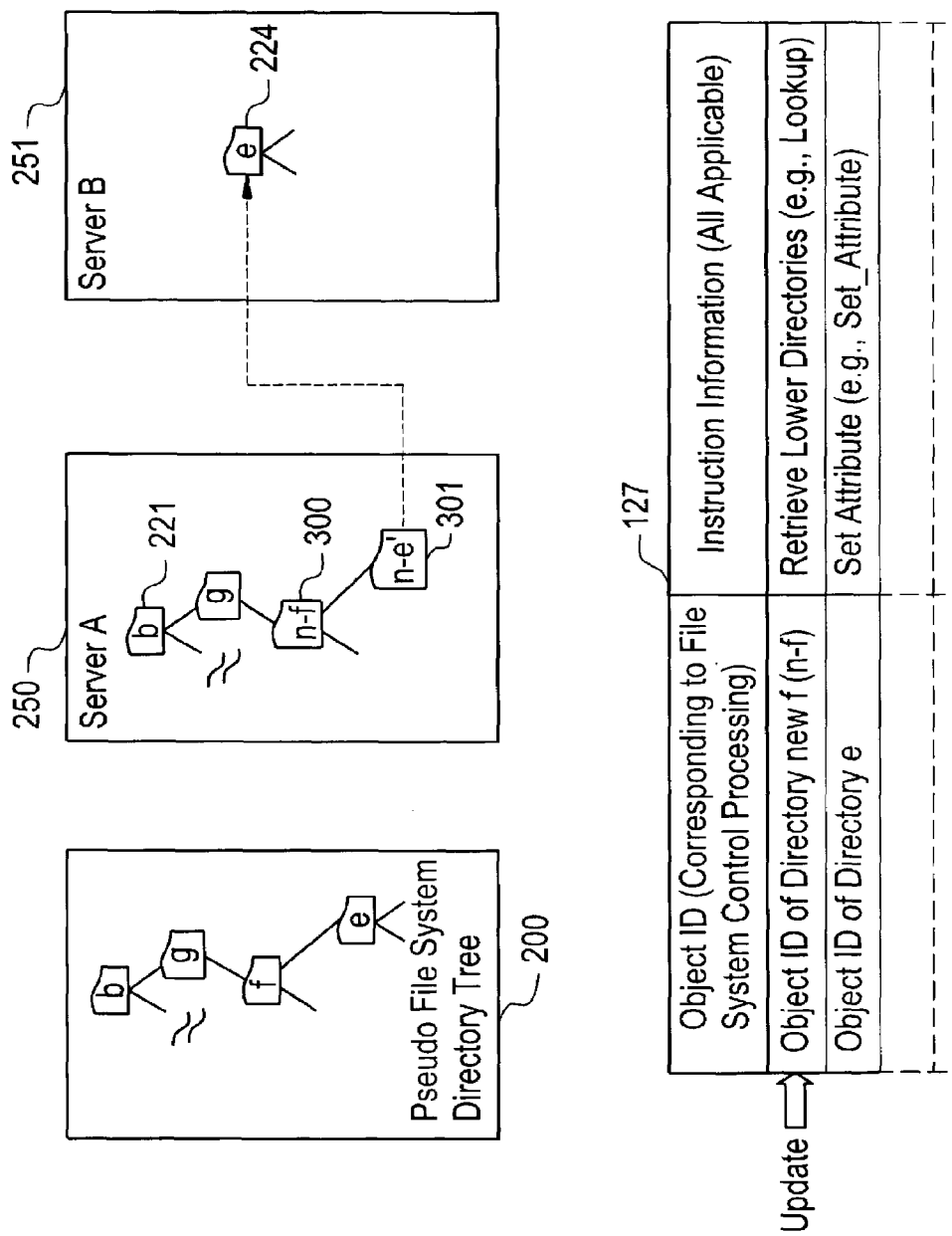
FIG. 26 is a view illustrating the operation of the sixth embodiment.

Against this, referring to FIG. 26, a result of the same movement according to the sixth embodiment is illustrated. Although it is the same as an example illustrated in FIG. 25 that directory f (223) becomes directory new-f (300), a client operation corresponding unit of data movement processing unit 106 is moved dummy directory e' (225) at a lower portion of directory new-f (300) simultaneously as new dummy directory new-e' (301). Further, a registered object ID in the contents in specific object ID table 127 is altered to that of directory new-f (300) from that of directory f (223). Hereby, the request of the client is likewise fulfilled, but a file belonging to directory e (224) of server B(251) is not needed to be moved, so that the movement is completed at a very high speed.

Seventh Embodiment

In the following, a switch device according to a seventh embodiment of the present invention will be described. The present switch device s a modification of the switch devices of the first and second embodiments. The present embodiment has an object of speeding up the processings of the first and second embodiments.

In the first embodiment, switch device 100 needs, when an object ID is contained in reply data, to rewrite the object ID in object ID rewrite unit 101, so that it retrieves and estimates that the reply data is one to which kind of instructions, from transaction ID control table 125 on the basis of a transaction ID contained in the reply data. Further, in the second embodiment, whether or not a reply packet is a reply to a request generated by file system control processing unit 104 by retrieving transaction ID control table 125 likewise the above description. The processing is, since the transaction ID belongs to the layers 5 to 7 of the OSI model, to extract the transaction ID with a software and hence successively compare the same with an entry of transaction ID control table 125, which consumes much time.

In the seventh embodiment, use is made of information at the layer 4 or lower of the OSI model which is capable of being processed with a hardware to judge to which kind of instructions the reply is. As an example there will be described a case using a port number belonging to the layer of the OSI model. The just-mentioned port number includes, as an example, a port number in TCP (Transmission Control Protocol)/IP and in UDP (User Datagram Protocol).

Figure 27:
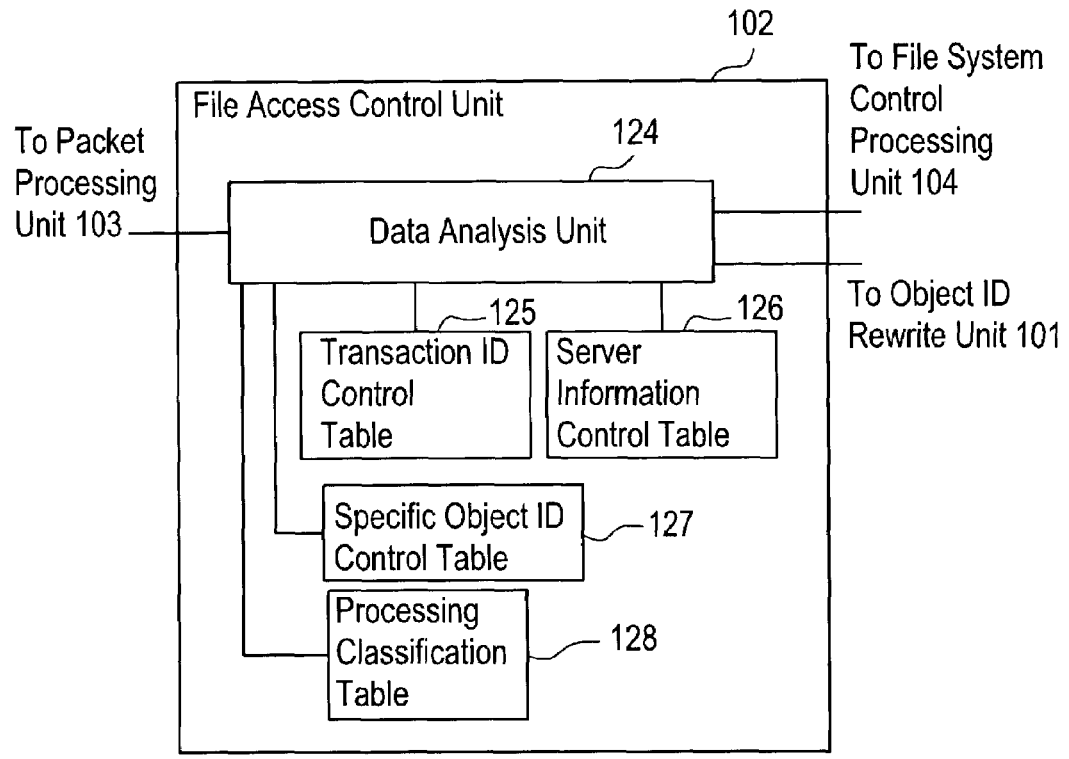
FIG. 27 is a block diagram illustrating the arrangement of a file access control unit in a switch device according to a seventh embodiment of the present invention.
Figure 28:
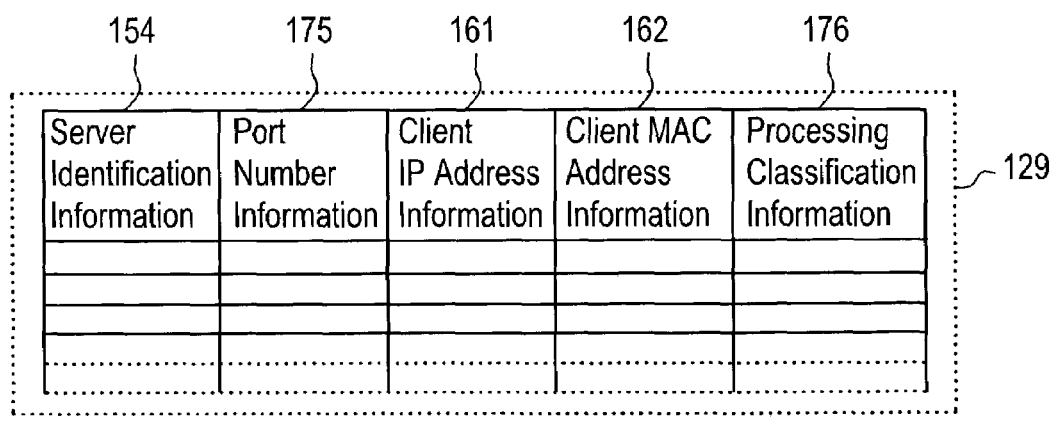
FIG. 28 is a view illustrating the arrangement of a processing classifying table.

Referring to FIG. 27, the file access control unit in the seventh embodiment is illustrated, processing classification table 129 that is an example of the classification table is newly added to the switch. Referring to FIG. 28, an example of an arrangement of processing classification table 129 is illustrated.

First, kinds of instructions are classified taking differences among processings which are executed for a reply packet from server 3, to which processing classification information 176 is applied. The method of the classification may be executed for every instruction, or a plurality of instructions executing similar processings may be grouped taking differences of processings. There are classified the instructions at least into three instruction groups of an Instruction group where an object ID is not contained in reply data, an instruction group where an object ID is contained in reply data, and an instruction group generated in the file system control processing unit to ensure a high speed of the operation.

Switch 100 changes a port number from switch 100 to server 3 depending upon which kind of instructions it contains upon request data from client 1 being transferred to server 3. Port number information 175 and processing classification information 176 are contained in processing classification table 129, For selection of port numbers use may be made a method for allocating an empty port number for each request from client 1 or a method for determining a port number previously in a fixed fashion for any kind of instructions. It is noted here that the former method makes an entry of processing classification table 129 for each instruction, so that for speeding up the processings the latter method is desirable.

A reply packet from server 3 is sent to a port number to which switch 100 sends a request. File access control unit 102 retrieves processing classification table 129 on the basis of server identification information 154 and port number information 175 obtained by retrieving server information control table 126 to obtain processing classification information 176, client IP address information 161, and client MAC address information 162. The processings described until now are capable of processing at a high speed provided that use can be made of an LSI (Large-scaled Integrated circuit) capable of retrieving the layer 4 or lower of the OSI model with a hardware.

In the case where an object ID is not contained in a reply packet from processing classification information 176, the reply packet can be transferred only by converting an IP address and a MAC address on the basis of client IP address information 161 and client MAC address information 162 obtained as above, so that a very high speed processing is ensured. In the case of an instruction where it contains an object ID, the same processing as in the first embodiment is executed in object ID rewrite unit 101. In the case of an instruction where it is generated in file system control processing unit 104, the same processing as in the second embodiment is executed in file system control processing unit 104.

A reply packet from server 3 is classified with the aid of processing classification information 176 in such a manner, and only necessary processings are executed, whereby the processings can be made a high speed.

Figure 29:
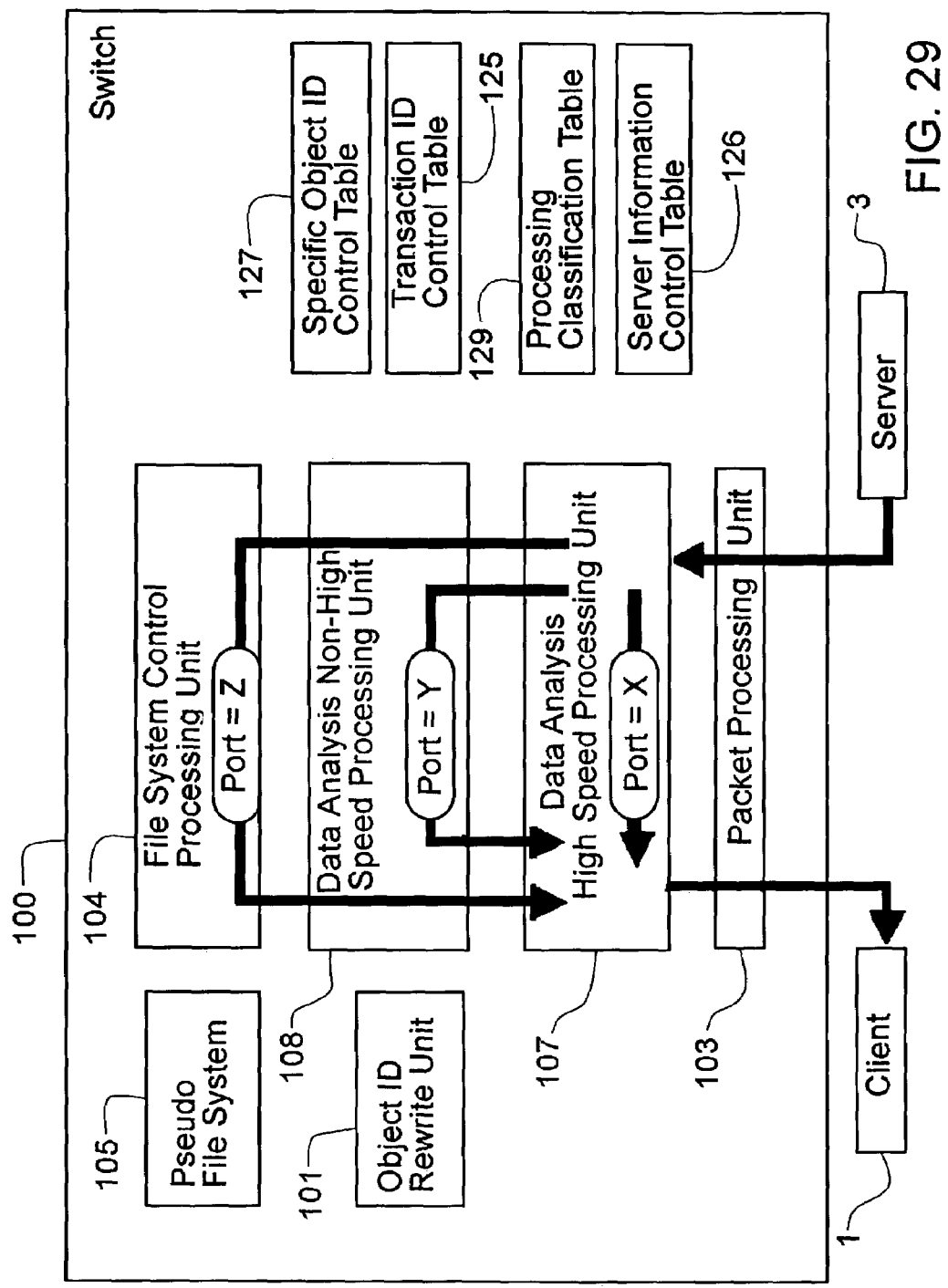
FIG. 29 is a block diagram illustrating a hardware construction of the switch device of the seventh embodiment.

With reference to FIG. 29, the above disclosure will be further described by dividing it to blocks adapted to an actual hardware arrangement.

Data analysis unit 124 can be divided into data analysis high speed processing unit 107 capable of high speed processing and data analysis non-high speed processing unit 108 consuming much time. To data analysis high speed processing unit 107, server information control table 126 and processing classification table 129 are connected, and to data analysis non-high speed processing unit 108, transaction ID control table 125 and specific object ID control table 127 are connected. An instruction where an object ID is not contained in reply data is transmitted to server 3 using port X, an instruction where an object ID is contained in reply data using port Y, and an instruction generated in file system control processing unit 104 using port Z. A reply from server 3 in the case of port X is capable of high speed processing because it is processed only in data analysis high speed processing unit 107. In the case of port Y, it is processed in data analysis non-high speed processing unit 108. Compared with the second embodiment in which such a reply passes through file system control processing unit 104, it is capable of high speed processing. In the case of port Z, it is processed in file system control processing unit 104. Since also in this situation it is known that such a reply is one to an instruction previously generated in file system control processing unit 104, so that any excessive processing can be eliminated as the effect of the present invention.

Although in the present embodiment the case using the port numbers for discrimination of the instructions was described as an example, information on the OSI model layer 4 or lower such as an IP address, a VLAN (virtual LAN) tag, an MPLS

(Multi-protocol Label switching) label, and a MAC address can be executed in the same fashion.

Eighth Preferred Embodiment

In the following, a switch device according to an eighth embodiment of the present invention will be described. The switch device is a modification of the switch device in the second embodiment.

The present embodiment is to speed up the processings of the second embodiment.

In the second embodiment, in step S111, it is necessary to check for all requests whether or not an object ID and instruction information contained in a request packet from client 1 correspond to an entry of specific object ID control table 127. The object ID has 32 bite length in NFS for example, and belongs to the layer 5 to 7 of the OSI model, so that it is processed with a software, requiring much time. Further, in almost all cases the requests do not correspond to an entry of the specific object ID control table, so that processings which may not be executed are executed as a result.

In the present embodiment, specific attribute is registered in an object that provides a joint in a file system, and all requests are transferred without executing judgment in step S111 to judge in switch 100 whether or not attribute contained in a reply packet is the foregoing specific attribute, and only for the case where the attribute is a specific attribute the file system control processing is executed to speed up the associated processings.

Figure 30:
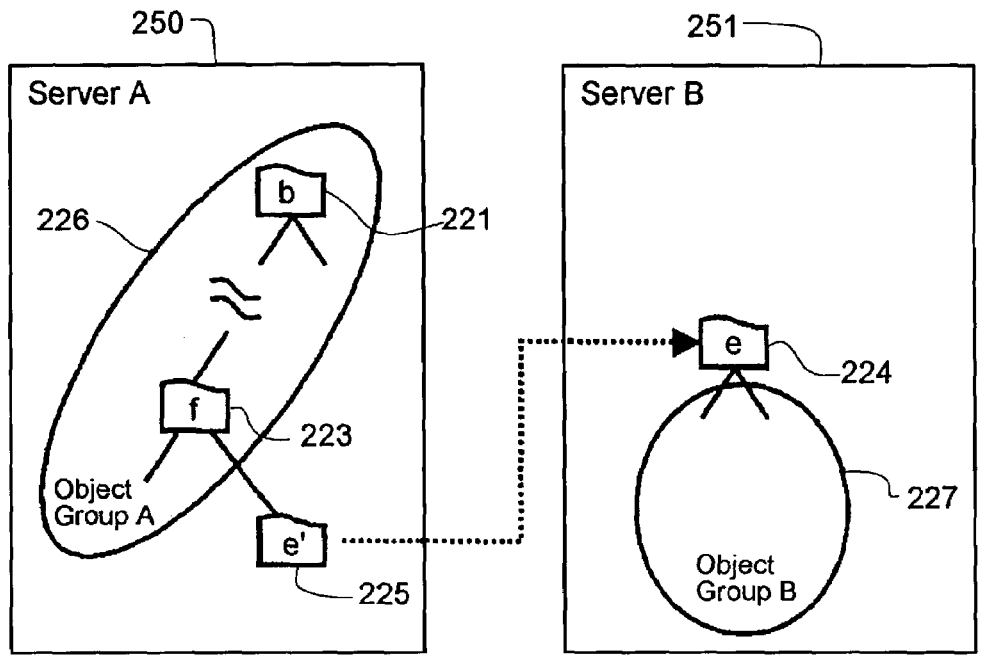
FIG. 30 is a view exemplarily illustrating the arrangement of a directory tree assumed by a switch device according to an eighth embodiment of the present invention.
Figure 31:
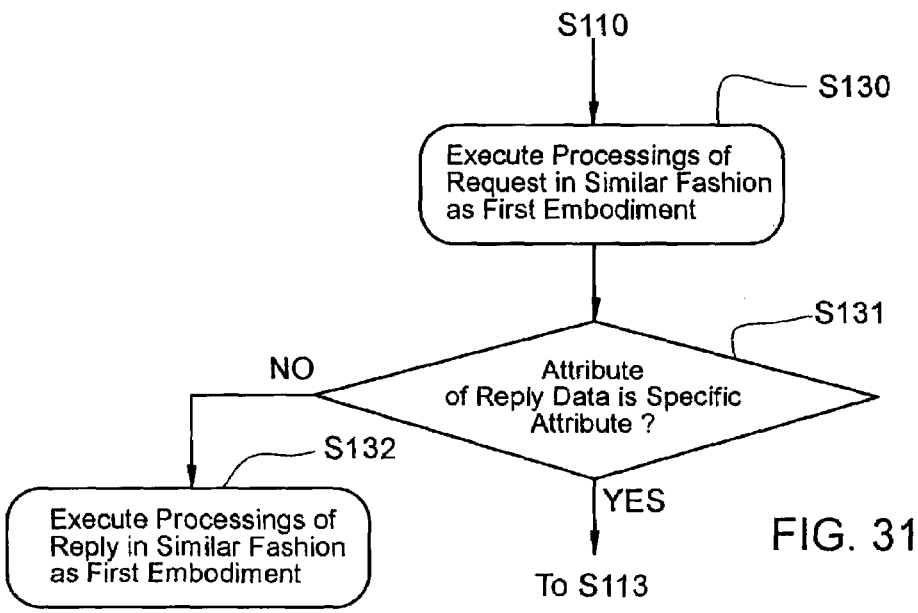
FIG. 31 a flowchart illustrating the operation of the eighth embodiment.

The embodiment will be described with reference to FIG. 30 as an example. In the second embodiment, all requests for all objects in server A (250), server B (251) are compared to check whether or not an object ID corresponds to an entry of specific object ID control table 127. However, object group A (226) and object group B (227) do not correspond the entry, so that processings, which may be not executed as a result, are executed. Thereupon, in the present embodiment, specific attribute is previously stored in dummy directory e' (225) under directory f (223) in server A (250). Switch 100 executes the same processings as in the first embodiment for instructions for obtaining the object ID and attribute information corresponding to a directory e from client 1, and transmits them to server A. Server A transmits to switch 100 a reply packet containing the specific attribute stored in pseudo file system 105 and the object ID of dummy directory e' (225). Switch 100 judges whether or not the specific attribute is contained in the reply packet, and since in the present case it is contained, data is sent to the file system control processing unit for processings from step S113 and later. If it is not contained, then the same processing as in the first embodiment is executed. A flowchart for the above description is illustrated in FIG. 31. In step S130, the same processings as in the first embodiment are executed, and a reply from server 3 is checked in its attribute in step S131. If it is the specific attribute, then the operation jumps to step S113 in the second embodiment, but if it is not the specific attribute, then the same processing as in the first embodiment are executed in step S132.

In the present embodiment, as described above, switch 100 does not retrieve specific object ID control table 127 which may be not executed as a result upon reception of a request packet from client 1, so that high speed processing is ensured. Instead of this, although it is necessary to judge whether or not the specific attribute is contained in the reply packet from server 3 in step S131, specific object ID control table 127 could have a plurality of entries while the judgment only compares a specific position of a reply packet and a specific attribute, and also for data length if an object ID is NFS, then comparison over 32 bits are required to a minimum, it is capable of being shortened depending upon implementation. Accordingly, if step S111 and step S131 are compared, then step S131 ensures a high speed processing.

Ninth Embodiment

In the following, a ninth preferred embodiment of the present invention will be described. As the switch here one illustrated in FIG. 17 is employed.

Figure 32:
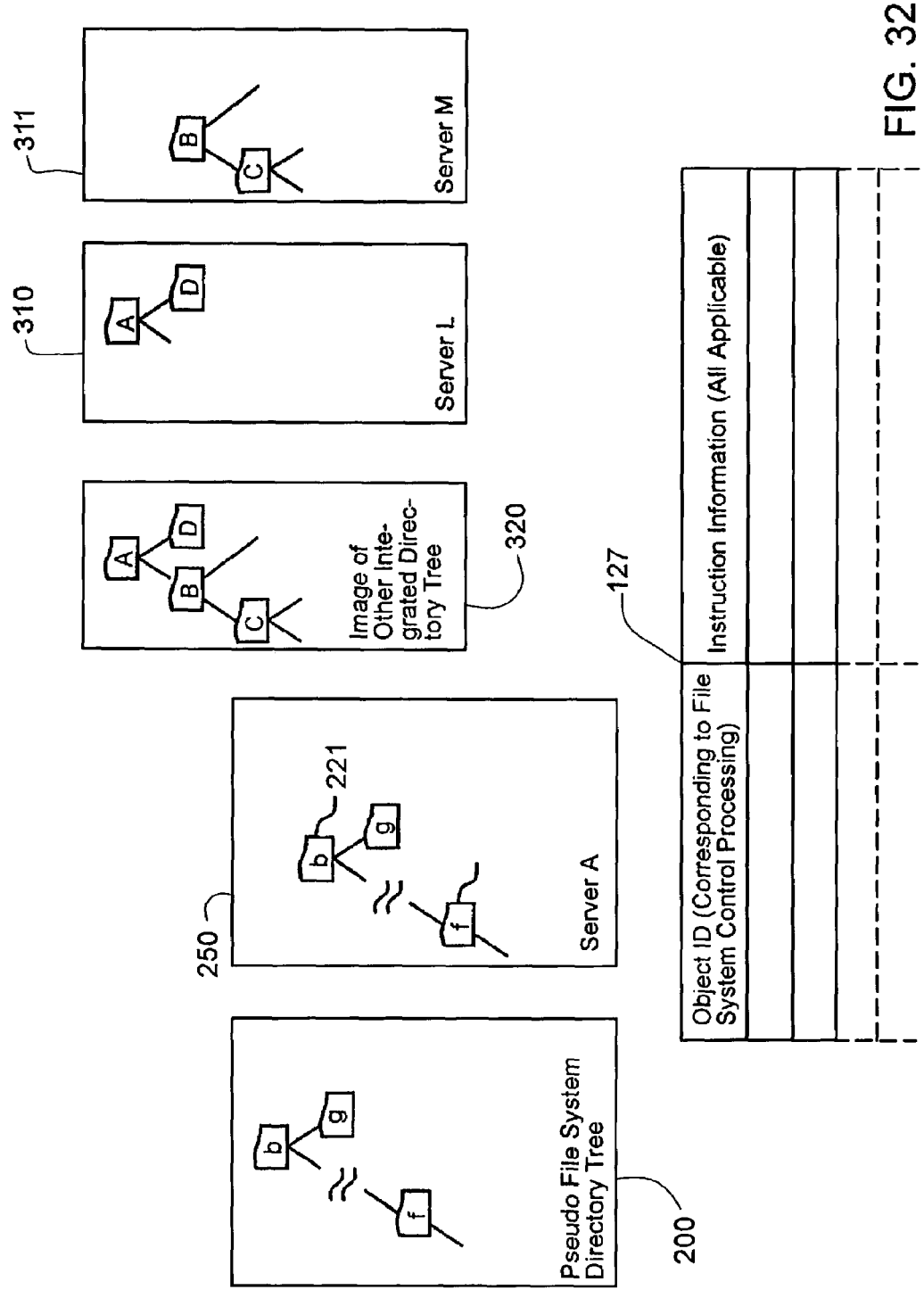
FIG. 32 is a view exemplarily illustrating a situation where an integrated directory tree environments by another method and a protocol are both arranged.
Figure 33:
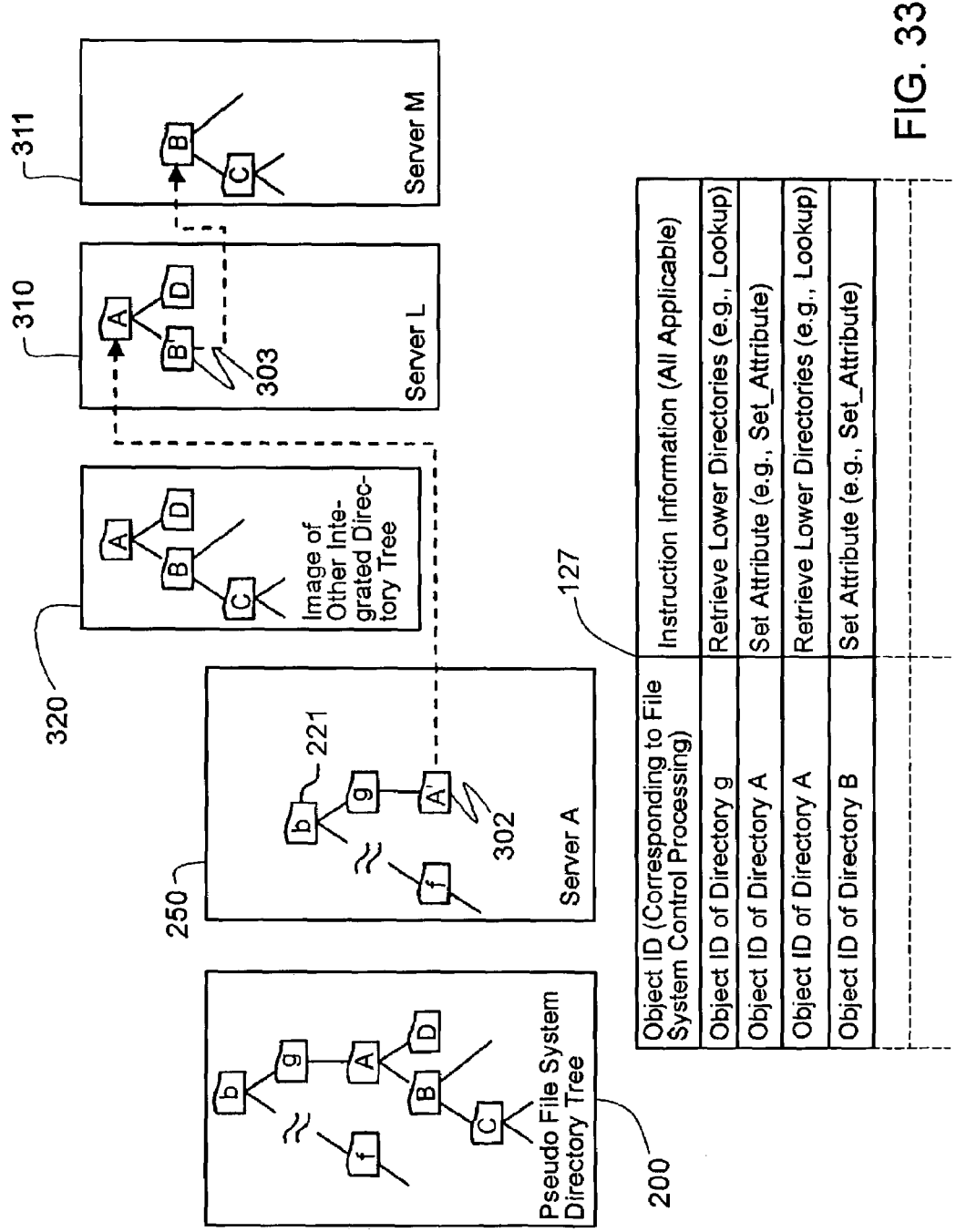
FIG. 33 is a view for describing incorporation of an integrated directory tree environment in a ninth embodiment of the present invention.

Referring to FIG. 33, server L (310) and server M (311) are a multiple protocol corresponding server, which can interpret protocol A and protocol B as protocols for servicing a file system through a network. The protocol A corresponds also to the switch device according to the present invention and server A. As illustrated in FIG. 32, in order to achieve the same object also other than the present invention, there is a modification where for accessing by the protocol B image 320 of another integrated directory tree is provided by refining the client or introducing a distributed file system into the server. In such a situation, the switch device in the present embodiment incorporates image 320 of another integrated directory tree for an access by the protocol B and provides image 320 of identical integrated directory tree also for an access by the protocol A.

To be concrete, an agent in pseudo file system 105 obtains information of image 320 of the integrated directory tree. Successively, it is determined on the basis of an instruction by an administrator at which directory A that is a root of the image 320 of the integrate directory tree is disposed on pseudo file system directory tree 200 on the switch device. In the present example, there will be described a situation where it is set to look at directory A below directory g of pseudo file system directory tree 200, i.e., directory g in server A (250).

Herein, the switch device prepares dummy directory A' (302) below directory g of server A, and further prepares dummy directory B' (303) below directory A by accessing server L with the protocol A. In succession, information of joints between directories g and A and between directories A and B are registered as illustrated in FIG. 33 for example such that contents in specific object ID control table 127 can be accessed from the client while making seamless a joint between two positions on the file system. For an access request associated with the joint, as described above, file system control processing unit 104 divides the request and sends it to a proper server, and collects necessary information from a reply thereto, and further returns a reply to the client, so that an integrated tree like the image of directory tree 200 of the pseudo file system can be provided.

Tenth Embodiment

In the following, a switch device according to a tenth embodiment of the present invention will be described. The switch device is applied to the network file system illustrated in FIG. 3 likewise the first, second and third embodiments. The present embodiment is to achieve movement operation for a group of objects among a plurality of servers 3 without interruption of file access to a group of movement target objects from client 1. More specifically, although the switch device according to the first to third embodiments can provide a file service of a single system image to a client by integrally managing a plurality of the servers, if any object is relocated in the course of an actual access (read and write) to any object or file on any server by a user, the user successively uses an object ID determined upon accessing during the access, so that the access by the user is interrupted or proper relocation can not be done. Accordingly, in the tenth embodiment, there is described a switch device, in which even in a timing when the user is accessing an object on the server at present, an administrator side can relocate the object, and it can be hidden to the user that relocation of the object and so on are done.

In the present embodiment, the switch device which is described using FIG. 17 associated with the third embodiment is employed. More specifically, switch device 100 includes, additionally to object ID rewrite unit 101, file access control unit 102, packet processing unit 103, all provided in the switch device in the first, second, and third embodiments, and file system control processing 104 and pseudo file system 105 provided in the second and third embodiments, data movement processing unit 106 provided in the third embodiment.

Figures 34, 35:
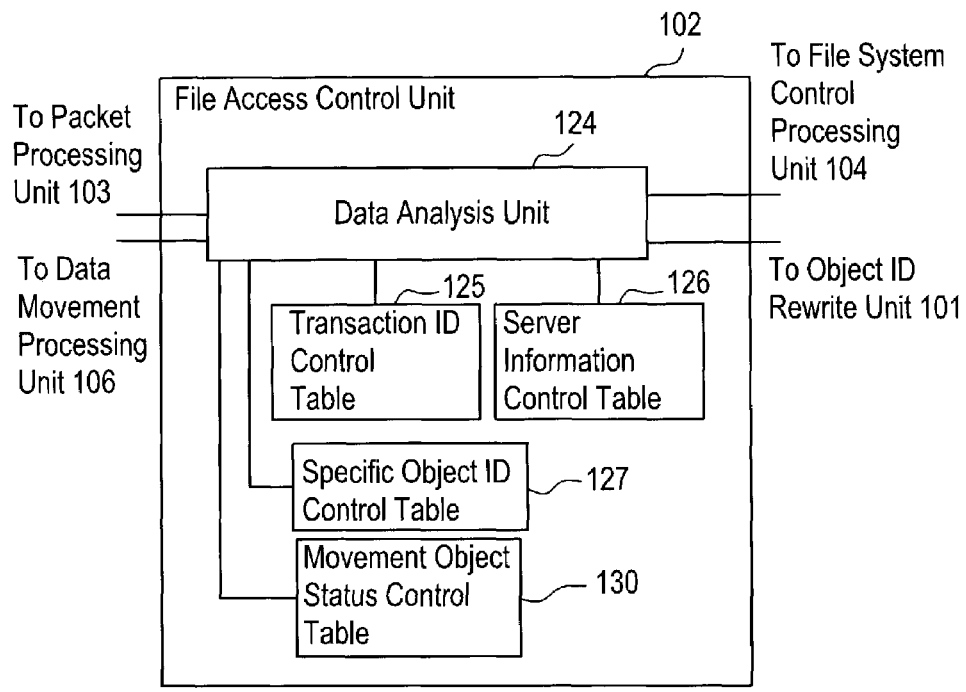
FIG. 34 is a block diagram illustrating the arrangement in a file access control unit in a switch according to a tenth embodiment of the present invention.
FIG. 35 is a view illustrating the arrangement of a movement object status control table in the tenth embodiment.

Referring to FIG. 34, file access control unit 102 in the tenth embodiment is illustrated in the form of a block diagram. File access control unit 102 includes, additionally to transaction ID control table 125 and server information control table 126 provided in the switch devices in the first, second, and third embodiments, and specific object ID control table 127 provided in the second and third embodiments, movement object status control table 130 for managing a group of objects each for executing the movement processing.

Operation of the switch device in the tenth embodiment will be described. The switch device masks, additionally to the function provided in the switch devices in the first, second, and third embodiments, a fact that the operation is in the course of a data moving processing by changing a transfer processing of a file access request such as read and write operations to a movement processing target object from client 1 when an object and a directory tree structure in each server 3 constituting an integrated directory tree constructed on pseudo file system 105 is copied to another server 3 and the movement processing is executed.

As described in the third embodiment, for example, a situation is assumed that data of a group of objects, owners of the objects, and attribute information such as an access right in a directory tree from directory c (222) in server B (251) are desired to be copied to server A for each tree structure owing to a reason of insufficient storage capacity or the like. Although the movement of the objects is finished by copying the data of the group of the objects, updating mapping information of pseudo file system 105 illustrated in FIG. 14, and deleting a copied portion from server B (251), it is possible to execute the movement processing without interruption of file accessing by controlling the file accessing with switch 100 from client 1 such that any disagreement of the data is prevented from happening when file access operation such as updating of data is required during the copying of the objects.

In the following, the operation of switch 100 relevant to the operation in the movement processing for the data will be described. Data movement processing unit 106 monitors remaining capacity data in storages 5 in all servers 3, and records history data relevant to a file access request packet processed in switch 100 and a reply packet. Data movement processing unit 106 refers, when the remaining capacity is more reduced than a previously set criteria, and when file access requests are concentrated only on a specific server 3, to data registered in pseudo file system 105, and determines a directory tree on the movement source server 3 and a place to be moved ion the movement destination server 3.

Prior to the execution of copying for data, data movement processing unit 106 extracts constituent information on a directory tree of a group of objects in a directory tree of the movement source, and all original object IDs 150, and the original object ID 150 is converted in object ID rewrite unit 101 to compression type information entraining object ID 151 and postscript type information entraining object ID and then registered into movement object status control table 130 in file access control unit 102.

Movement object status control table 130 is constructed with an entry, as illustrated in FIG. 35, which comprises movement source object ID 166 in which compression type information entraining object ID 151 or postscript type information entraining object ID 155 of the movement source is registered, movement destination object ID 167 in which postscript type information entraining object ID 151 and postscript type information entraining object ID 155 of the movement destination are registered, advancement status information 177 representative of information of an advancement status of the movement processing, parent object number 178 having as in formation, a number on movement object status control table 130 of an object corresponding to a parent object on a directory tree of a target object, updating log information 179 for registering updating history information from client 1 during copying operation, object attribute information 180 indicative of whether the target object is a directory or a file, and movement destination server information 168 for registering server identification information 154 corresponding to the movement destination server 3.

In advancement status information 177 there are registered a non-copying status indicative of a fact that copying operation is not executed, an in-copying status indicative of a fact that copying processing is actually executed, a copying finish status indicative of a fact that copying is finished, and a movement finish status indicative of a fact that the movement processing is finished, and the registration is altered in the order of the non-copying status—in-copying status—copying finish status—movement finish status depending upon the statuses of the processings.

Accordingly, for all objects becoming movement targets before data is copied by data movement processing unit 106 there are registered movement source object ID 166, parent object number 178 and object attribute information 180 as the directory constituting information, and movement destination server information 168, and further advancement status information 177 is set to a non copy status. Further, for parent object number 178 of an entry of an object corresponding to a directory located at an uppermost level on directory trees of a group of objects for which the movement processing is executed "0" is registered.

Figure 36:
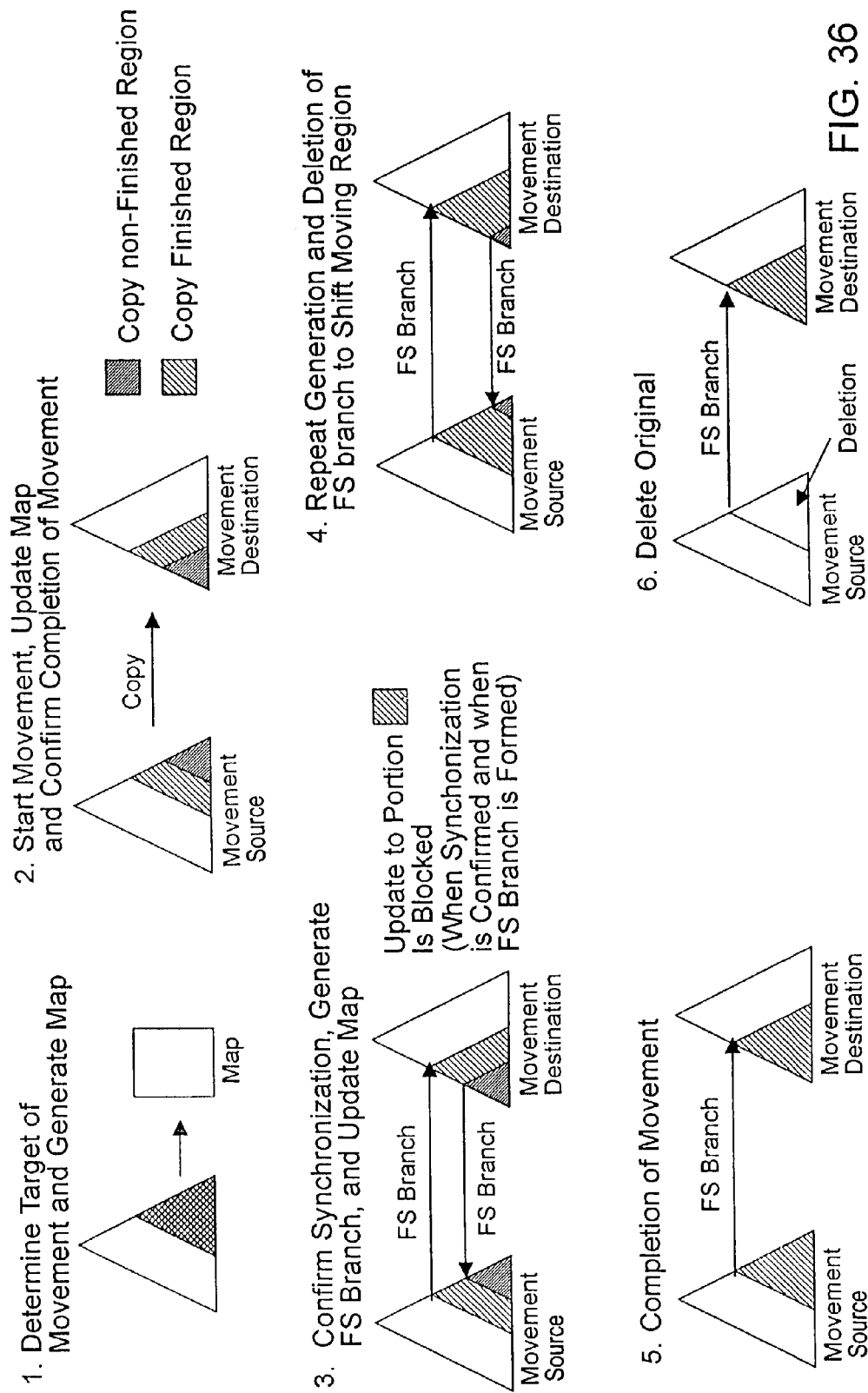
FIG. 36 is a view illustrating an outline of processings in the tenth embodiment.

An outline of processings of the present embodiment will described with reference to FIG. 36. First, an object being a target of the movement is determined, and information relevant to all objects that are the target of the movement is registered in movement object status control table 130 as a map. Then, the movement of the object is started, and following this mapping, i.e., updating of movement object status control table 130 is executed, and finish of the movement is confirmed. Thereupon, the object is divided into small movement processing units, which processing units are assumed to be copied to a movement destination one by one from the movement source to the movement destination, after the copying synchronization of copied objects is checked, and the directory in the aforesaid pseudo file system is replaced. Hereby, an FS branch is formed. Thereupon, updating to a copying finish region is blocked by data movement processing unit 106. The movement is finally finished by repeating copying the movement processing unit one by one, a source object existent at the movement source is deleted.

Figure 37:
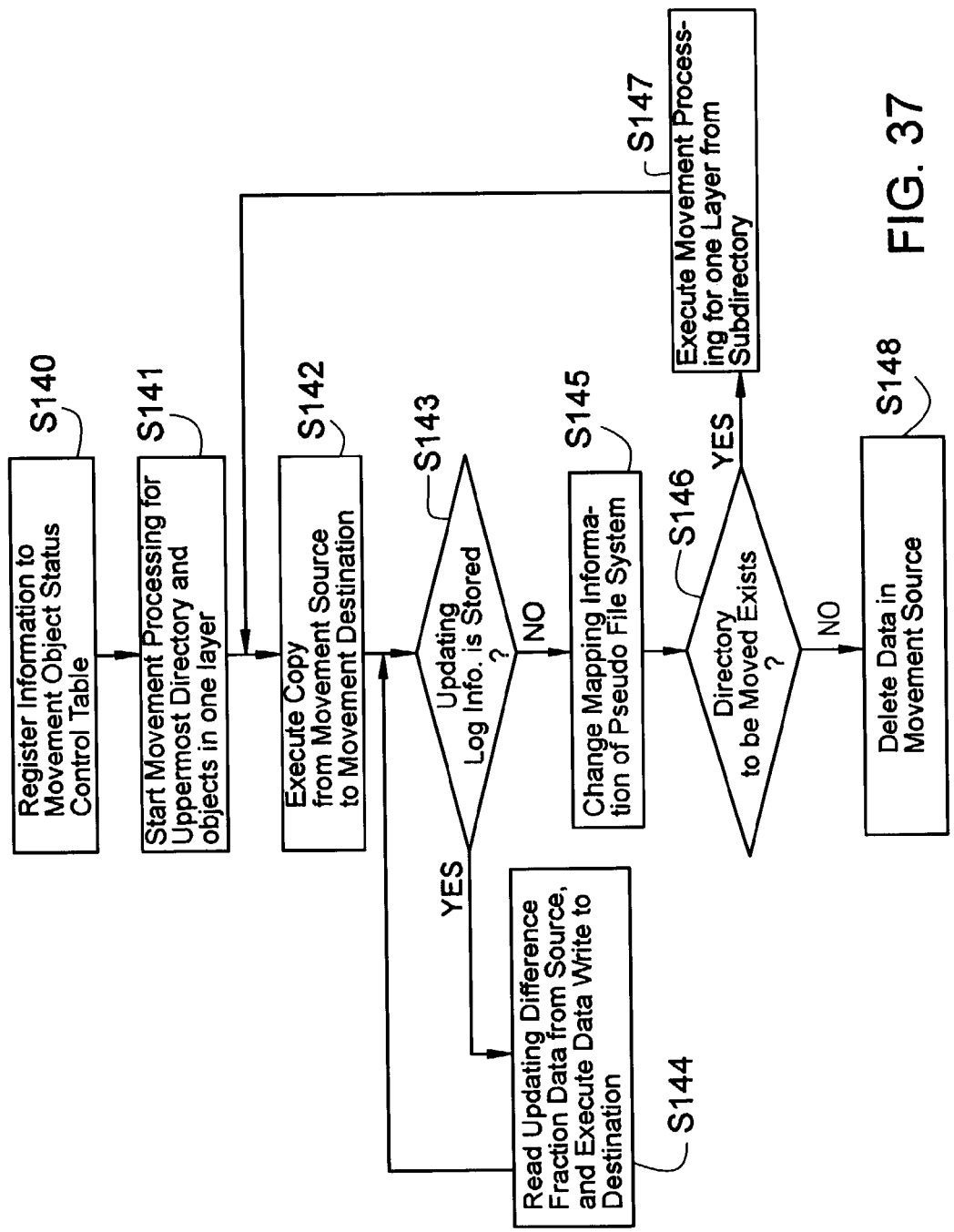
FIG. 37 is a view illustrating, by a flowchart, a movement processing procedure for an object in a data movement processing unit in the switch device of the tenth embodiment.
Figure 38:
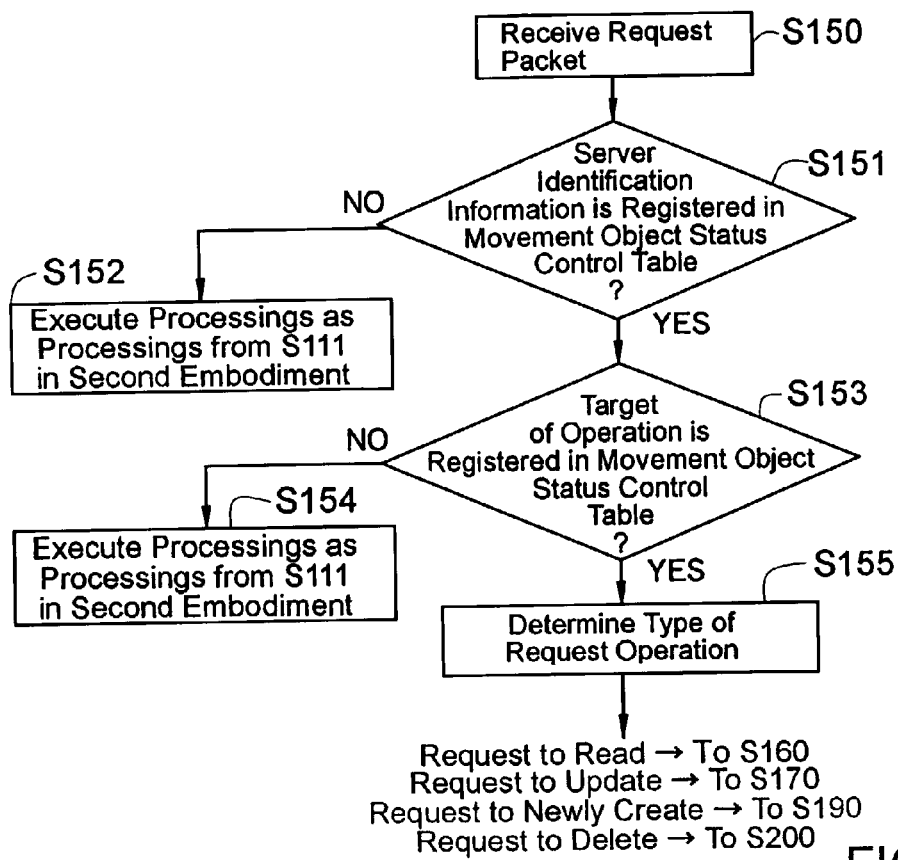
FIG. 38 is a view illustrating, by a flowchart, processing procedure in the switch device for a request packet from a client during a movement processing of a data movement processing unit in the switch device of the tenth embodiment.
Figure 39:
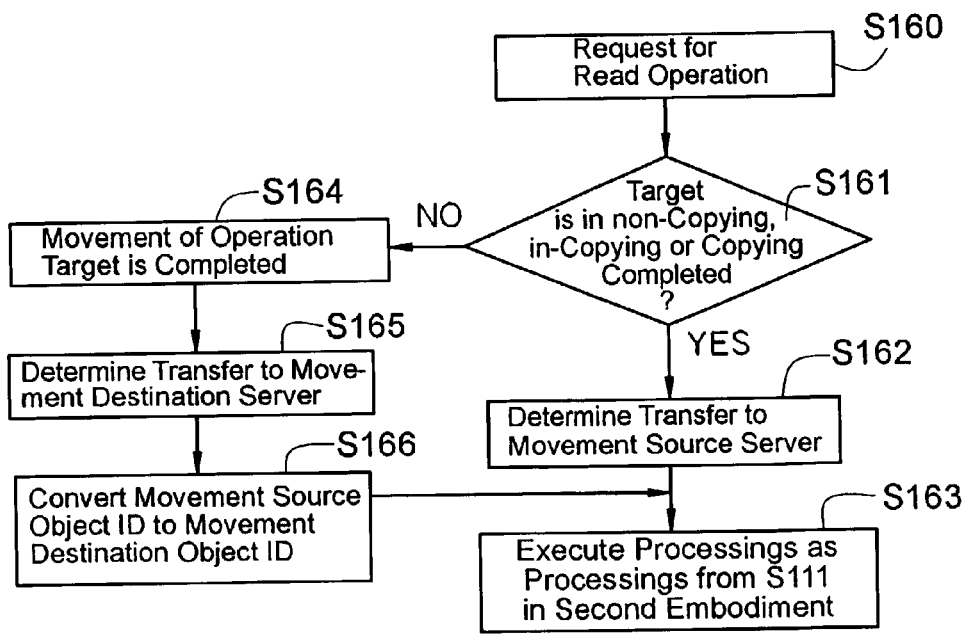
FIG. 39 is a view illustrating, by a flowchart, a processing procedure upon a read operation request.
Figure 40:
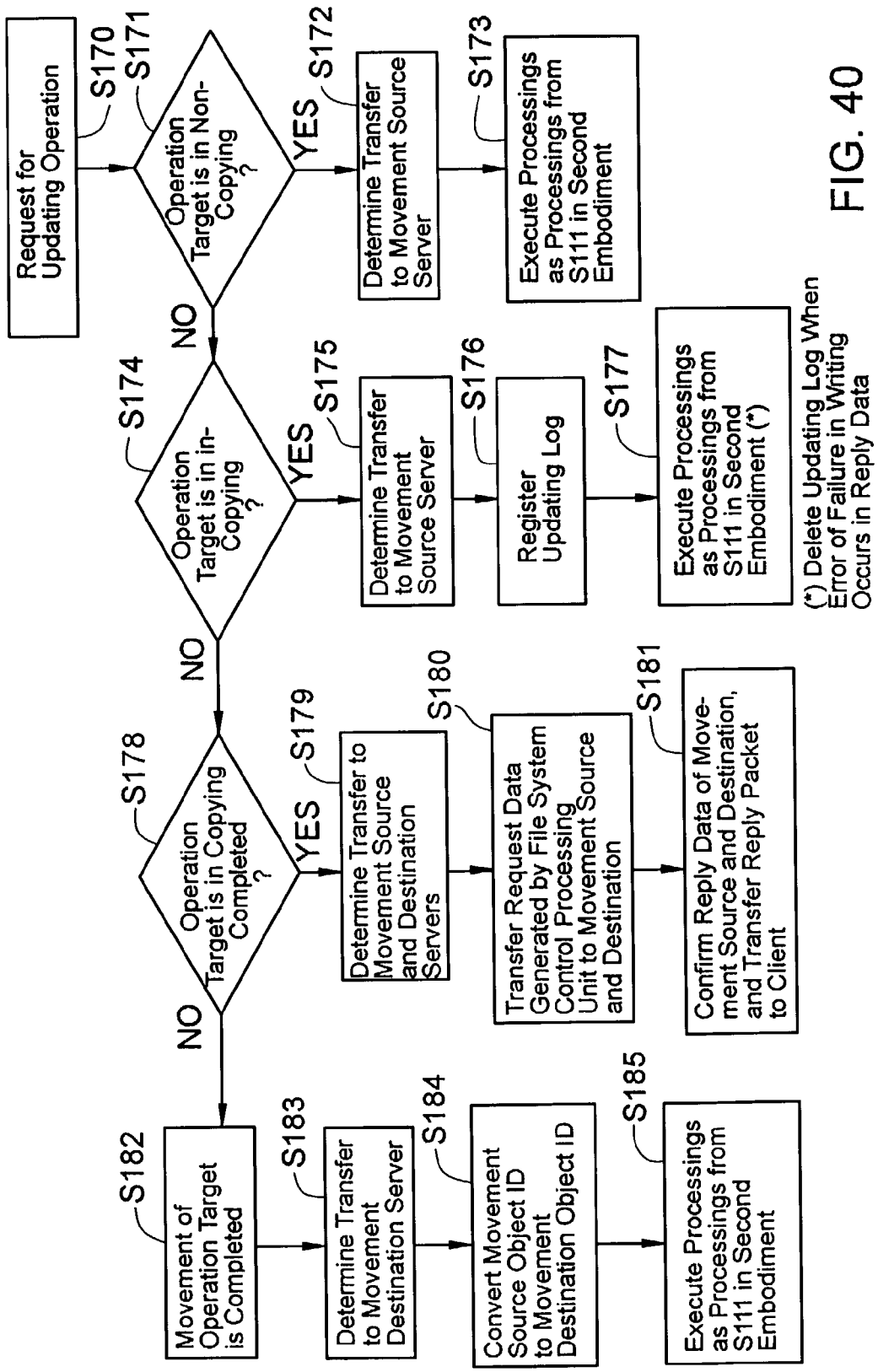
FIG. 40 is a view illustrating, by a flowchart, a processing procedure upon an update operation request.
Figure 41:
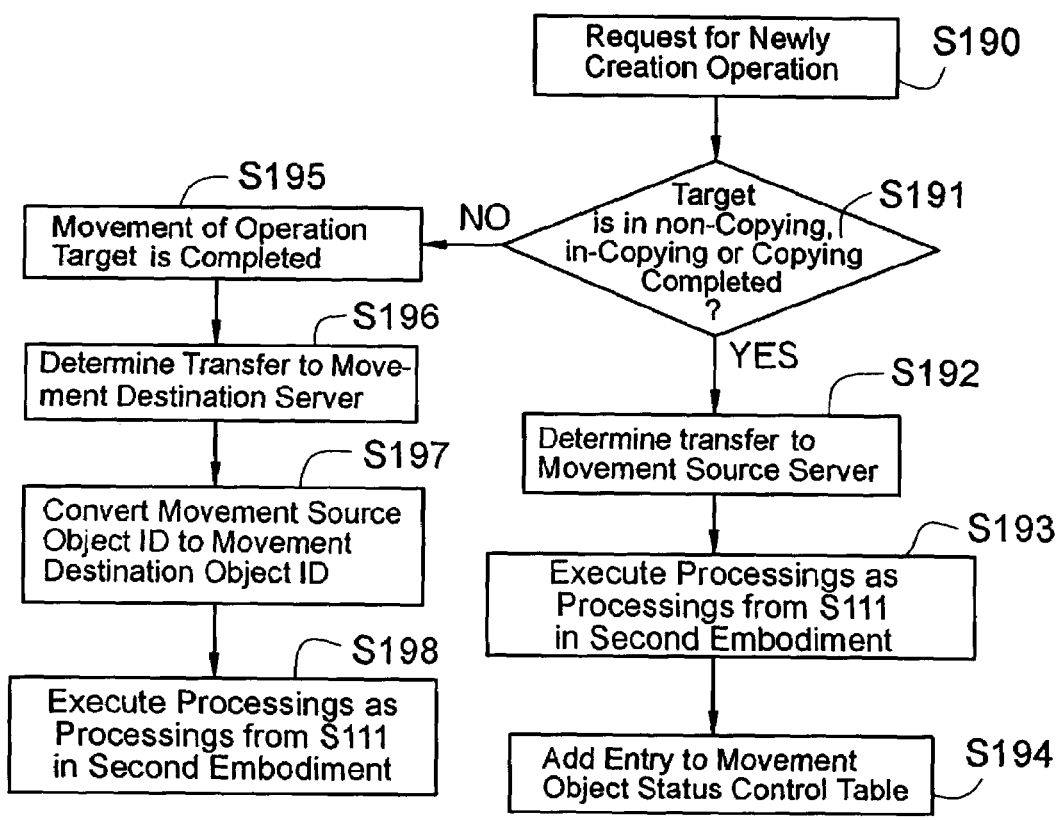
FIG. 41 is a view illustrating, by a flowchart, a processing procedure upon a newly creation operation request.
Figure 42:
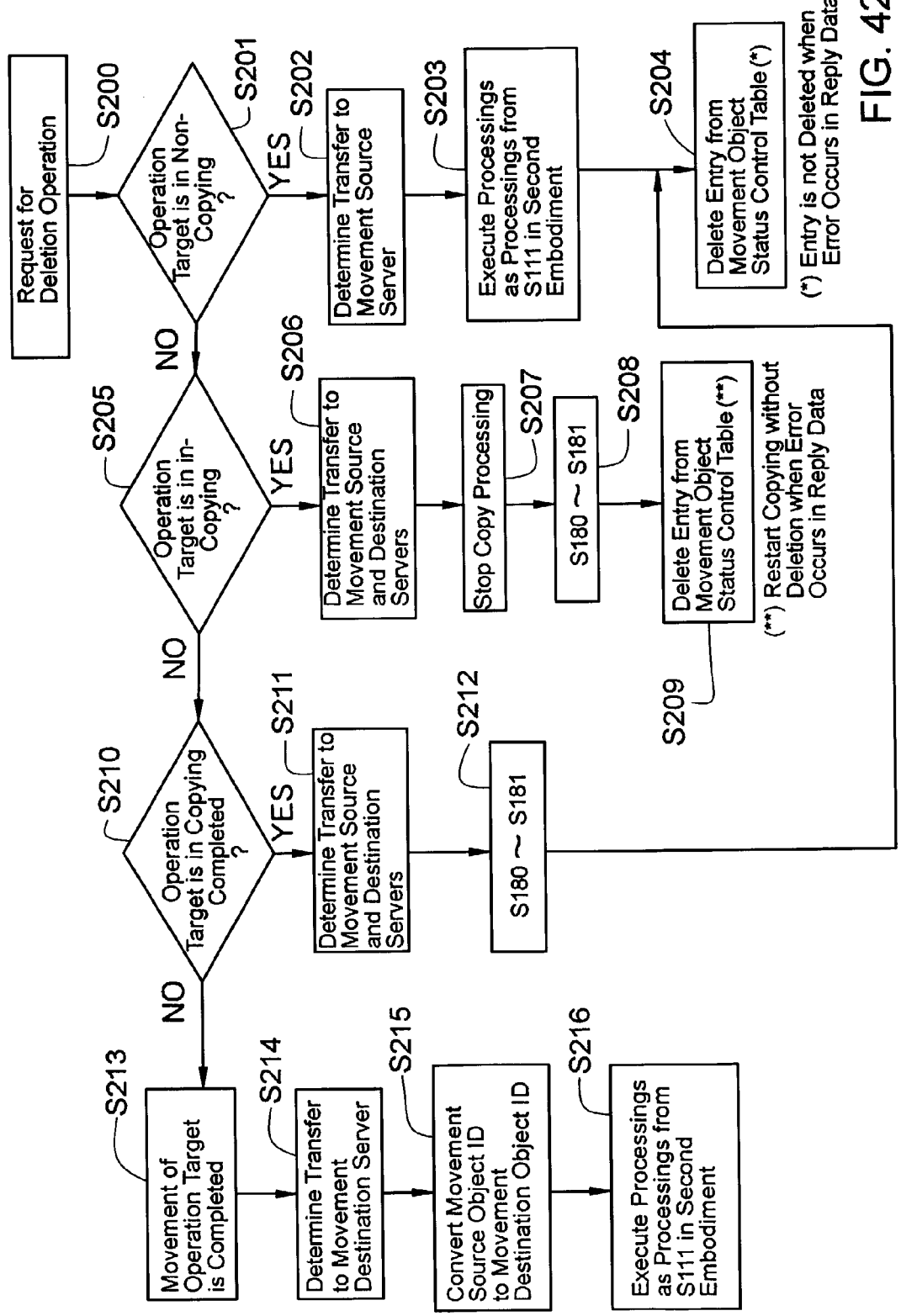
FIG. 42 is a view illustrating, by a flowchart, a processing procedure upon a delete operation request.

In the following, the movement processing for a group of objects executed in data movement processing unit 106 will be described in detail with reference to a flow chard illustrated in FIG. 37. Object movement processing unit 106 first registers in step S140, pieces of information relevant to all objects that are movement targets to movement object status control table 130, and then starts, in step S141, the movement processing for objects that are uppermost rank directory on a directory hierarchy judged from parent object number 178 and for all the objects corresponding to one hierarchy involved in a lower layer of the aforesaid objects judged from parent object number 178, and executes, in step S142, copying from the movement source server 3 to the movement destination server 3. Data movement processing unit 106 registers one obtained by converting original object ID 150 extracted from the movement destination server 3 to compression type information entraining object ID 151 and postscript type information entraining object ID 155 with the aid of object ID rewrite unit 101 to movement destination object ID 167 in movement object status control table 130 of the object executing actually the copying processing, and thereafter sets advancement status information 177 to the in-copying status and starts copying from the movement source to the movement destination. Advancement status information 177 is set to a copying finish status after the copying processing to the processing movement destination is finished. When an updating request from client 1 is generated to an object where advancement status information 177 in the in-copying status, data analysis unit 124 adds write position information other than the updating data and the like to updating log information 179 as the history information. Data movement processing unit 106 after the first copying processing is finished checks, in step S143, whether or not any information is registered in updatinglog information 179. If any information is registered, data movement processing unit 106 executes, in step S144, copying processing of only an updating difference fraction from updating log information 179, and clears updating log information 179, and then sets advancement status information 177 to the copying finish status.

In contrast, when any updating log information is not registered in step S143, advancement status information 177 of the objects corresponding to the one hierarchy fraction is all set to the copying finish status, and thereafter data movement processing unit 106 alters, in step S145, as mapping to an object of the movement destination, mapping of an object fraction of the movement source of a portion for which copying is finished in integrated directory tree information registered in pseudo file system 105, and thereafter sets advancement status information 177 of the object to movement finish status where the mapping of the object is altered. Data movement processing unit 106 checks, in step S146, whether or not there is existent an object where information registered in object attribute information 180 is attribute of the directory among the objects of one hierarchy fraction contained in a lower layer of an object corresponding to the aforesaid uppermost directory, i.e., an object that becomes a subdirectory is existent. Herein, when the subdirectory is existent, data movement processing unit 106 copies in step S147, all objects corresponding to one hierarchy fraction from objects that become the just-mentioned subdirectory in the same fashion as the case of the uppermost directory, and alters mapping information of pseudo directory 105. When the subdirectory is not existent in step S146, i.e., when all processings are finished, the operation jumps to step S148 to delete the data of the movement source.

In such a manner, the presence of the subdirectory is checked, and the movement processing is executed following the directory trees for every directory for each one hierarchy, and further advancement status information 177 of all objects registered in movement object status control table 130 is set to the movement finish status, and thereafter all objects that are movement targets existent in the movement source server 3 are deleted, and all movement processings are finished.

In the following, how to treat a file access request packet from client 1 when the movement processings are executed by data movement processing unit 106 and a reply packet in switch 100 will be described. The file access request from client 1 includes read operation for executing reading of data and attribute, updating operation for executing data writing and attribute alteration and the like, new preparation operation for preparing an object anew, and deleting operation for deleting an object, and switch 100 alters processing methods depending upon the respective operations.

In the following, a processing method in switch 100 in each operation will be described with reference to flow charts illustrated in FIGS. 38 to 42.

Packet processing unit 103, once receiving the file access request packet of client 1, extracts from the request packet in step S150, the file access request data, and client IP address information 160 and client MAC address information 161 of client 1, and transmits them to file access control unit 102. Data analysis unit 124 analyzes received request data in step S151, and extracts server identification information 154 contained in compression type information entraining object ID 151 or postscript type information entraining object ID 155, and further checks whether or not server identification information 154 coincident with movement destination server information 168 of movement object status control unit 130 is existent. When server identification information 154 is not existent in movement destination server information 168, the operation in switch 100 takes the same method as the processings for a request packet and a reply packet in the second embodiment as illustrated in step S152.

In contrast, when server identification information 154 is existent in movement destination server information 168 in step S151, in step S153 the entry is retrieved and checked on whether or not compression type information entraining object ID 151 or postscript type information entraining object ID 155 are registered in movement source object ID 166 in movement object status control table 130. When compression type information entraining object ID 151 or postscript type information entraining object ID coincident with movement source object ID 166 is not existent, as indicated in step S154 the operations in switch 100 takes the same method as the processings of the request packet and reply packet in the second embodiment. In contrast, when compression type information entraining object ID 151 or postscript type information entraining object ID is existent in movement source object ID 166, data analysis unit 124 judges what the operation request is from the request data in step S155.

When in step S155 the operation request obtained from the request data is read operation as indicated in box S160, in step S161 reference is made to advancement status information 177 of the entry of movement source object ID 166 corresponding to movement object status control table 130 to find the status being any of the non copying status, in-copying status, and copying finish status, in step S162 the request packet is transferred to the movement source server 3, so tat as indicated in step S163 later operations in switch 100 takes the same method as in the processings for the request packet and the reply packet in the second embodiment.

When in step S161 the operation is not any of the non-copying, in-copying, and copying finish, the situation is the operation finish status as indicated in box S164, and in step S165 the request packet to the movement destination server 3 is transferred, and in step S166 the request packet is converted to compression type information entraining object ID 151 or postscript type information entraining object ID 155 registered in movement destination object ID 167 of the entry of corresponding movement source object ID 166.

Operations thereafter in switch 100, as illustrated in step S163, employ the same method as in the processings for the request packet and the reply packet in the second embodiment.

When in step S155 an operation request obtained from the request data is an updating operation as illustrated in box S170, in step S171 advancement status information 177 is referred to of the entry of movement source object ID 166 corresponding to movement object status control table 130, and when the operation is in the non-copying status, in step S172 the request packet to the movement source server 3 is transferred, so that the operations thereafter in switch 100 employs the same method as the processings for the request packet and the reply packet in the second embodiment as indicated in step S173.

When the operation is not in the non-copying status in step S171, it is judged from advancement status information 177 in step S174 that an operation target is in copying, and when the operation is in the in-copying status, the request packet is transferred to the movement source server 3 in step S175, and in step S176 meta-information other than the updating data such as the write position information is added to updating log information 179 of the corresponding entry. The operations thereafter in switch 100 employ the same method as in the processings of the request packet and the reply packet in the second embodiment as indicated in step S177. However, when the reply data from the movement source server 3 suffers from an error owing to a reason that the client 1 does not have a deletion right, the reply data is transferred to client 1, and data registered in updating log information 179 in movement object status control table 130 is deleted.

When the operation is not in the in-copying in step S174, it is judged in step S178 whether or not the operation target is in the copying finish with reference to advancement status information 177, and hence when it is in the copying finish status, the request packet is transferred to both of the movement source server 3 and the movement destination server 3 in step S179, and after necessary information is registered in transaction ID control table 125, on the basis of compression type information entraining object ID 151 contained in the request packet or original object ID 150 obtained by converting postscript type information entraining object ID 155 in object ID rewrite unit 101, and compression type information entraining object ID 151 or server identification information 154 extracted from postscript type information entraining object ID 155 transfer destination address information such as the IP address of the movement source server 3 extracted from server information control table 126 and the MAC information is sent to file system control processing unit 104. In the same fashion, on the basis of original object ID 150 obtained by converting compression type information entraining object ID 151 or postscript type information entraining object ID 155 registered in movement destination object ID 167 of the entry of movement source object ID 166 in object ID rewrite unit 101, and on server identification information 154 registered in movement destination server information 168, transfer destination address information such as the IP address and the MAC address information extracted of the movement destination server 3 from server information control table 126 are sent to file-system control processing unit 104.

In file system control processing unit 104, in step S180, on the basis of data directed to the movement source server 3 and data directed to the movement destination server 3 received from file access control unit 102, the request packet is transmitted from switch 100 to the movement source server 3 and the movement destination server 3 through packet processing unit 103. The respective reply packets from the movement source server 3 and the movement destination server 3 are received in switch 100, and the respective reply data are extracted in packet processing unit 103 and are sent to file system control processing unit 104. In file system control processing unit 104, in step S181, after it is confirmed that the two reply data are received, the reply data are sent to file access control unit 102. Operations thereafter in switch 100 employ the same method as the processing method for the reply packet in the first embodiment, and the reply packet is returned to client 1.

When the operation is not in the copying finish in step S178, the operation target is in the movement finish status as indicated in box S182, so that the request packet is transferred to the movement destination server 3 in step S183 and is converted in step S184 to compression type information entraining object ID 151 or postscript type information entraining object ID 155 registered in movement destination object ID 167 of the entry of movement source object ID 166 corresponding to movement object status control table 130. Operations thereafter in switch 100 employ the same method as the processings for the reply packet and the reply packet in the second embodiment, as illustrated in step S185.

When in step S155 an operation request obtained from the request data is a newly prepared operation as indicated in box S190, in step S191 advancement status information 177 of the entry of movement source object ID 166 corresponding to an object corresponding to a newly prepared directory in movement object status control table 130 is referred to, and it is judged whether or not the operation is in the non-copying status, in-copying status, and copying finish status. When the operation is in any of the non-copying status, in-copying status, and copying finish status, in step S192 the request packet is transferred to the movement source server 3, and hence a later packet transfer operation in switch 100 employs the same method as in the processings for the request packet and the reply packet in the second embodiment as indicated in step S193, and data movement processing unit 106 adds an entry of a prepared object to movement object status control table 130 in step S194.

When the operation is not any of the non-copying status, in-copying status, and copying finish status, i.e., when the operation is in the movement finish status as indicated in box S195, in step S196 the request packet is transferred to the movement destination server 3, and hence in step S197 the request packet is converted to compression type information entraining object ID 151 or postscript type information entraining object ID 155 registered in movement destination object ID 167 of the entry of movement source object ID 166 corresponding to movement object status control table 130 in step S197 operations thereafter in switch 100 employ the same method as in the processings for the request packet and the reply packet in the second embodiment, as illustrated in step S198.

When in step S155 an operation request obtained from the request data is a deletion operation as indicated in box S200, in step S201 advancement status information 177 of the entry of movement source object ID 166 corresponding to movement object status control table 130 is referred, and it is judged whether or not the operation is in the non-copying status. When it is in the non-copying status, in step S202 the request packet is transferred to the movement source server 3, and hence later packet transfer operation in switch 100 employs the same method as in the processings for the request packet and the reply packet in the second embodiment as indicated in step S203, and data movement processing unit 106 deletes an entry of an object to be deleted that is registered in movement object status control table 130 in step S204. But, when reply data replied from the movement source server 3 is an error owing to a reason that client 1 does not have a delete right, the reply data is transferred to client 1, and hence deletion of the corresponding object from movement object status control table 130 is not executed.

When the operation is not in the non-copying status in step 201, it is judged by advancement status information 177 in step S205 whether or not the operation is in the in-copying status, and if it is in the in-copying status, in step S206 the request is sent to the movement source server 3 and the movement destination serve 3, and hence in step S207 a copying processing of an object corresponding to data movement processing unit 106 is interrupted. In the same manner as in the case of the write operation, in step S208, transmission of the request packet to the movement source server 3 and to the movement destination serve 3 and reply packet processing returned respectively therefrom are executed, and thereafter data movement processing unit 106 deletes the entry of movement object status control table 130 of a corresponding object in step S209. But, when the reply data replied from the movement source server 3 and the movement destination server 3 is an error owing to a reason tat client 1 does not have a right of delete, the reply data is transferred to client 1, and deletion of the corresponding object from movement object status control table 130 is not executed, and copying for a corresponding object in data movement processing unit 106 is restarted.

When the operation is not in the in-copying status in step S205, it is judged with the aid of advancement status information 177 in step S210 whether or not it is in the copying finite status, and if it is in the copying finite status, in step S211 the reply packet is transferred to the movement source server 3 and the movement destination server 3, and hence as in the same fashion as in the in-copying status, in step S212 the transmission of the request packet to the movement source server 3 and the movement destination server 3 and the reply packet processing replied respectively are executed in the same manner as in the steps S180 to S181.

Thereafter, the operation jumps to step S204, and data movement processing unit 106 deletes the entry of movement object status control table 130 of the corresponding object. However, when reply data replied from the movement source server 3 and the movement destination server 3 undergoes an error owing to a reason that the client 1 does not have a delete right, the reply data is transferred to client 1, and deletion of the corresponding object from movement object status control table 130 is not executed.

Further, when an object of an operation target obtained from the request data is a directory, and advancement processing status information 177 is in the in-copying status or in the copying finish status, a method of transmission of requests to the movement source server 3 and the movement destination server 3 is not simultaneous transmission of the requests, but a delete request to the movement source server 3 is first transmitted, and only when the delete operation request is successful, the request is transmitted to the movement destination, and when an error happens on the movement source server 3, the delete request is not transmitted to the movement destination server 3.

When the operation is not in the copying finish status in step S210, it is the case where an operation target is in the movement complete status as illustrate in box S213, so that in step S214 a request packet is transferred to the movement destination server 3, and in step S215 the request packet is converted to compression type information entraining object ID 151 or postscript type information entraining object ID 155 registered in movement destination object ID 167 of the entry of movement source object ID 166 corresponding to movement object status control table 130. Operations thereafter in switch 100 employ the same method as in the processings for the request packet and the reply packet in the second embodiment as indicated in step S216.

All movement processings for an object group with the data movement processing unit 106 are complete, and an object corresponding to the movement source server 3 is deleted, and thereafter the processings for the request packet and the reply packet using movement object status control table 130 is effective until the entry of movement object status control table 130 is deleted with data movement processing unit 106 after a predetermined time.

Eleventh Embodiment

The present embodiment is an embodiment in which the tenth embodiment is further altered. Although in the tenth embodiment after the finish of the movement processing for all objects that are operation targets, the movement target object of the movement source server 3 is deleted, in the eleventh embodiment deletion of the movement target object of the movement source server 3 is not done. Further, when an operation request of any of the update operation request, new preparation request, and a delete request from client 1 comes during the movement processing, even if advancement status information 177 of movement object control table 130 of an operation target object is the movement settled status, the same processing as the copying finish status is executed in switch 100, whereby there is ensured synchronism between the object of the movement target of the movement source and an object of a movement target of the movement destination that is a duplication of the just-mentioned object.

Twelfth Embodiment

The present embodiment is an embodiment obtained by further altering the tenth embodiment and the eleventh embodiment. In the tenth and eleventh embodiments, when an update operation request comes from client 1 during the movement processing in switch 100, not only the update meta-information but also the update data are registered in update log information 179 in movement object status control table 130 for an object that is an operation target, and in the course of copying processing for a later updated portion reading from the movement source server 3 is not executed, and the update processing is directly executed for an update operation target object.

Figure 43:
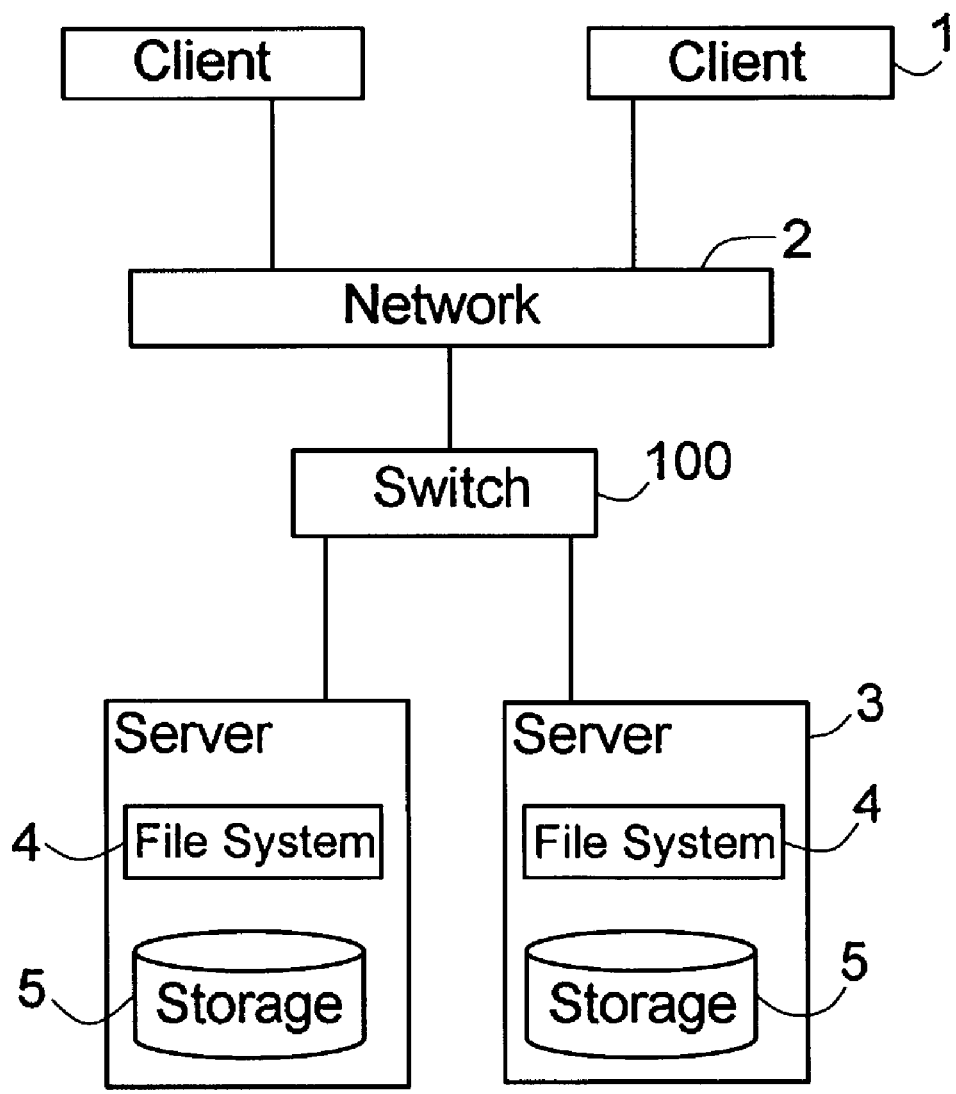
FIG. 43 is a block diagram of a network file system being a client/server type remote file system to which a switch device according to the present invention is applied.

The preferred embodiments according to the present invention were described. As described previously, although the switch devices in the respective embodiments are applicable to the network file system of a network construction illustrated in FIG. 3, those switches can provide the just-mentioned function even with the construction where server 3 is directly connected with switch 100, not network 2. With such a network construction which is illustrated in FIG. 43, any access from client 1 to server 3 without mediating switch 100 can be completely interrupted, so that system-down can be prevented from happening by directly accessing incorrectly to server 3 from client 1.

In switch device 100 in the respective embodiments, there may be provided a table having an entry composed of a combination of original object ID 150 prepared by server 3 and server identification information 154 instead of object ID rewrite unit 101. In this situation, data analysis unit 124 estimates server identification information corresponding to an object ID contained in a file access request with reference to the table, and estimates address information of a server corresponding to the server identification information with reference to server information control table 126, and determines a transfer destination of the file access request based upon the resulting address information. With the construction, even if original object ID 150 is transferred to client 1 as it is, the same function can be realized. However, when in this situation there is also the possibility that original object ID 150 having the same data train is generated, so tat when an object ID having the same data train as that of original object ID 150 already registered in the table thereof is received with switch 100, there are necessary processings where the object ID is rewritten to another data train, and there is provided an entry in which the rewritten data train is registered.

Although in the switch devices of the aforesaid respective embodiments they are applied to a network file system, the present invention is not limited thereto, and if there is a system where a resource (object) possessed by a plurality of servers is utilized by a client, the present invention is applicable to the system excepting the network file system.

In switch 100 a program is recorded for executing the operation of switch 100. The program is to control the operation of a hardware of switch 100 that is a computer server, by which program all processings of switch 100 is specified.

While preferred embodiments of the present invention have been described using specific terms, such description is for illustrative purposes only, and it is to be understood that changes and variations may be made without departing from the spirit or scope of the following claims.

What is claimed is:

1. A switching method, at a switch device which is logically disposed between at least one client and at least one server for managing at least one object, for transferring a request for at least one said object transmitted from said client to said server which manages at least one said object, and for transferring a reply against said request from said server to said client which is a source of said request, said switching method comprising the steps of:
   receiving a request from a client, the request including an object ID comprising an original object ID identifying an object, and server identification information identifying a server, among a plurality of servers, that manages the object identified by the original object ID, wherein the original object ID is created by the server identified by the server identification information;
   determining address information of the server using a first table for managing a combination of said address information of said server and said server identification information;
   deleting the server identification information from the object ID;
   transmitting the request which includes the object ID from which the server identification information is deleted to the server based on the determined address information;
   receiving a reply to the transmitted request from the server;
   if the received reply includes the original object ID, inserting into the original object ID the server identification information, and transmitting the reply to the client after inserting the server identification information into the original object ID included in the reply; and
   if the received reply does not include the original object ID, transmitting the reply to the client without inserting the server identification information into the reply.

2. The switching method according to claim 1, wherein a common object unit identification information is contained in said server identification information for identifying a common object unit which is a unit for objects exported to public.

3. The switching method according to claim 1, further comprising the steps of:
   estimating address information corresponding to a transaction ID contained in the transferred reply with reference to a second table which associated said request and said reply and manages a combination of the transaction ID and address information of the client, said transaction ID being provided for discriminating said request and said reply between said client and said server; and
   determining a destination of said reply on the basis of said address information.

4. The switching method according to claim 1, further comprising the steps of:
   estimating address information of a client to which the reply should be transferred with reference to a classification table which associates said request and said reply, and manages a combination of tag information of Layer 4 or lower OSI model and address information of the client, said tag information being useable for uniquely specifying a combination of said client and said server; and
   determining a destination of said reply based upon said address information.

5. The switching method according to claim 1, further comprising the steps of:
   estimating address information of the client to which the reply should be transferred with reference to a classification table which associates said request and said reply and manages a combination of a communication session port number with said server and address information of the client, said communication session port number being useable for uniquely specifying a combination between said client and said server; and
   determining a destination of said reply on the basis of said address information.

6. The switching method according to claim 1, wherein a pseudo file system is employed for combining directory trees of objects exported to clients from the server and managing them as one integrated directory tree.

7. The switching method according to claim 6, further comprising the steps of:
   referring to a second table for managing a combination of an object ID of an object corresponding to a joint of directory trees in respective common object units in said integrated directory tree and instruction information which is associated with said object ID, wherein the object corresponding to the joint of the directory trees requires accesses to a plurality of destinations; and
   executing a file system control processing of dividing, when a combination of the object ID and the instruction information both contained in a transferred request is entered into the second table, said request to requests transferred to said respective destinations, and assembling all replies received from said respective destinations as the reply transferred to said client.

8. The switching method according to claim 7, wherein the object ID registered in the second table is said original object ID.

9. The switching method according to claim 7, further comprising the steps of:
referring to the second table for managing a combination of instruction information required for a specific operation in management of said integrated directory tree and said integrated directory tree; and
executing a file system control processing of adding, when a combination of an object ID and instruction information both contained in a request requiring the specific operation is entered in the second table, tag information capable of judgment in a Layer 4 or lower OSI model to said request and transmitting the tag information to said respective destinations, identifying a reply received from said respective destinations based on said tag information, and executing a specific processing of a return path as a reply transferred to said client based on the tag information.

10. The switching method according to claim 7, further comprising the steps of:
recording in an attribute of an object corresponding to a joint between directory trees in each common object unit in said integrated directory tree an attribute indicating that said object is a joint; and
transmitting a request requiring an access to the plurality of destinations concerning said object without dividing said instruction and checking an attribute value of a reply corresponding to the request, and updating processing of the request to said step for executing file system control processing when there is an attribute value indicating that said object is said joint.

11. The switching method according to claim 7, further comprising the step of rewriting information in said second table such that when a movement request is received to move the object including the joint of the directory tree in each common object unit in said integrated directory tree, actual movement of the object at said joint and lower is not executed, and said rewriting further indicates to the client that the object at the joint and lower moved to a desired position.

12. The switching method according to claim 6, further comprising the steps of:
referring to a second table for managing a combination of a movement source object ID, when an object exported to public by said server is moved, the moved object before the movement, a movement destination object ID of the moved object after the movement, and movement destination server identification information which is identification information of the server to which the object is moved;
moving the object based upon a predetermined criteria with reference to the integrated directory tree managed by said pseudo file system, and entering in said second table the movement source object ID, the movement destination object ID, and the movement destination server identification information of said object; and
altering, when an object ID contained in a transferred request is coincident with the movement source object ID in the second table, said object ID to the movement destination object ID corresponding to said coincident movement source object ID, and further determining a destination server based upon the movement destination server identification information corresponding to said movement source object ID.

13. The switching method according to claim 12, wherein said original object ID is entered in said second table as the movement source object ID.

14. The switching method according to claim 12, further comprising the steps of:
referring to the second table for managing a combination of instruction information required for a specific operation in management of said integrated directory tree and said integrated directory tree; and
transmitting, when a combination of an object ID and instruction information both contained in transferred request is entered into said second table, said request by making use of a communication session port represented by a port number X different from other requests, identifying a reply received from said respective destinations among the other replies based on said port number X, and further performing a specific processing for a return passage as a reply transmitted to said client based on the port number X.

15. The switching method according to claim 14, further comprising the steps of:
referring to a third table for managing a combination of an object ID of an object corresponding to a joint of directory trees in respective common object units in said integrated directory tree, and instruction information which is associated with said object ID, wherein the object corresponding to the joint of the directory trees requires access to a plurality of destinations; and
when a combination of an object ID and instruction information both contained in a transferred request is entered into said third table, executing a file system control processing of dividing said request to requests transferred to said respective destinations, transmitting said divided requests using a port number corresponding to a communication session port different from other requests, and identifying all replies received from said respective destinations based upon said port numbers from other replies, and assembling all the replies as the reply transferred to said client.

16. The switching method according to claim 6, further comprising the steps of:
referring to a second table for managing a combination of an object ID of an object corresponding to a joint of directory trees in respective common object units in said integrated directory tree, and instruction information which is associated with said object ID, wherein the object corresponding to the joint of the directory trees requires access to a plurality of destinations; and
executing file system control processing for dividing, when a combination of an object ID and instruction information both contained in a request to be transferred is contained in said second table, said request to requests to be transferred to said plurality of the destinations, adding tag information capable of judgment in a Layer 4 or lower OSI model to said divided request and transmitting the divided requests, and identifying all responses received from each of said plurality of destinations based on said tag information, and further assembling said all responses as the reply to be transferred to said client.

17. The switching method according to claim 6, further comprising the steps of:
referring to a second table for managing a combination of an advancement state of movement processing of all moving objects upon processing where an object group which are exported to the public by said server are moved to another server, updating information required from the client in the processing of the movement, a movement source object ID of said moved object before the movement, a movement destination object ID of said moved object after the movement, and movement destination server identification information comprising identification information of a server at a movement destination;

referring to said pseudo file system, moving said object based upon a predetermined criteria, and entering in said second table the advancement state of the movement processing, updating a log in a copying processing, the movement source ID of said object, the movement destination object ID, and the movement destination server identification information; and altering a transfer destination of a request for the moved object from the client while moving the object on the basis of the advancement state registered in said second table and contents of said request, and hiding that the object is being moved such that the client is not informed of the move.

18. The switching method according to claim 17, further comprising the step of altering information of the advancement state of the moving in said second table concerning a portion of objects of said group of the objects when copying of data to a movement destination is finished for the object group in said movement processing, and altering mapping information in said pseudo file system from the object of the movement source to the object of the movement destination.

19. The switching method according to claim 18, further comprising the step of judging whether or not a request is for an object ID associated with a movement source object with respect to an object for which the mapping is altered to a movement destination object to result in the movement being finished, and rewriting and transferring said movement source object ID to the movement destination object ID based on the judging.

20. The switching method according to claim 18, wherein when a data write request comes from the client to an object for which copying is being executed in said movement processing, updating data contained in the write request, and the position of the write data are registered as the updating information in said second table, and thereafter the write request is transferred to the movement source, and after said copying processing is finished, writing is executed into the object at the movement source.

21. The switching method according to claim 17, wherein when a data write request is issued from the client to an object for which copying is finished during said movement processing, the write request is transferred to the movement source and the movement destination.

22. The switching method according to claim 17, wherein when a data write request is issued from the client to an object for which copying is being executed, the position of write data is registered as updating information in said second table, and thereafter the write request is transferred to the movement source, and after said copying processing is finished, data of the updated portion is read out from the movement source and is written into an object of the movement destination.

23. A switch device disposed between at least one client and at least one server for managing at least one object, by which switch device a request for at least one said object transmitted from said client is transferred to said server for managing at least one said object, and by which switch device a reply to said request from said server is transferred to a client being the source of the transmission, said switch device comprising:

receiving means for receiving a request from a client, the request including an object ID comprising an original object ID identifying an object, and server identification information identifying a server, among a plurality of servers, that manages the object identified by the original object ID, wherein the original object ID is created by the server identified by the server identification information;

a first table for managing a combination of address information of said server and said server identification information;

transfer means for determining address information of the server using the first table, deleting the server identification information from the object ID, and transmitting the request including the object ID from which the server identification information is deleted to the server based on the determined address information, wherein the receiving means receives, from the server, a reply to the transmitted request, and if the received reply includes the original object ID, an inserting means inserts the server identification information into the original object ID, and the transfer means transfers to the client the reply after inserting the server identification information into the original object ID included in the reply, and if the received reply does not include the original object ID, the transfer means transmits the reply to the client without inserting the server identification information into the reply.

24. The switch device according to claim 23, wherein said server identification information comprises common object unit identification information for identifying a common object unit, wherein the common object unit is a unit from which the requested object is exported to the client.

25. The switch device according to claim 23, further comprising:

a second table for associating said request and said reply, and managing a combination of a transaction ID provided for discriminating said request and said reply in said client and said server and address information of the client; and second transfer means for estimating address information corresponding to a transaction ID contained in the reply to be transferred with reference to said second table, and determining a destination of said reply based upon said address information.

26. The switch device according to claim 23, further comprising:

a classification table for associating said request and said reply, and managing a combination of tag information in an OSI model layer 4 or lower format for uniquely specifying a combination of said client and said server and address information of the client; and second transfer means for estimating address information of the client to which the reply should be transferred, and determining a destination of said reply based upon said address information.

27. The switch device according to claim 23, further comprising:

a classification table for associating said request and said reply, and managing a combination of a communication session/port number with a server useable for uniquely specifying a combination of said client and said server and address information of the client; and second transfer means for estimating address information of the client to which the reply should be transferred with reference to said port number and said classification table, and determining a destination of said reply on the basis of said address information.

28. The switch device according to claim 23, wherein said inserting means comprises:
a second table for managing a combination of algorithm identification information for identifying an algorithm upon rewriting said original object ID to said information entraining object and restoring information for restoration of said original object ID;
reply processing means for rewriting said server identification information and said algorithm identification information to said information entraining object ID by inserting said server identification information and said algorithm identification information into said original object ID, and registering said algorithm identification information and said restoring information in said second table; and
request processing means for estimating restoring information corresponding to algorithm identification information contained in said information entraining object ID with reference to said second table, and restoring said information entraining object ID to said original object ID on the basis of said restoring information.

29. The switch device according to claim 28, wherein said restoring information comprises data deleted from said original object ID and a position of said data.

30. The switch device according to claim 29, wherein said reply processing means, when a data length of said original object ID is a fixed length, deletes part of said original object ID, and generates said information entraining object ID by inserting said algorithm identification information and said server identification information at a deleted position.

31. The switch device according to claim 29, wherein said reply processing means generates, when a data length of said original object ID is a variable length, and when a total sum of said original object ID, said algorithm identification information, and said server identification information does not exceed a maximum data length, said information entraining object ID by adding said algorithm identification information and said server identification information to said original object ID; and
deletes, when the total sum of the data lengths of said original object ID, said algorithm identification information, and said server identification information exceeds the maximum data length, part of said original object ID, and generates said information entraining object ID by inserting said algorithm identification information and said server identification information to a deleted position.

32. The switch device according to claim 29, wherein insertion positions of said algorithm identification information and said server identification information in an information entraining object ID contained in all requests and replies are equal.

33. The switch device according to claim 32, wherein data lengths of said algorithm identification information and said server identification information in an information entraining object ID contained in all requests and replies are equal.

34. The switch device according to claim 32, further comprising a pseudo file system in which directory trees of an object exported to clients from said server are combined and are managed as one integrated directory tree, wherein said pseudo file system comprises a merging agent for reading information of the integrated directory tree managed by other kinds of OS or protocols and reflecting the integrated directory tree on the directory tree file system.

35. The switch device according to claim 23, further comprising a pseudo file system in which directory trees of an object exported to clients from said server are combined for managing them as one integrated directory tree.

36. The switch device according to claim 35, further comprising:
a second table for managing a combination of an object ID of an object corresponding to a joint of directory trees in each common object unit in said integrated directory tree and instruction information which is associated with said object ID, wherein the object corresponding to the joint of the directory trees requires an access to a plurality of destinations; and
file system control processing means for dividing, when a combination of an object ID and instruction information both contained in a request to be transferred is entered in said second table, said request to request transferred to said each destinations, and assembling all replies received from said each destination as the reply transferred to said client.

37. The switch device according to claim 36, wherein the object ID registered in said second table is said original object ID.

38. The switch device according to claim 36, further comprising:
pseudo file system control means for recording an attribute of an object corresponding to a joint between directory trees in each common object unit in said integrated directory tree, attribute indicative of a fact that said object is a joint; and
joint processing judgment means for transmitting a request associated with said object ID and requiring an access to the plurality of destinations without dividing said instruction, checking an attribute of a reply corresponding to the request, and delivering, when there is an attribute indicative of said joint, the processing to said file system control processing means.

39. The switch device according to claim 36, further comprising high speed object movement means for rewriting information in the second table of the file system control processing means for managing joints such that a client views, when there is a movement request for the object including joints of a directory tree in each common object unit in said integrated directory tree, the object as if the object at said joint or lower is moved to a desired position without executing actual movement of the object at said joint or lower.

40. The switch device according to claim 35, further comprising:
a second table for managing a combination of a movement source object ID, when an object exported to clients by said server is subjected to movement, of said object before the movement, a movement destination object ID of said object after the movement, and movement destination server identification information being identification information for a server at a movement destination;
data movement processing means for moving said object based upon a predetermined criteria with reference to an integrated directory tree managed by said pseudo file system, and entering the movement source object ID, the movement destination object ID, and the movement destination server identification information of said object in said second table; and
movement hiding means for altering, when an object ID contained in a request to be transferred is coincident with the movement source object ID in said second table, said object ID to the movement destination object ID corresponding to the coincident said movement source object ID, and determining a transmission destination server based upon the movement destination server identification information corresponding to said movement source object ID.

41. The switch device according to claim 40, wherein in said second table said original object ID is entered as the movement source object ID.

42. The switch device according to claim 40, wherein
said inserting means assembles a data movement flag indicating that the object corresponding to the original object ID is moved, and sets, when an object ID contained in a request to be transferred is coincident with the movement source object ID in said second table, said data movement flag to be true,
wherein said movement hiding means retrieves said second table only if said data movement flag is true.

43. The switch device according to claim 40, wherein in said second table a sub table is prepared for each generation number to which one generation is added for one time data movement,
said inserting means assembles, when an object ID contained in a request to be transferred is coincident with the movement source object ID, said generation number in said information entraining object ID, and
said movement hiding means retrieves only the sub table to which said generation number is added among respective sub tables in said second table.

44. The switch device according to claim 35, further comprising:
a second table for managing a combination of instruction information for which a specific operation is necessary in said integrated directory tree control and said integrated directory tree; and
file system control processing means for transmitting, when the combination of an object ID and instruction information both contained in a request to be transferred is entered in said second table, said request using a transmission session port represented by a port number X different from other requests, identifying a reply received from said respective destinations among other replies, and executing a specific processing for a return passage as a reply transferred to said client based on the port number X.

45. The switch device according to claim 35, further comprising:
a second table for managing a combination of an object ID of an object corresponding to a joint between directory trees in each common object unit in said integrated directory tree, and instruction information which is associated with said object ID, wherein the object corresponding to the joint of the directory trees requires an access to a plurality of destinations; and
file system control processing means for dividing, when the combination of the object ID and instruction information both contained in the request to be transferred is entered in said second table, said request to requests transferred to said respective destinations, transmitting said divided requests using a port number corresponding to communication session ports different from other requests, identifying all replies received from said respective destinations with an aid of said port number from other replies, and assembling said received all replies as the reply to be transmitted to said client.

46. The switch device according to claim 35, further comprising:
a second table managing a combination of instruction information requiring specific operation in said integrated directory tree and said integrated directory tree; and
file system control processing means for adding, when a combination of an object ID and instruction information both contained in a request requiring specific operation is entered in said second table, tag information capable of judgment in a layer 4 or lower OSI model to said request and transmitting said tag information to respective destinations, identifying a reply received from each of said respective destinations based on said tag information, and executing a specific processing for a return passage as a reply transmitted to said client based on the tag information.

47. The switch device according to claim 35, further comprising:
a second table for managing a combination of an object ID of an object corresponding to a joint between directory trees in each common object unit in said integrated directory tree and instruction information which is associated with said object ID, wherein the object corresponding to the joint of the directory trees requires an access to a plurality of destinations; and
file system control processing means for dividing, when a combination of an object ID and instruction information both contained in a request to be transferred is entered in said second table, said request to a request transmitted to said plurality of the destinations, adding tag information capable of judgment in a layer 4 and lower OSI model to said divided requests and transmitting them to said destinations, identifying all replies received from said respective destinations based on said tag information, and assembling said all replies as the reply transferred to said client.

48. The switch device according to claim 35, comprising:
a second table for managing a combination of an advancement status of a movement processing for moving all objects upon executing a processing in which a group of objects exported to public by said server to another server, update information required during the movement processing from the client, a movement source object ID of said object before the movement, a movement destination object ID of said moved object after the movement, and movement destination server identification information comprising identification information of a movement destination server;
movement processing control means for moving said object on the basis of a predetermined criteria with reference to said pseudo file system, entering an advancement status of the movement processing, updating a log in a copying processing, a movement source ID of said object, a movement destination object ID, and movement destination server identification information into said second table; and
means for altering a transfer destination of a request for the moved object while moving the object on the basis of the advancement state registered in said second table and contents of said request, and hiding that the object is being moved such that the client is not informed of the move.

49. The switch device according to claim 48, comprising mapping information altering means for altering information of the advancement state of the moving in said second table concerning a portion of objects of said group of the objects when copying of data to a movement destination is finished for the object group in said movement processing, and altering mapping information in said pseudo file system from the object of the movement source to the object of the movement destination.

50. The switch device according to claim 49, further comprises object ID rewrite means for altering the mapping to the movement destination object by said mapping information alteration means, judging by said second table whether or not there is a request for an object ID associated with the movement source object for the object which movement is finished, and rewriting and transferring said movement source object ID to the movement destination object ID based on the judging.

51. The switch device according to claim 48, wherein when a data write request is issued from a client to an object for which copying is finished during said movement processing, the write request is transferred to a movement source and to a movement destination, and synchronization is kept unchanged.

52. The switch device according to claim 48, wherein when a data write request is issued from client to an object in the copying processing during said movement processing, a position of the write data is registered in said second table as the update information, and thereafter the write request is transferred to the movement source, and after said copying processing is finished data of the updated portion is read from the movement source and is written in the movement destination object.

53. The switch device according to claim 48, wherein when a data write request is issued from a client to an object in the copying processing during said movement processing, update data contained in the write request and a position of the write data are registered in the second table as the update information, and thereafter the write request is transferred to the movement source, and after said copying processing is finished, writing into a movement destination object is executed using said update information.

* * * * *